(12) United States Patent
Mollick

(10) Patent No.: US 11,350,556 B2
(45) Date of Patent: Jun. 7, 2022

(54) SYSTEM FOR CONNECTING IMPLEMENT TO MOBILE MACHINERY

(71) Applicant: Peter J. Mollick, Phoenix, AZ (US)

(72) Inventor: Peter J. Mollick, Phoenix, AZ (US)

( * ) Notice: Subject to any disclaimer, the term of this patent is extended or adjusted under 35 U.S.C. 154(b) by 518 days.

(21) Appl. No.: 16/587,410

(22) Filed: Sep. 30, 2019

(65) Prior Publication Data

US 2020/0037489 A1 Feb. 6, 2020

Related U.S. Application Data

(62) Division of application No. 15/480,914, filed on Apr. 6, 2017, now Pat. No. 10,455,753.

(60) Provisional application No. 62/496,424, filed on Oct. 18, 2016, provisional application No. 62/390,693, filed on Apr. 7, 2016.

(51) Int. Cl.
| | | |
|---|---|---|
| *A01B 59/00* | (2006.01) | |
| *A01B 59/043* | (2006.01) | |
| *A01B 59/048* | (2006.01) | |
| *A01B 63/00* | (2006.01) | |
| *A01B 63/02* | (2006.01) | |
| *A01B 59/06* | (2006.01) | |
| *A01B 69/04* | (2006.01) | |
| *B60W 50/14* | (2020.01) | |

(52) U.S. Cl.
CPC .......... *A01B 59/002* (2013.01); *A01B 59/043* (2013.01); *A01B 59/048* (2013.01); *A01B 63/004* (2013.01); *A01B 63/023* (2013.01); *A01B 59/062* (2013.01); *A01B 69/008* (2013.01); *B60W 2050/146* (2013.01); *B60W 2420/42* (2013.01); *B60W 2420/62* (2013.01)

(58) Field of Classification Search
CPC ... A01B 59/002; A01B 59/043; A01B 59/048; A01B 59/062; A01B 63/004; A01B 63/023; A01B 69/008
See application file for complete search history.

(56) References Cited

U.S. PATENT DOCUMENTS

| | | | | |
|---|---|---|---|---|
| 3,841,415 A | * | 10/1974 | Koenig | A01B 59/043 172/678 |
| 3,993,206 A | * | 11/1976 | Jomen | E02F 3/386 280/468 |
| 4,640,662 A | * | 2/1987 | Spellman, Jr. | B66F 9/06 414/920 |
| 5,203,615 A | * | 4/1993 | Zanetis | E01C 23/088 404/90 |

(Continued)

*Primary Examiner* — Jamie L McGowan

(57) ABSTRACT

A system is suitable for connecting multiple implements to a three-point hitch of mobile machinery for controllable side-shifting movement of the connected implements. The system comprises first, second and third apparatuses, each apparatus comprising a first framework, a slidable second framework laterally slideable relative to the first framework, at least one connector supported by the slidable second framework for connecting the slidable second framework to one of the implements, and at least one driver connected to the first framework and the slidable second framework for driving the slidable second framework laterally back and forth relative to the first framework. The second apparatus is attached to one side of the first apparatus and the third apparatus is attached to the other side of the first apparatus.

50 Claims, 37 Drawing Sheets

(56) References Cited

U.S. PATENT DOCUMENTS

| | | | | |
|---|---|---|---|---|
| 5,606,809 | A | * | 3/1997 | Allen ............... E02F 3/386 |
| | | | | D15/25 |
| 5,645,179 | A | * | 7/1997 | Mohar ............... A01B 63/10 |
| | | | | 212/180 |
| 7,752,780 | B2 | * | 7/2010 | Johnson ............ E02F 3/386 |
| | | | | 414/695 |
| 8,246,271 | B2 | * | 8/2012 | Verhoff ............. E01C 19/38 |
| | | | | 404/127 |
| 2003/0141085 | A1 | * | 7/2003 | Paluch ............. A01B 73/005 |
| | | | | 172/679 |
| 2007/0025834 | A1 | * | 2/2007 | Gustafson ........ A01B 59/062 |
| | | | | 414/723 |
| 2017/0290258 | A1 | * | 10/2017 | Mollick ............ A01B 63/023 |
| 2019/0223369 | A1 | * | 7/2019 | Mollick ............ A01B 69/008 |
| 2020/0094636 | A1 | * | 3/2020 | Gygi ................. A01B 63/111 |
| 2020/0107485 | A1 | * | 4/2020 | Defrancq .......... A01B 59/042 |
| 2021/0212249 | A1 | * | 7/2021 | Disberger ......... A01D 34/008 |

\* cited by examiner

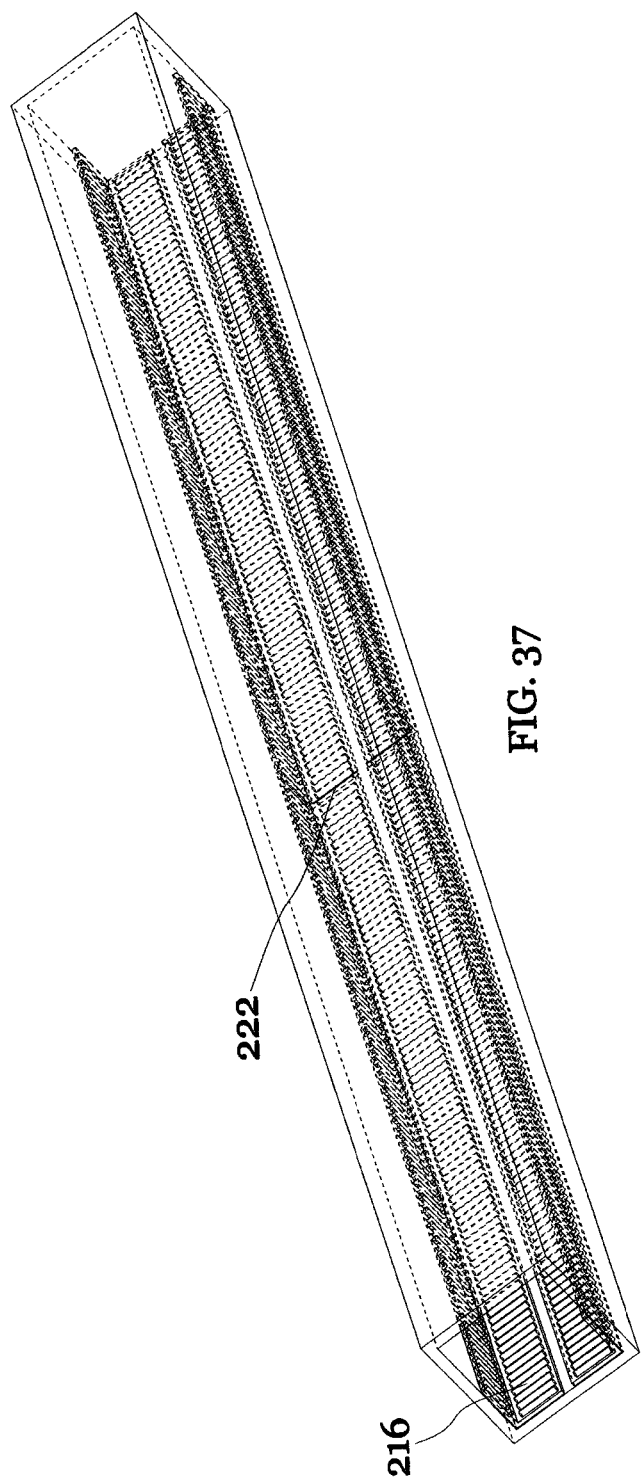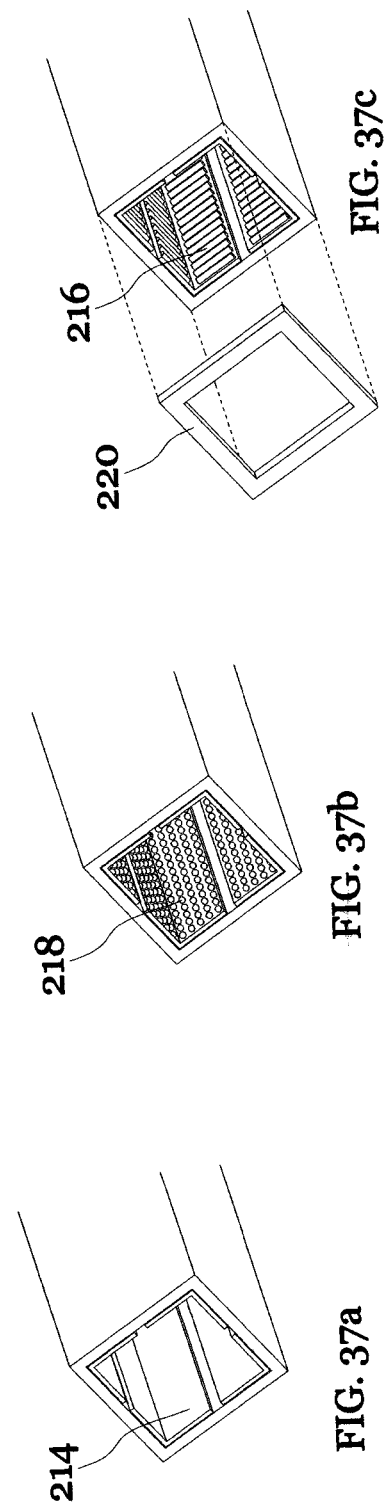
FIG. 37
FIG. 37c
FIG. 37b
FIG. 37a

SYSTEM FOR CONNECTING IMPLEMENT TO MOBILE MACHINERY

CROSS-REFERENCE TO RELATED APPLICATIONS

This application claims priority to and is a divisional of U.S. patent application Ser. No. 15/480,914 titled "System for Connecting Implement to Mobile Machinery," filed Apr. 6, 2017, which claims the benefit of U.S. Provisional Patent Application No. 62/390,693 titled "Laterally adjustable 3-point hitch attachment device" filed Apr. 7, 2016 and U.S. Provisional Patent Application No. 62/496,424 titled "Laterally adjustable three-point hitch implement apparatus," filed Oct. 18, 2016, the contents of which are incorporated herein by reference in their entirety. This application is related to U.S. patent application Ser. No. 16/566,386 filed Sep. 10, 2019, based on new continuation we just filed which is a continuation of the aforementioned Ser. No. 15/480,914.

BACKGROUND

Mobile machinery such as agricultural tractors, bulldozers, track tractors, skip loaders, all-terrain vehicles and earth grading tractors, generally referred to as a "tractor," typically are provided with a suitable power plant, a source of fluid under pressure and or a source of electric current. The fluid pressure source includes suitable valve control means. The tractors typically include an implement mounting system known as a three-point hitch. The three-point hitch includes a pair of opposed spaced apart lateral bottom-link arms located at the rear of the tractor body or frame rotatably connected to the tractor with ball joints which are affixed to the frame or body of the tractor at a selected distance of typically 12 to 30 inches above the ground and extend on each side of a center draw bar. The free distal ends of the arms typically include a ball rotatable in a socket with an axial hole extending there through.

A third arm, called a top-link arm, is also rotatably connected with a ball joint to the tractor frame at a point about 30 to 60 inches above ground and centered above the bottom-link arms. The free distal end of the top-link arm is fitted with a rotatable ball with an axial hole extending there through for connecting to a center point on an implement in alignment with studs. Free ends of the two bottom-link arms and the top-link arm provide three-points of attachment to implements and therefore is referred to as a three-point hitch. The length of top-link arm is generally adjustable by means of a built in turn-buckle assembly. This provides for manual leveling of the attached implement. The top-link arm turn buckle assembly can be replaced with a hydraulic cylinder for quick controlled manual or automated adjustments of the length of the top-link arm resulting in adjustments of the attached three-point implement.

The bottom-link arms are connected to a lift-link arm to provide a means for lifting such as a suitable power lift mechanism, for example one or more hydraulic cylinders. This provides the capability to raise and lower the two bottom-link arms and thus the implement which is connected to the three-point hitch. Because the free ends of all three arms are connected to the tractor with ball joint type connections, all three arms may freely pivot to the left and the right any time the three-point hitch has the implement raised off the ground. On older tractors, an additional bar called a stabilizer arm is provided, if desired, and is connected to one of the first two bottom-link arms and to a fixed point on the tractor. On newer tractors, two stabilizer arms are provided, one for each bottom-link arm and they are also connected to a fixed point on the tractor. The stabilizer arms allow the bottom-link arms to still be raised and lowered by hydraulic means, but the implement is held stable with reference to the horizontal plane, and cannot swing to and fro as before.

The attached implement can include a transversely extending tool bar or frame member having laterally spaced apart studs extending from the front tractor-facing side of the implement for removable attachment to the sockets held within the distal ends of the bottom-link arms. In addition to the bottom-link arm attachment hardware means is an upper attachment hardware means for the attachment of the top-link arm.

A three-point hitch is standard equipment on most agricultural and earth grading tractors. The use of a three-point hitch provides lifting, lowering and tilting mechanisms to attached agricultural implements, such as agricultural implements. The tractor three-point hitch allows the attached tool or implement to be raised and lowered, tilted horizontally and tilted vertically, all such movements and adjustments provided by hydraulically activated cylinders or manual crank screw devices. Front three-point hitches, while available, are less common than rear three-point hitches on agricultural tractors.

The three-point hitch provides for a quick attachment of various implements needed on a tractor. In addition, when the implement is in the raised or lowered position, lateral movement of the three-point bottom-link arms is freely available. To limit lateral movement of the implement in the raised or lowered position, the user can add a stabilizer arm comprising a longitudinal member having a selected adjustable length attachable to a swing arm attachment point on the tractor body or frame with the opposing end attaching to the same implement stud as the adjacent swing arm to limit lateral movement of the bottom-link arms. Many tractor brands are now factory supplied with three-point hitch bottom-link stabilizer arms. Controlled lateral movement of an attached implement is not provided with a three-point hitch.

Earth-moving equipment in the construction and farming field has rapidly changed for the better in recent years with the introduction of Global Positioning Systems (GPS) and laser guidance systems. Current GPS guidance systems for earth-moving and agricultural tractors generally are designed to auto-steer the tractor. Much of the guidance involves steering the tractor in a straight line to form a straight road or straight row of crops. Since most agricultural and earth grading tractors are steered by the front end of the tractor, the rear end mounted three-point hitch attached implement may not align in a straight line with the front steered end of the tractor. This misalignment would normally occur while the tractor is turning 180 degrees around at the end of the crop row and then joining onto the next crop row in the other direction. This misalignment would also occur while the tractor is in the middle of the crop field and the tractor veered slightly off line of the crop straight line forcing the tractor operator to correct the steering of the tractor. This steering correction of the tractor can also shift the rear end of the tractor in the opposite direction of the steering correction causing the rear three-point connected implement to also veer off course of the straight crop row and possibly damage the crops while cultivating the field or misalign the crops while planting. Lasers have come into play in the earth-moving and agricultural field mostly by controlling grade leveling implements on the tractor in an up and down motion for achieving a level or sloped grade.

Conventional laterally moving implement toolbars pivot on four parallel supporting arms extending out from the front of the supporting frame. Short sized supporting arms provide limited lateral movement of the toolbar section of the implement. The short lateral movement is exacerbated by the positioning of the tool mounting bar being too close to the frame structure that mounts to the tractor three-point hitch. Mounting brackets further decrease the tool mounting bar clearance to the frame structure. Pivoting-support-arms pivot in either direction limiting the length of the lateral movement to much less than the length of the pivoting-support-arms. The weight that these pivoting-support-arms can support on the toolbar with heavy implements is dependent on the strength of the pivot arms and their pivot joints. The pivot joints need to sustain a tremendous weight load when handling a heavy implement as they pivot side to side. This weight load is compounded and increased if the pivoting-support-arms are increased in length.

Two-point hitch configurations present a different set of limitations for use of lateral connection devices. The three-point hitch invention differs from a two-point hitch in the mounting ability by utilizing the advantage of the top-link arm attachment to the tractor frame, the improved locations for the sleeves that provide the sliding housings, a more versatile and stable two tier stacked movable implement attachment section compared to the one movable toolbar and a more stable and functional two or more tiered stacked movable implement attachment section compared to the one movable implement attachment section.

Several patents teach methods of steering and controlling tractor mounted implement attachment systems to two-point and three-point hitch systems. U.S. Pat. No. 3,208,535 by Fischer teaches an automatic steering system for implements; U.S. Pat. No. 7,530,405 by Kollath et al. teaches a quick coupler mechanism, U.S. Pat. No. 4,019,753 by Kestel teaches an adjustable three-point tractor hitch; U.S. Pat. No. 4,463,811 by Winter teaches an implement with a laterally movable frame structure with limited lateral movement; and U.S. Pat. No. 5,931,234 by Trowbridge teaches a retractable three-point hitch mounted, vertically and laterally adjustable toolbar. U.S. Pat. No. 4,930,581 by Fleischer teaches a guidance control device for agricultural implements using a hydraulic cylinder to pivot the implement frame and implement to the left or to the right to correct lateral position with respect to the tractor and the previously processed rows. U.S. Pat. No. 3,208,535 by Fischer teaches an automatic steering device and a plant stem sensor.

Existing systems for pulling or pushing implements suffer from a significant disadvantage, particularly that the implement can go off course, particularly during turns. This can result in destroyed crops, inadequate application or over application of chemicals used for crops, unplowed soil, and other deleterious effects. These problems can occur even when the mobile machinery, such as a tractor, is on course.

Therefore, there is a need for a system that can allow an implement to be pushed or pulled that helps maintain the implement on track, even when the mobile machinery used for pulling or pushing the implement is off track.

SUMMARY

A system according to the present invention that satisfies this need includes a connecting apparatus suitable for connecting an implement to a three-point hitch of mobile machinery, such as a tractor. The connecting apparatus comprises a first framework disposed in a first plane and comprising at least two parallel, vertically spaced-apart, laterally extending rails. Three attachments are supported by the first framework for attachment to the three-point hitch. The slidable second framework is generally in the plane of the first framework and is mounted on the rails to slide laterally along the rails. At least two connectors, and typically three connectors, are supported by the slidable second framework for connecting the slidable second framework to an implement that can be pulled or pushed by the mobile machinery. At least one driver, and for a robust apparatus, two drivers, are connected to the first framework and connected to the second framework for driving the slidable framework laterally back and forth along the rails.

In use of the apparatus, the position of the implement relative to the mobile machinery is changed by the action of the driver, the driver laterally moving the second framework.

Typically, the first framework comprises an upper cross beam and a lower cross beam, each cross beam substantially parallel to the rails. In a preferred version the first framework comprises at least two rails, at least two vertically extending studs, the upper cross beam, and the lower cross beam. The upper cross beam can support one of the attachments and the lower cross beam can support two of the attachments, typically in a triangular configuration.

The driver can be at least one hydraulic cylinder or at least one electric linear actuator.

When a cylinder is used as part of the driver, the cylinder can be provided with a stop for limiting lateral movement of the second framework. The driver can be manually or automatically controlled. The manual control can be a lever or the like. Also a switch can be provided for switching between manual and automatic control.

Preferably there is a guidance system for automatically controlling the driver to position the slidable second framework in a predetermined pathway. The guidance system can comprise a GPS receiver, an underground (buried) or above ground guidance wire, or a position signal receiver for receiving a laser signal. The guidance system can comprise at least one GPS positioning receiver mounted on the second framework for receiving signals from the satellites or ground mounted base relay station to determine the position of the slidable second framework, and a controller for receiving position signals from the position signal receiver, the controller adapted to control the driver to position the slidable second framework in the predetermined pathway. The GPS guidance system utilizes data input into a data input monitor to set the predetermined coordinates of the mobile machinery and the connecting apparatus. GPS guidance can control the mobile machinery steering in addition to the connecting apparatus position. GPS positioning of the connecting apparatus in conjunction with GPS steering of the mobile machinery is an advantage over GPS steering of the mobile machinery alone while attempting to guide an attached implement along a predetermined pathway. In a guidance wire application, the guidance system can comprise at least one sensor mounted on the second framework for receiving signals from the guidance wire. The apparatus can comprise a position signal receiver supported by the slidable second framework for determining the position of the slidable second framework, and a controller for receiving position signals from the position signal receiver, the controller adapted to control the driver to position the slidable second framework in the predetermined pathway. The guidance system can comprise at least one laser position receiver for receiving a laser signal from a rotating vertical laser transmitter, and a controller for processing position signals from the position signal receiver, the controller adapted to control the driver to position the slidable second framework in the predetermined pathway. In a laser guidance application, generally there is no need for data entry into a data entry monitor. The position of the laser receiver on the connecting apparatus can position the connecting apparatus and steer the tractor if tractor steering is preferred.

The second framework can comprise at least one sleeve for sliding on at least one rail, and typically multiple sleeves for sliding on multiple rails.

To power the driver, the apparatus can include a power receptacle for receiving power from the mobile machinery, which can be electric power or hydraulic fluid power.

For implements that have more than three places for connection, there can be more than three connectors, such as four or more connectors.

To assist an operator of the mobile machinery, the apparatus can include a light fixture and at least one camera.

In a preferred version of the invention, for robustness, the first framework comprises four rails, and the second framework comprises four lateral substantially parallel sleeves connected at their ends by end posts, each sleeve slidable on one of the rails.

It is preferred that there be positioning indicia on the upper cross beam of the first framework for positioning the second framework relative to the first framework. This same type of positioning indicia can be used on the lower cross beam of the first framework. Also, there can be positioning indicia on one or more of the sleeves for adjusting the position of any connector supported by the sleeve.

Preferably the apparatus includes a sensor for sensing the position of the second framework relative to the first framework. This can be combined with an alert generator that generates an alert, such as a sound or flashing light, when the sensor senses that the second framework slides beyond a predetermined position.

Preferably the apparatus includes a plumb gauge and a level gauge for correctly adjusting the attitude and positioning of the implement.

Preferably at least one connector is laterally adjustable on the second framework. Also preferably at least one connector is vertically adjustable on the second framework.

Additionally, the apparatus can include a connection guidance system for connecting the apparatus to the implement, the connection guidance system comprising a sensor on at least one, and preferably at least two, connectors for sensing the position of the implement. With the connection guidance system, the system can include a method for connecting the apparatus to the implement, where the implement has hitches for connector with the connectors. The method comprises placing the implement and apparatus approximate to each other, determine the alignment of the connectors and the hitches, and adjusting the alignment by sliding the second framework relative to the first framework.

The invention also includes a system where the mobile machinery, the apparatus described above, and an implement are connected together, with the apparatus attached to the mobile machinery via the three-point hitch on the mobile machinery, and the implement attached to the slidable second framework with at least two connectors.

The system can also include a pair of support stands for supporting the apparatus when the apparatus is otherwise not well supported, such as not being attached to all three points of a three point hitch, each stand comprising pins for engaging corresponding holes in the vertical studs of the first framework. Clips can be used for holding the pins in their engagement position.

Multiple connection apparatus of the present invention can be daisy chained together such as having a central apparatus attached to the mobile machinery, and having an additional pair of the apparatus, each one of the pair pivotally and removably attached to the sides of the central apparatus. Each of the pair can be modified from the central apparatus such as for the driver location and driver connection between the first and second framework. Each of the outer pair is typically designed to carry lighter duty implements than the central apparatus.

A system according the present invention comprises:
a) mobile machinery having a three-point hitch;
b) the connection apparatus attached to the mobile machinery with the three attachments; and
c) an implement attached to the slidable second framework with at least two connectors.

In a method of using the system there are the following steps:
a) placing the implement and apparatus proximate to each other;
b) determining the alignment of the connectors and the hitches; and
c) adjusting the alignment by sliding the second framework relative to the first framework.

In a method for changing the position of an implement pulled or pushed by with mobile machinery, the mobile machinery having a three-point hitch, there are the steps of:
a) attaching the connection apparatus to the three-point hitch of the mobile machinery with the three attachments;
b) attaching the implement to the slidable second framework with the connectors; and
c) changing the lateral position of the implement relative to the mobile machinery with the driver.

According to the invention, a method of attaching an implement to mobile machinery comprises the steps of:
a) attaching the connecting apparatus to the mobile machinery with the attachments;
b) aligning the connectors of the slidable second framework with the implement by moving the second framework relative to the first framework; and
c) connecting the connectors to the implement.

DRAWINGS

A better understanding of the present invention will be had upon reference to the following description in conjunction with the accompanying drawings in which like numerals refer to like parts throughout the views wherein.

Figure 5:
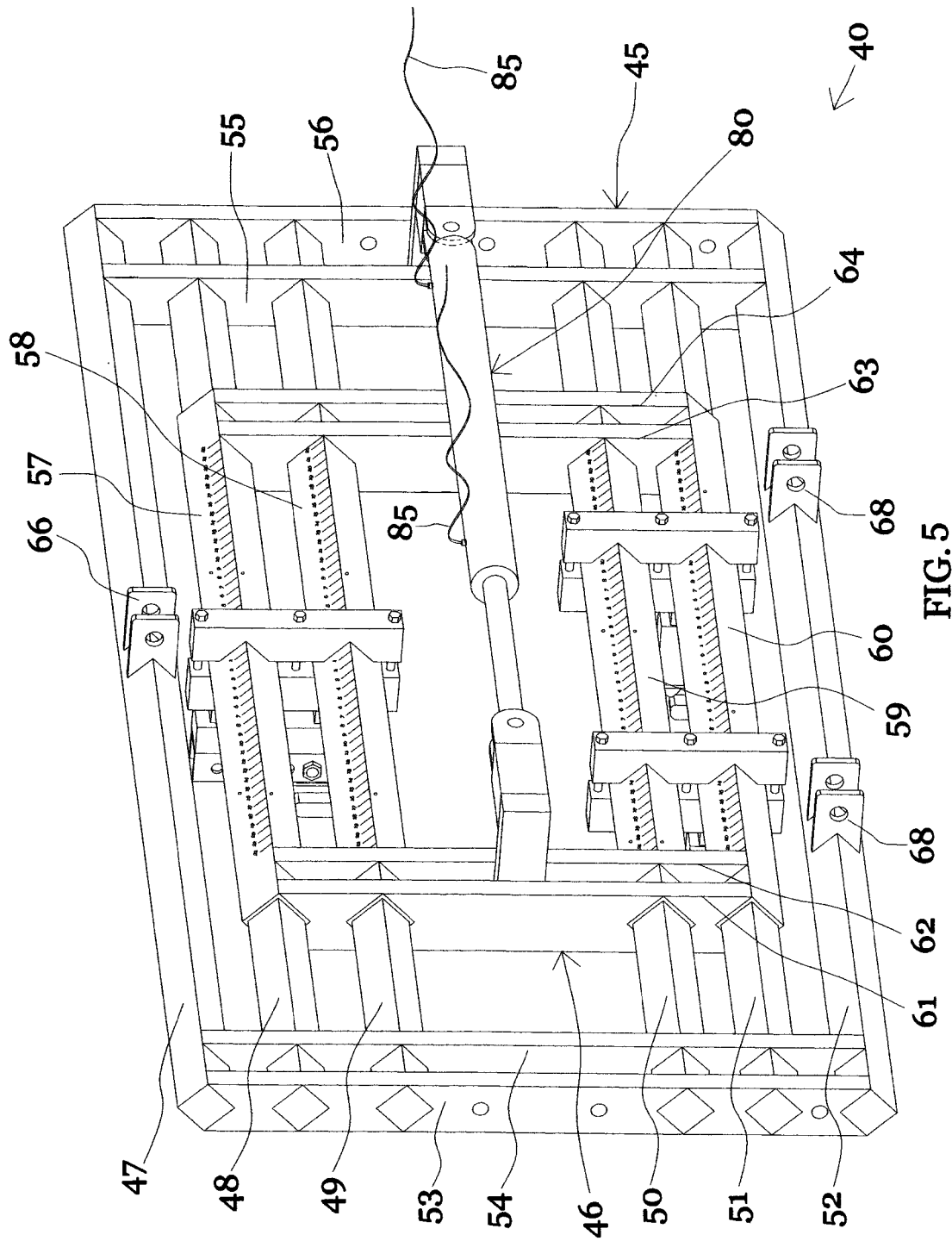
FIG. 5 is a perspective view of a first version of connecting apparatus according to the present invention, showing the mobile machinery-facing side.
Figure 6:
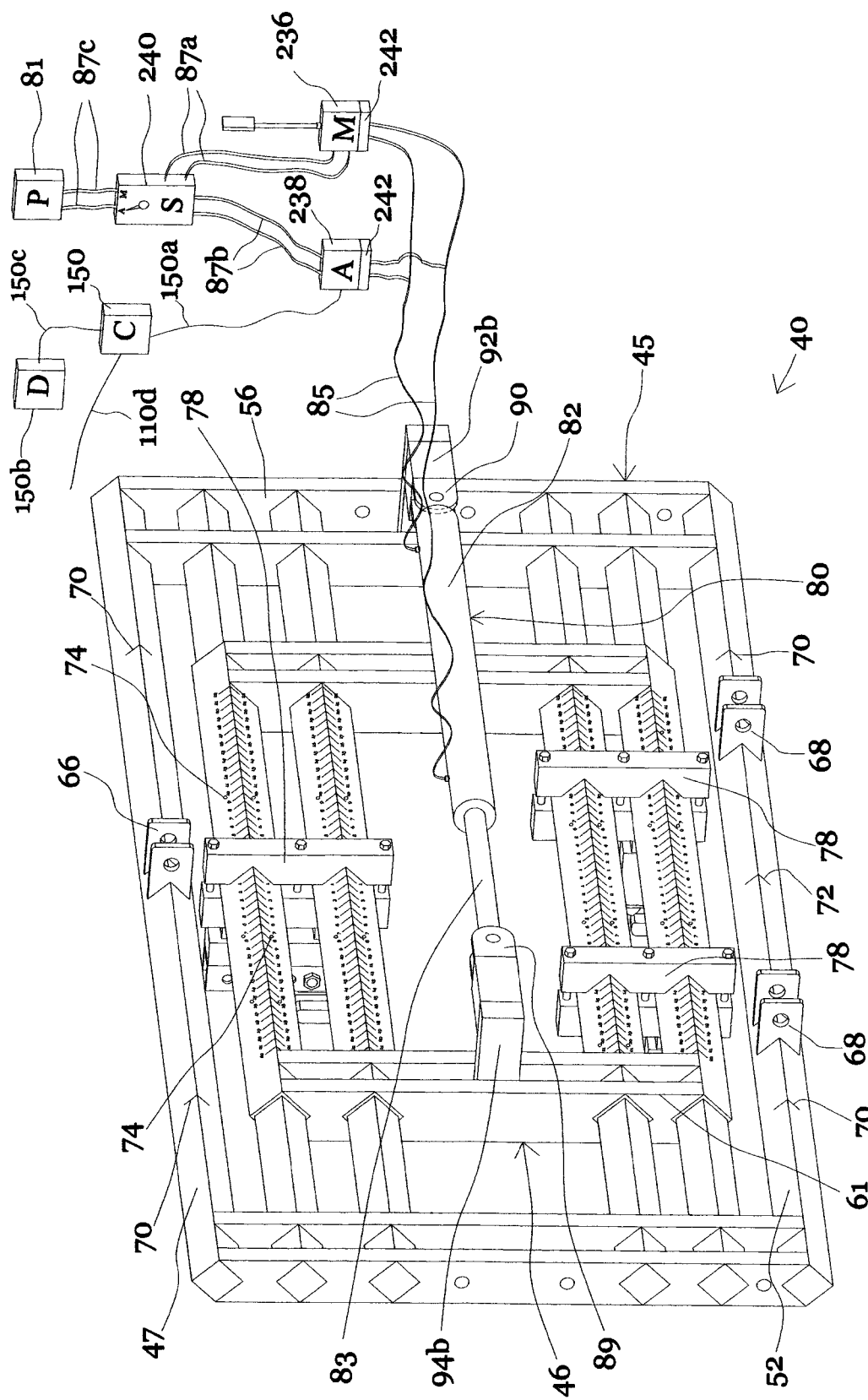
FIG. 6 is a perspective view of the first version of connecting apparatus according to the present invention including added attachments for automatic and manual controls of a single driver.
Figure 13:
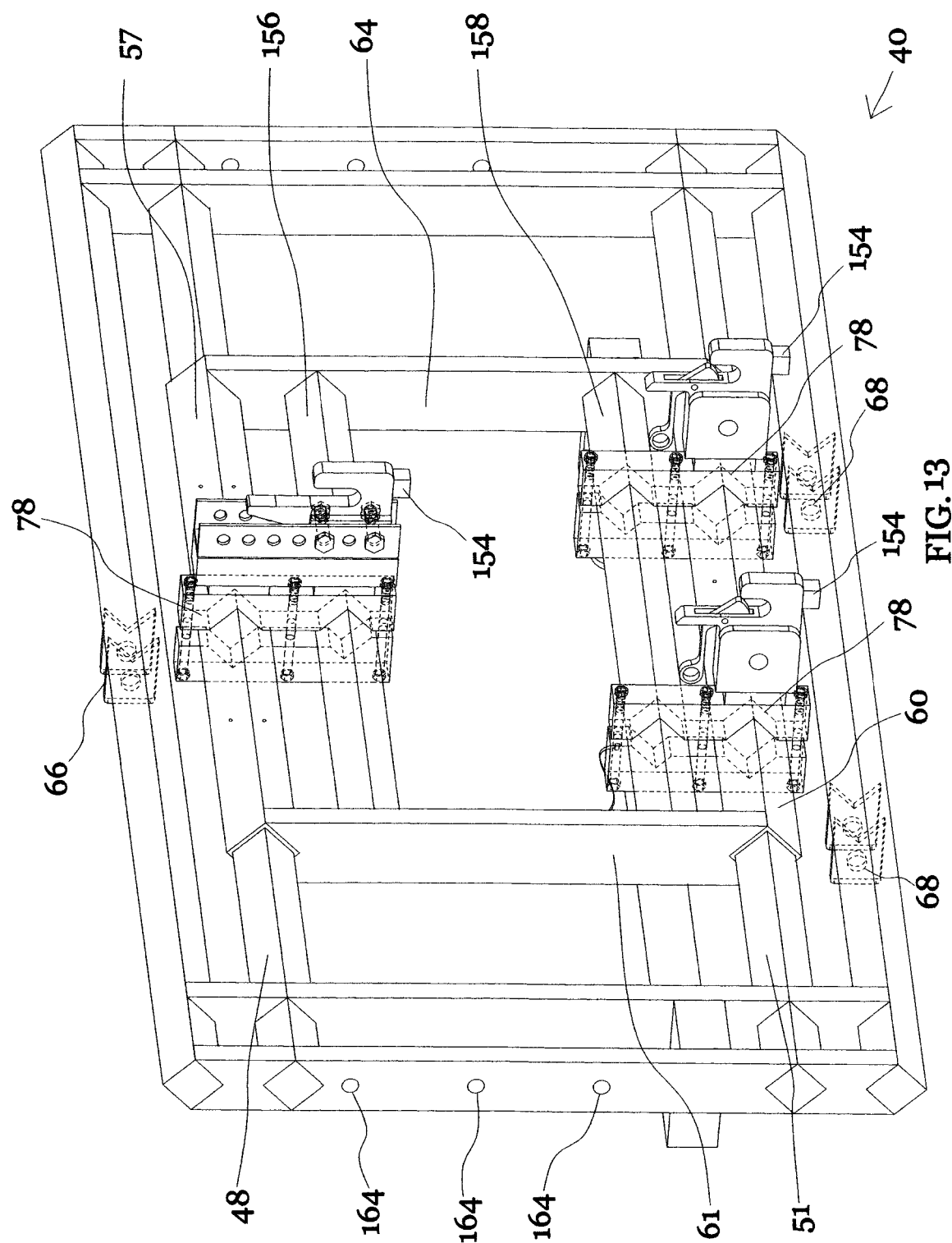
Figure 14:
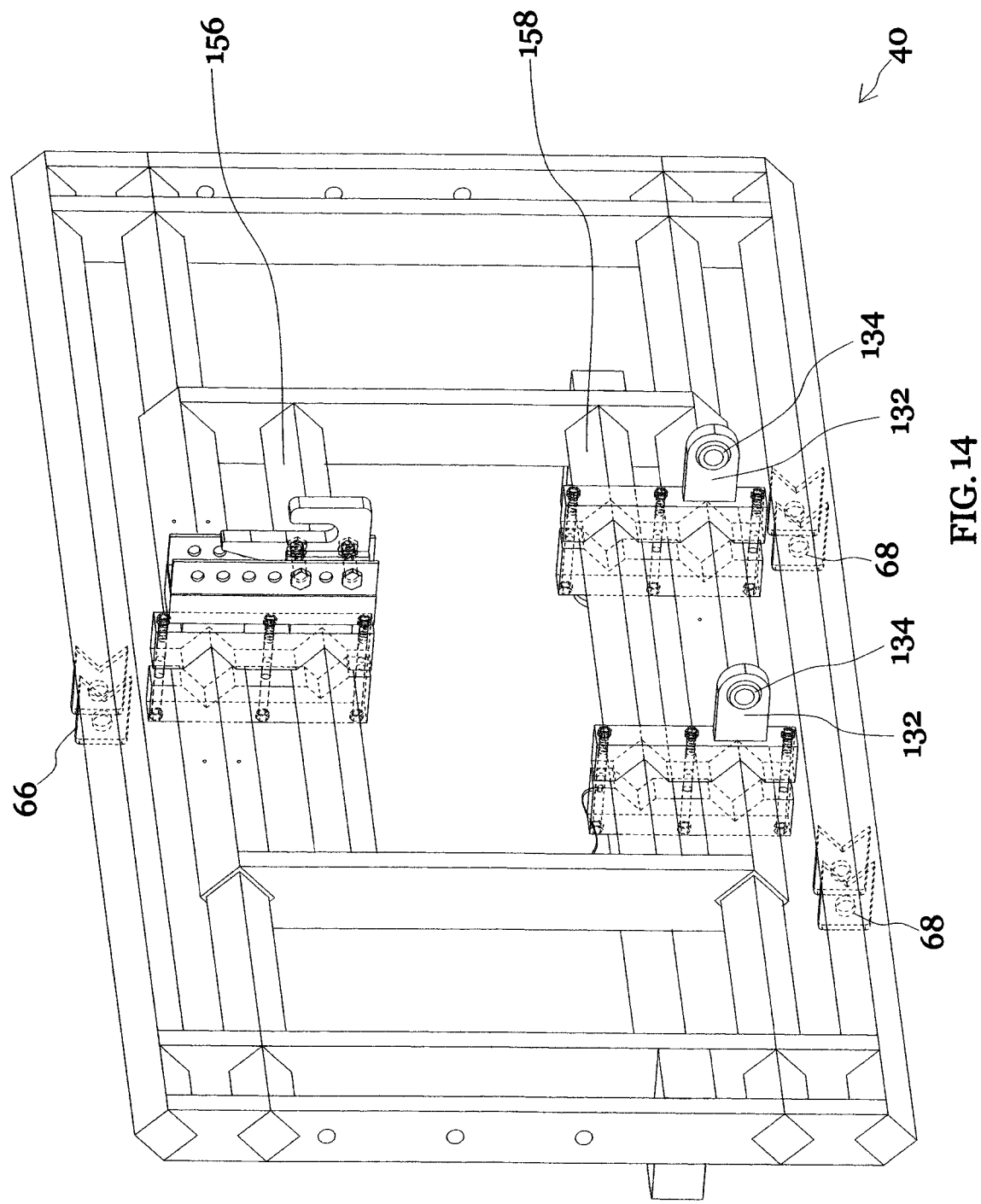
Figure 15:
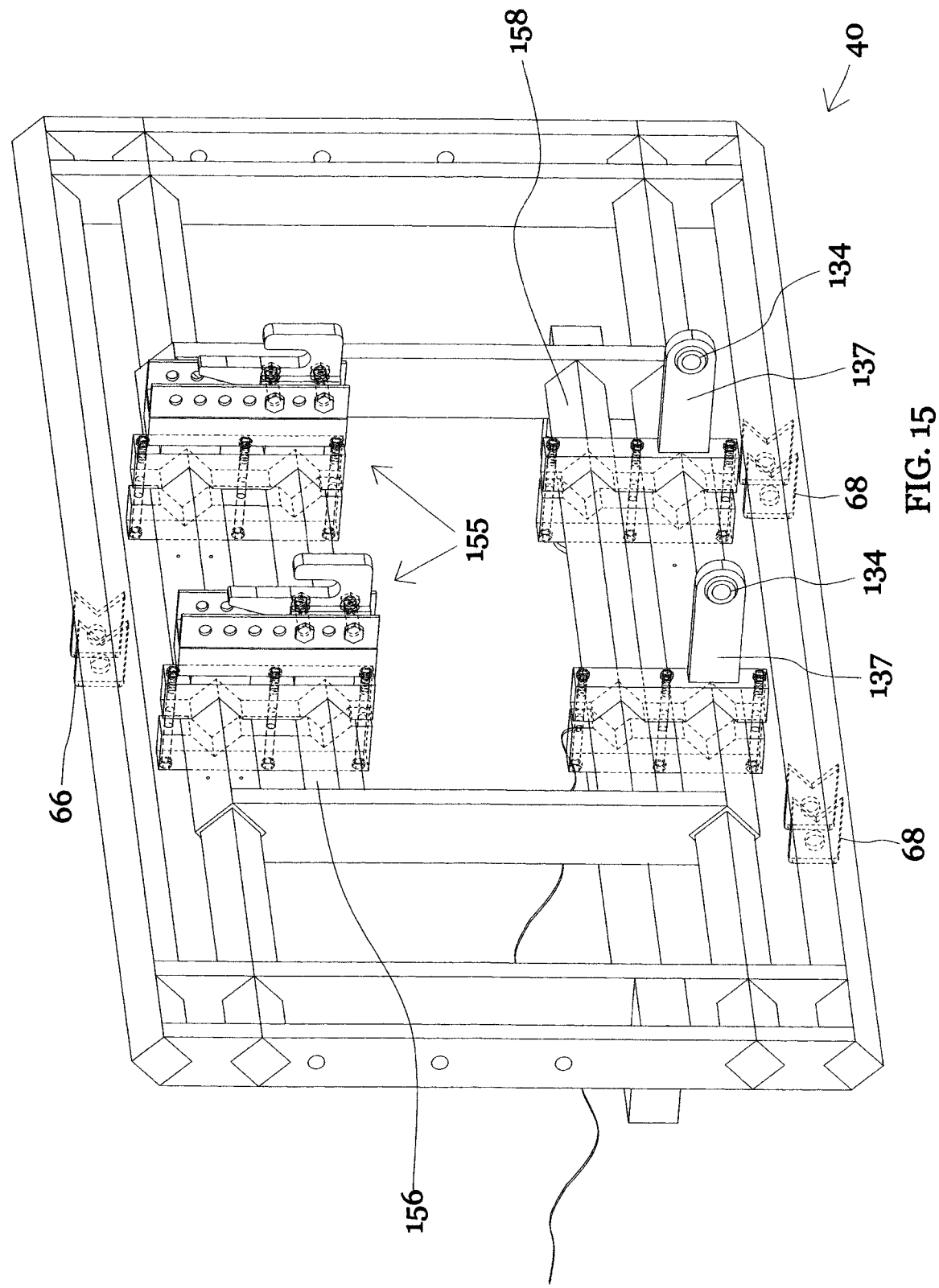
Figure 16:
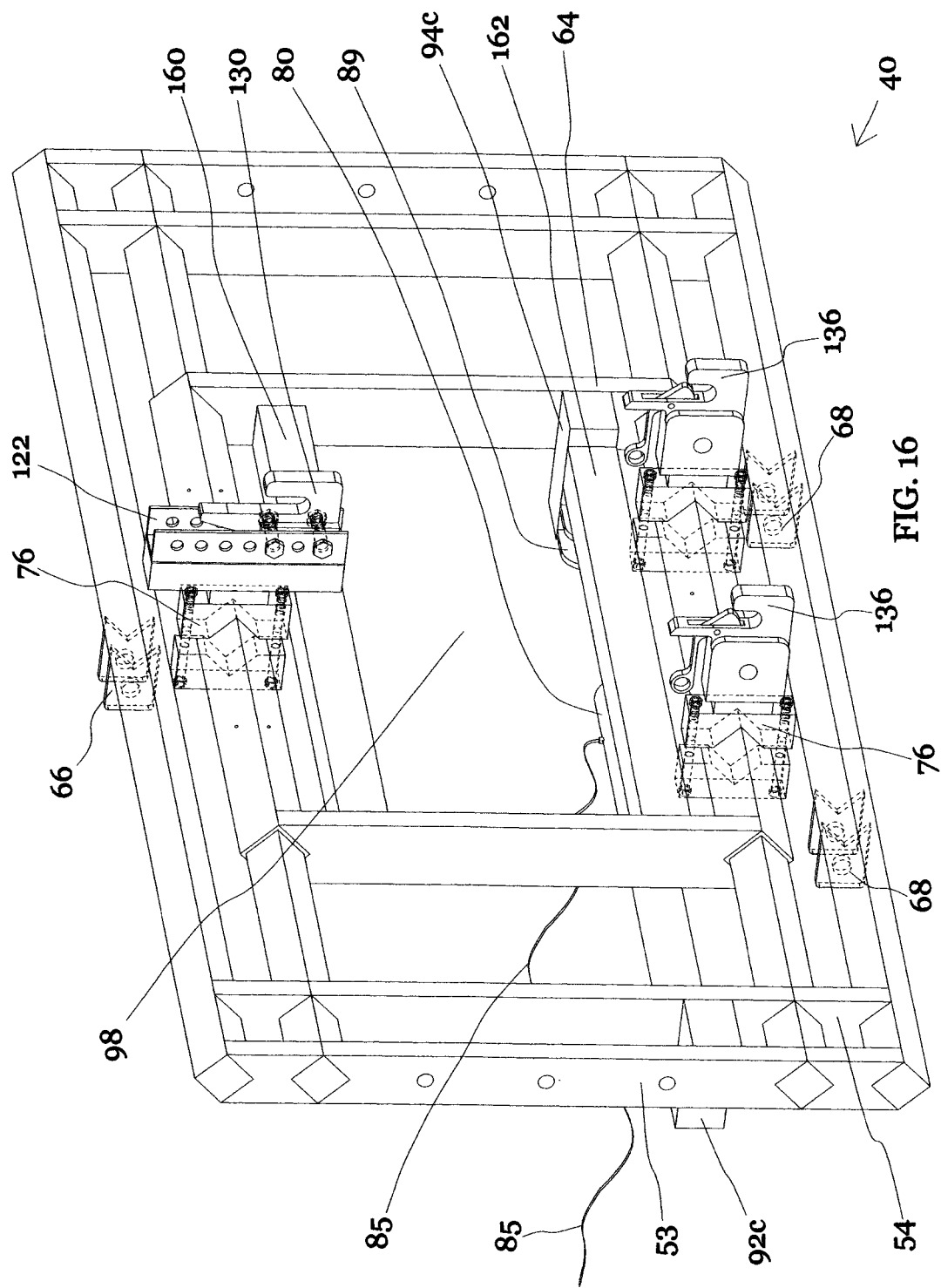

FIGS. 13-16 are perspective views of the implementing-facing side of similar apparatus, wherein the apparatus is a lighter version of the version of FIGS. 5 and 6, wherein the FIG. 13 apparatus has with a sliding frame comprising four horizontal frame members wherein two of the horizontal frame members are sliding frame members, three-point hitch connection to the implement, and bottom-link quick hitch attachments; FIG. 14 shows lower two connection points of a three-point hitch implement in the bar and distal ball socket style with a standard length bar; FIG. 15 shows lower two connection points of a four-point hitch implement in the bar and distal ball socket style with an extended length bar; and FIG. 16 shows three-point connection points supported by a single-frame member wrap-around bracket.

Figure 17:
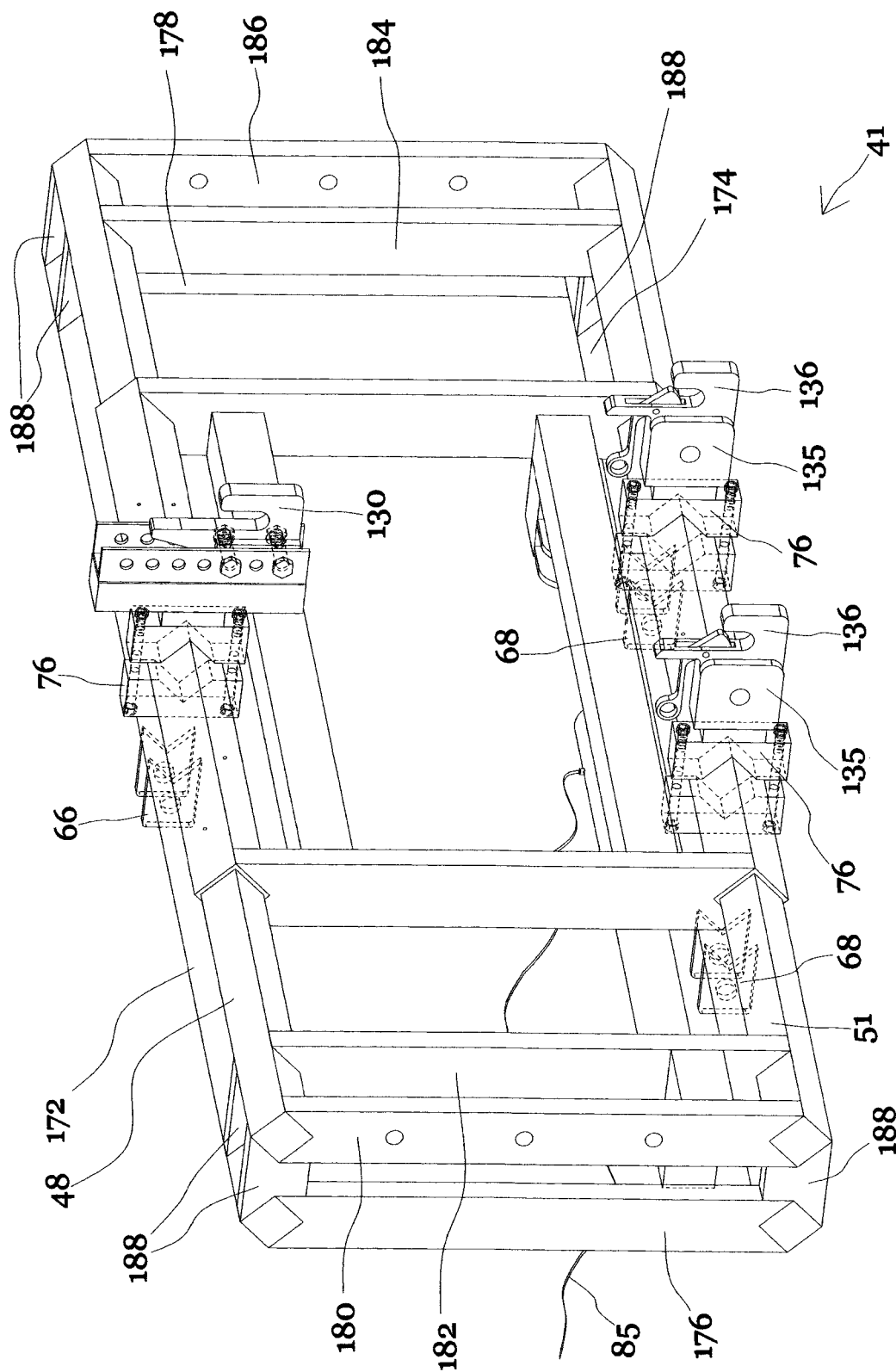

FIG. 17 is a perspective view showing a second version of a connecting apparatus according to the present invention in a more compact-design as compared to the previously disclosed upright-design.

Figure 18:
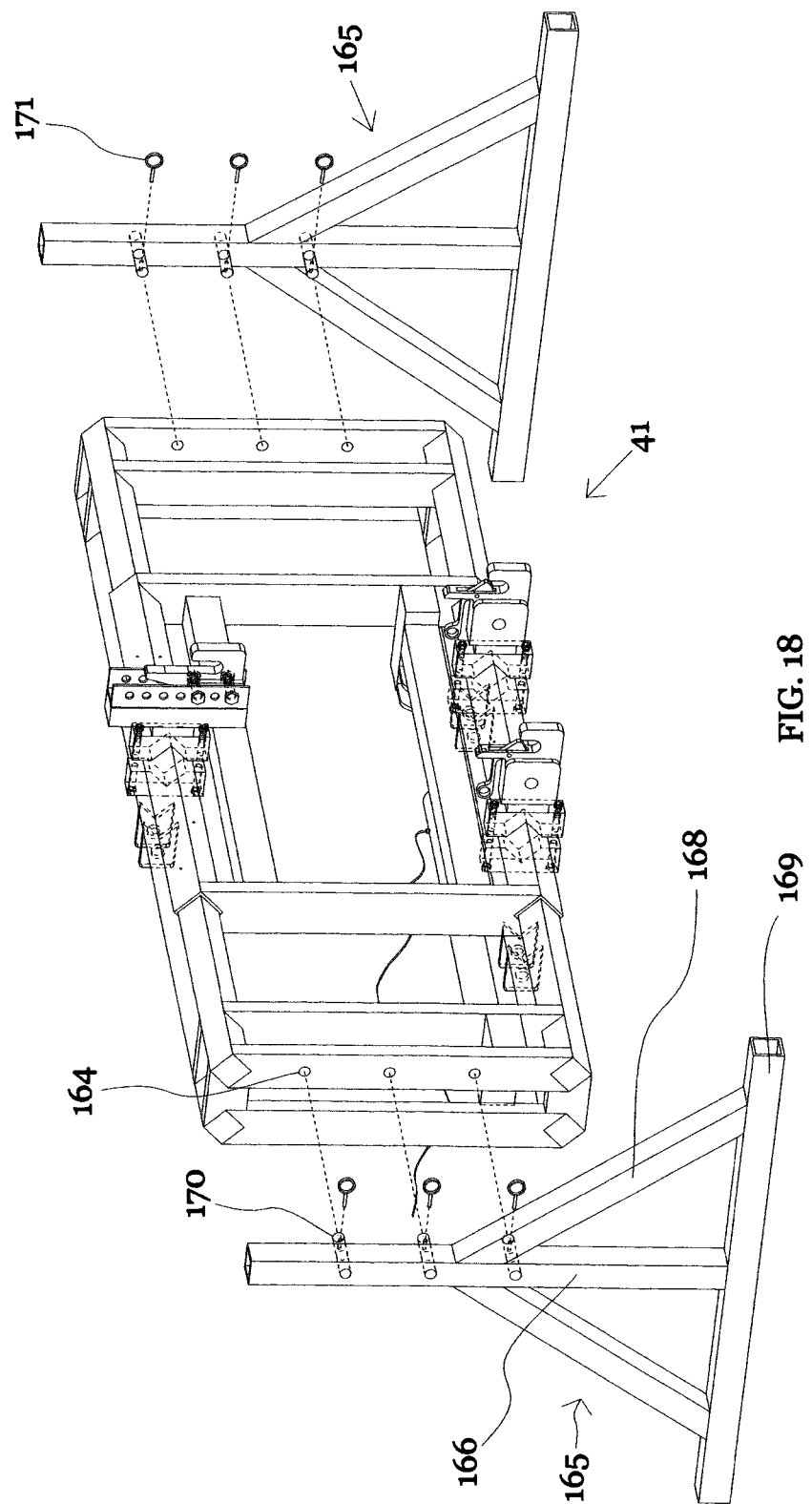
Figure 19:
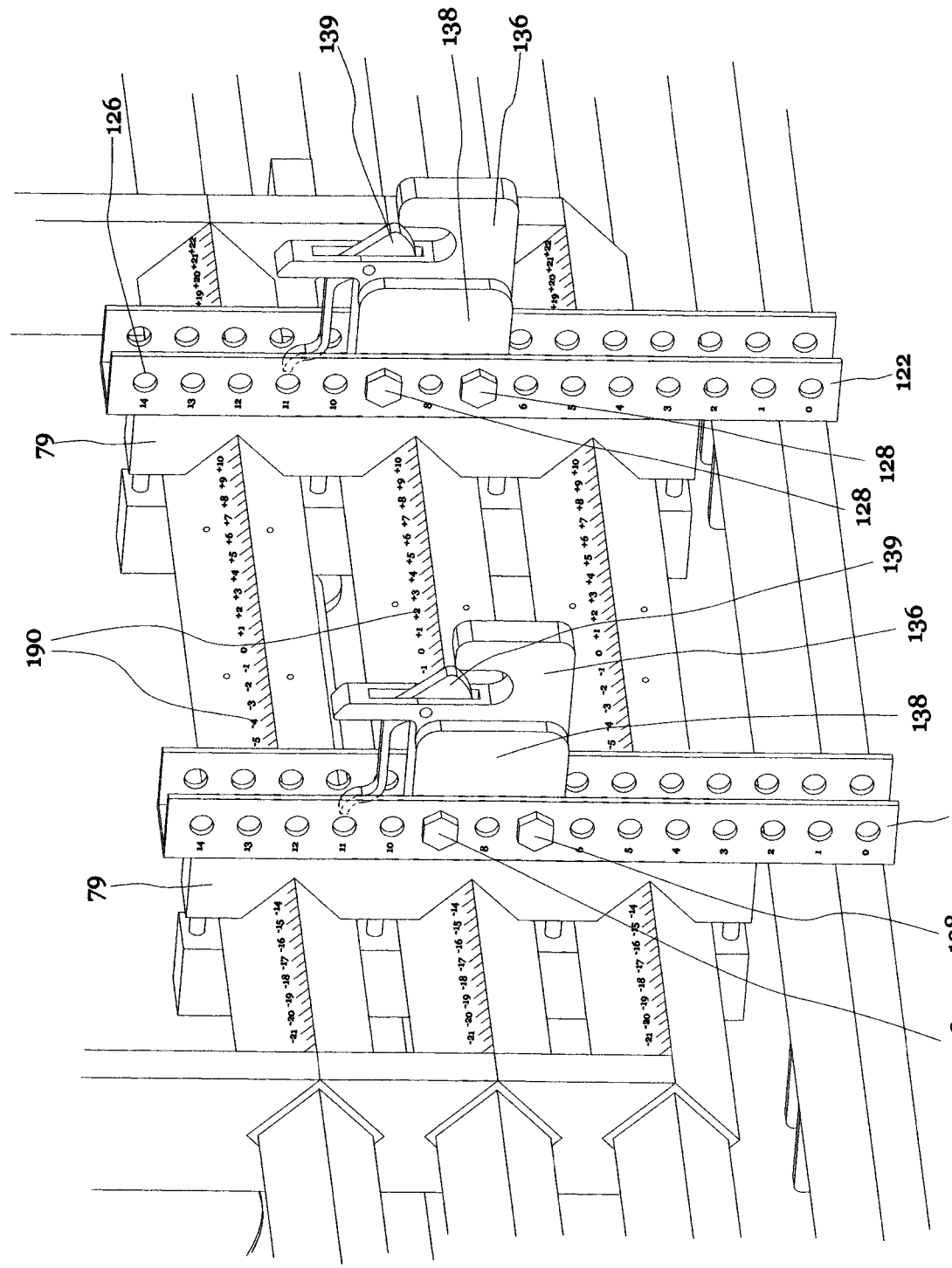

FIG. 18 is a perspective view showing the apparatus of FIG. 17 with a stand attaching to the outer vertical rigid frame support studs for removably supporting the connection apparatus of the present invention in a stored position;

FIG. 19 is a close-up perspective view of the implement-facing side of the sliding-frame bottom-link quick-hitch style connection point in a bolt-on channel configuration with a triple wrap-around bracket clamp and indicia.

Figure 19A:
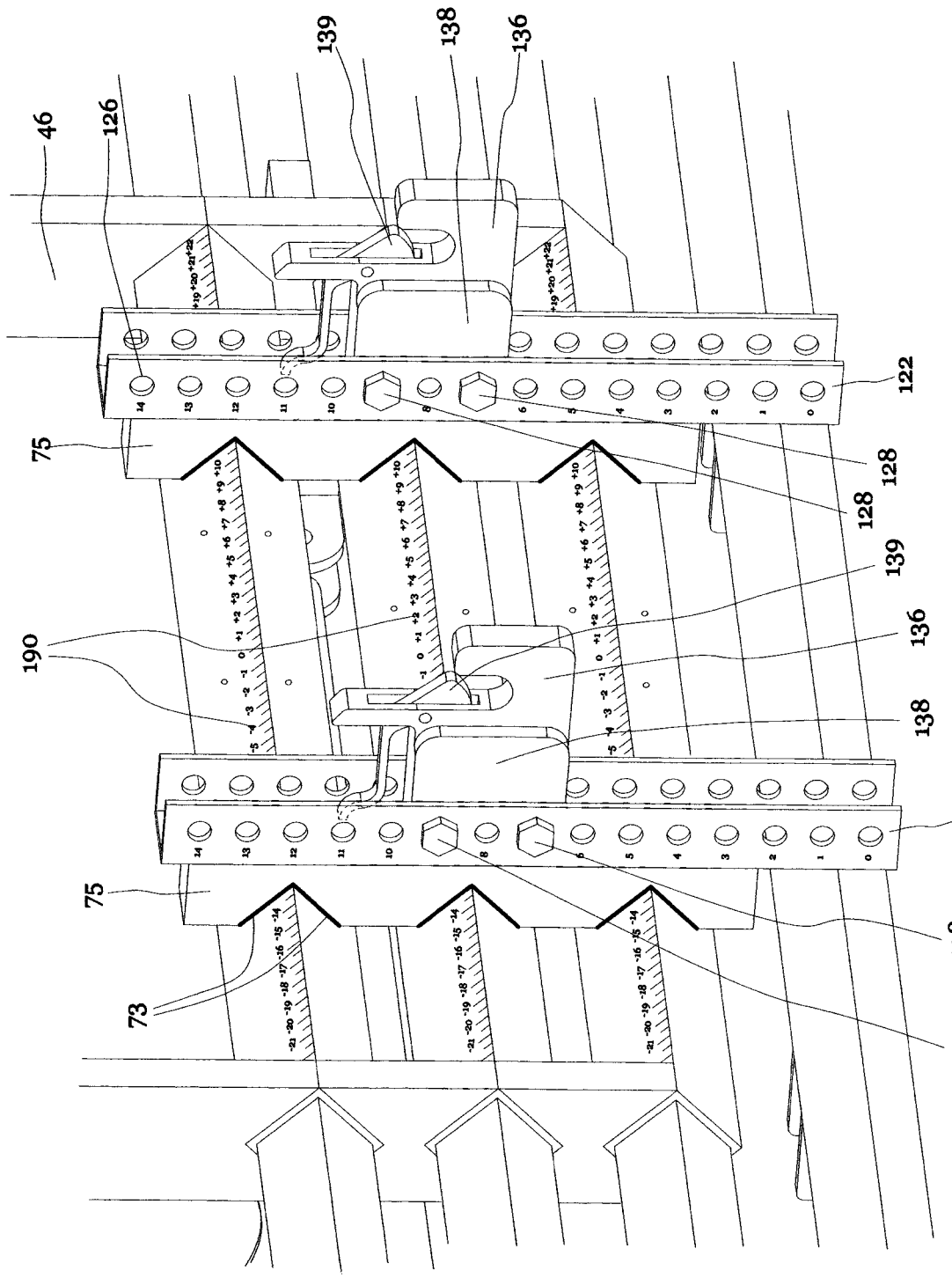

FIG. 19*a* shows the same apparatus of FIG. 19 using welds instead of clamp attachment support bases in place of triple wrap around bracket clamp.

Figure 20:
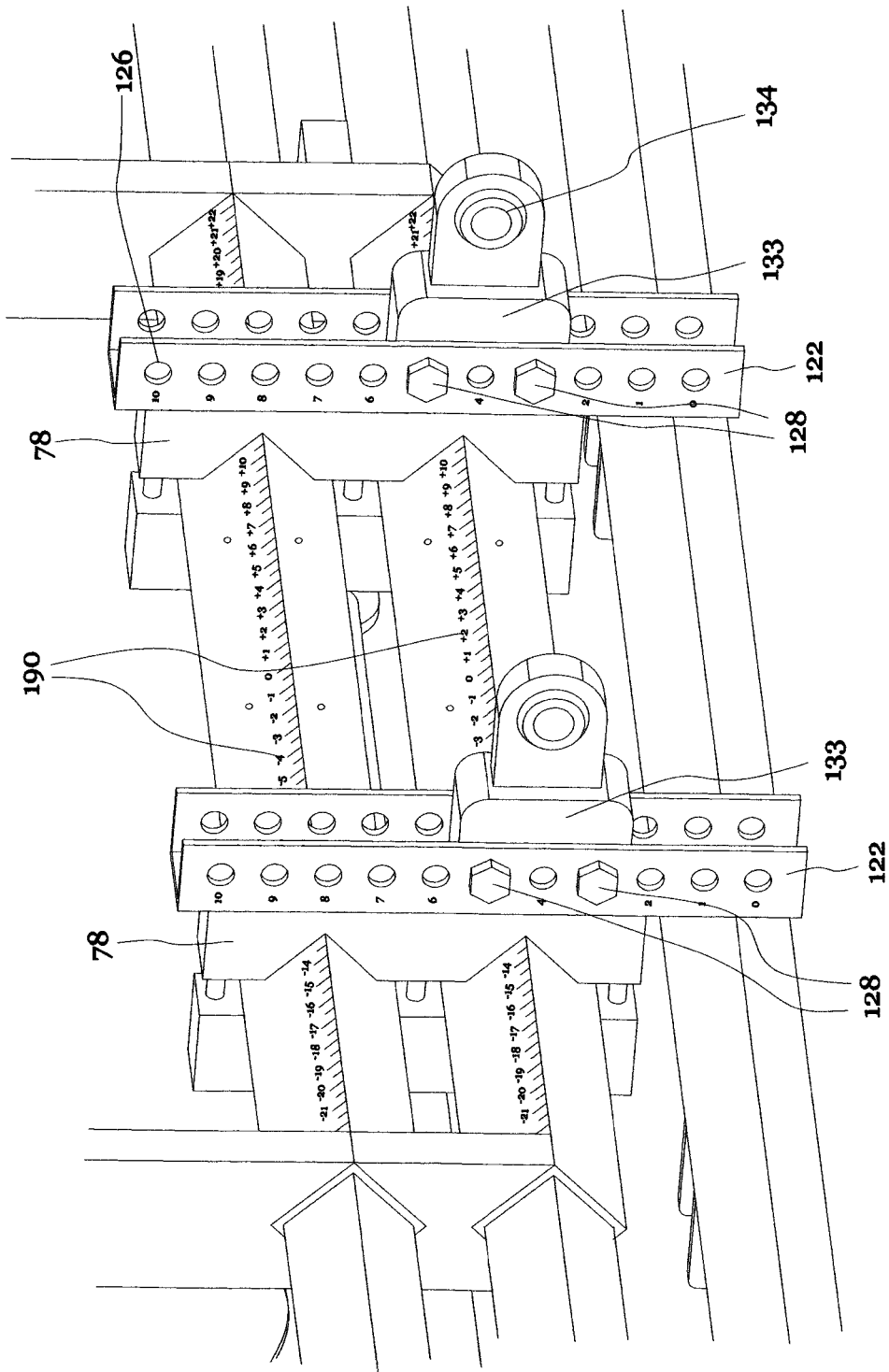

FIG. 20 is a close-up perspective view of an apparatus similar to that of FIG. 19 showing distal ball socket style connectors for connection to an implement.

Figure 21:
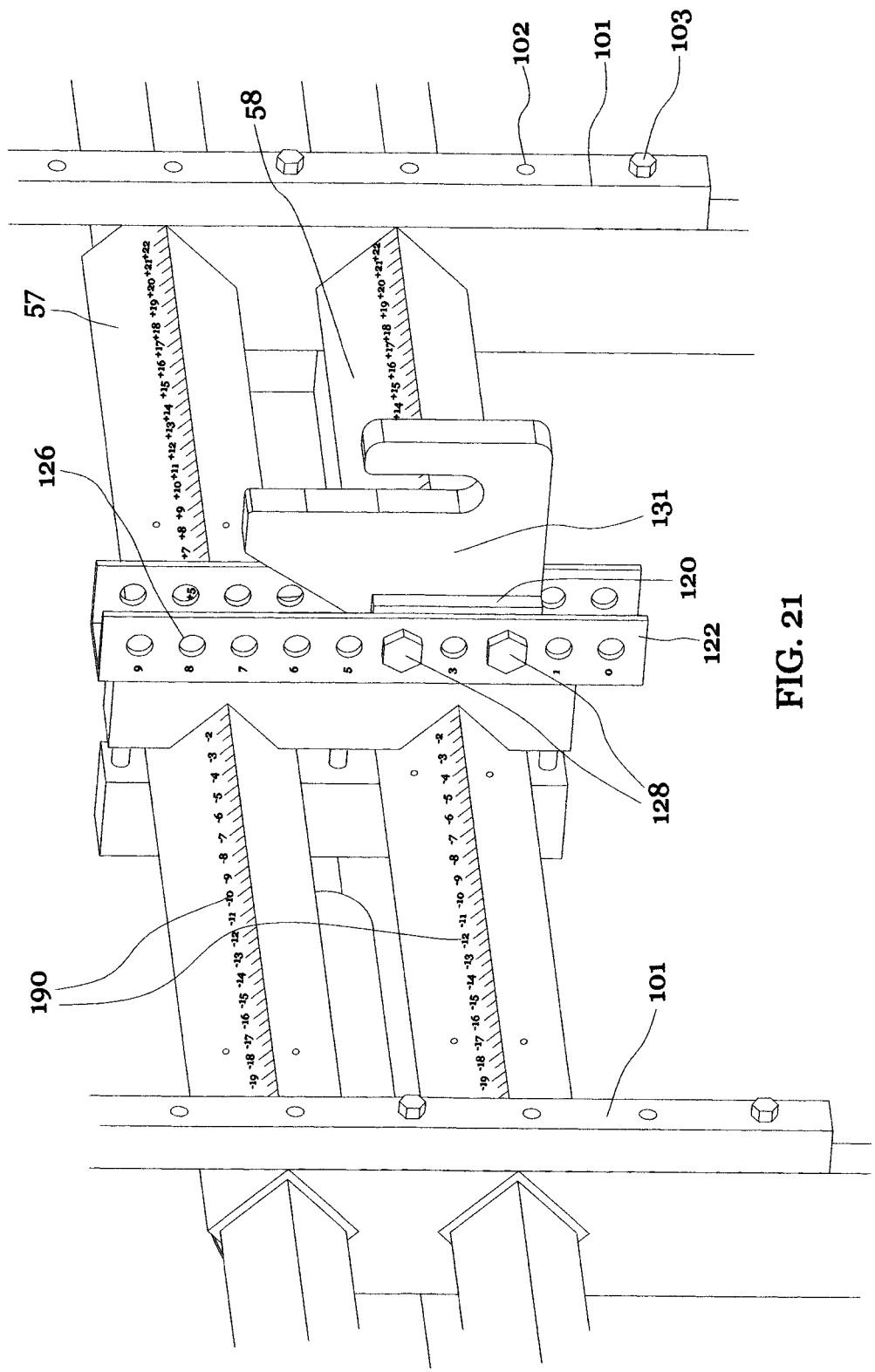

FIG. 21 is a close-up perspective view of the implement-facing side of the sliding frame top-link arm connection points in a bolt on channel configuration that connect to an implement, indicia markings on the sliding frame.

Figure 22:
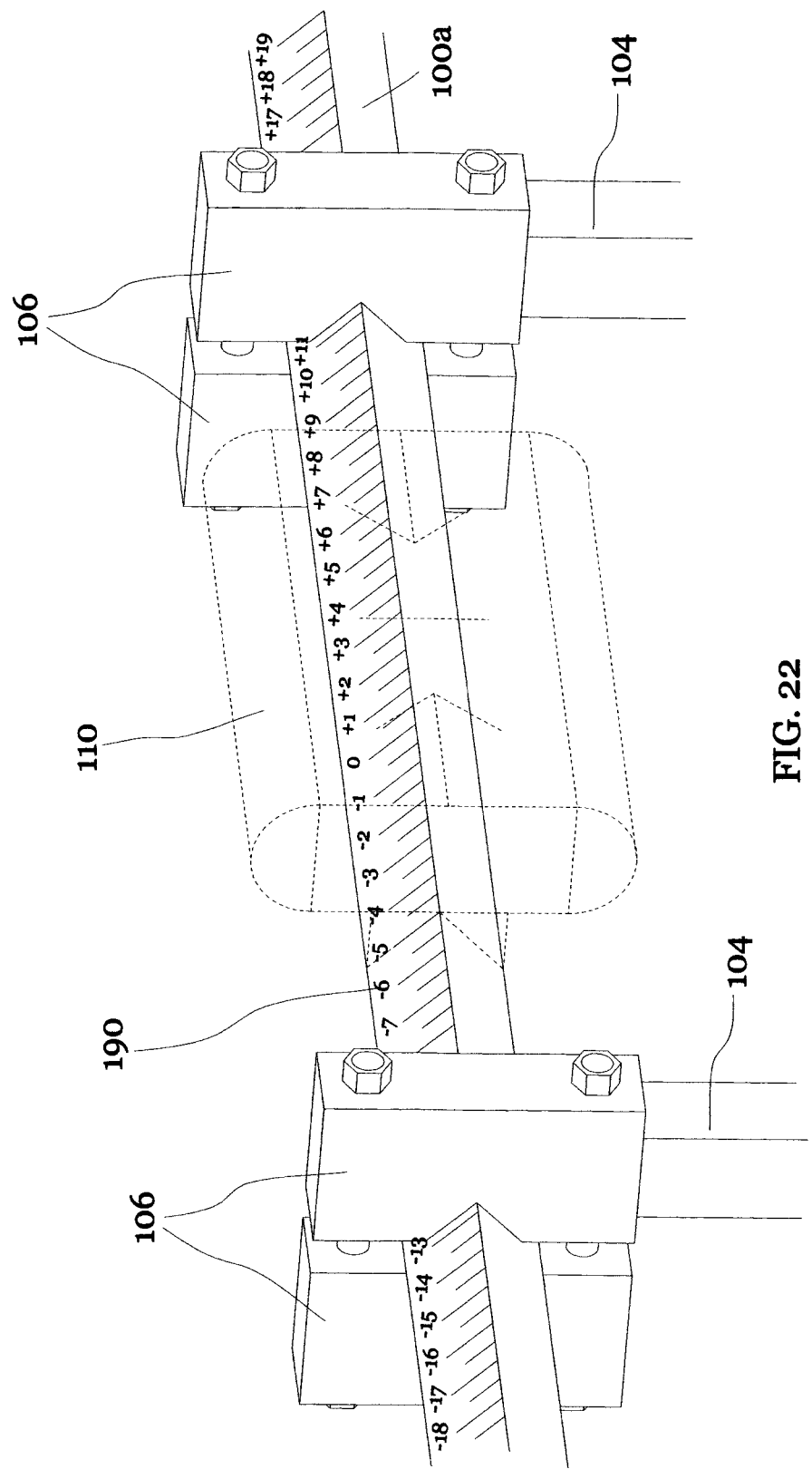

FIG. 22 is a close-up perspective view of an upper-mounted top-bar camera and lights carriage attachment to a top-bar with single-wrap around bracket clamps.

Figure 23:
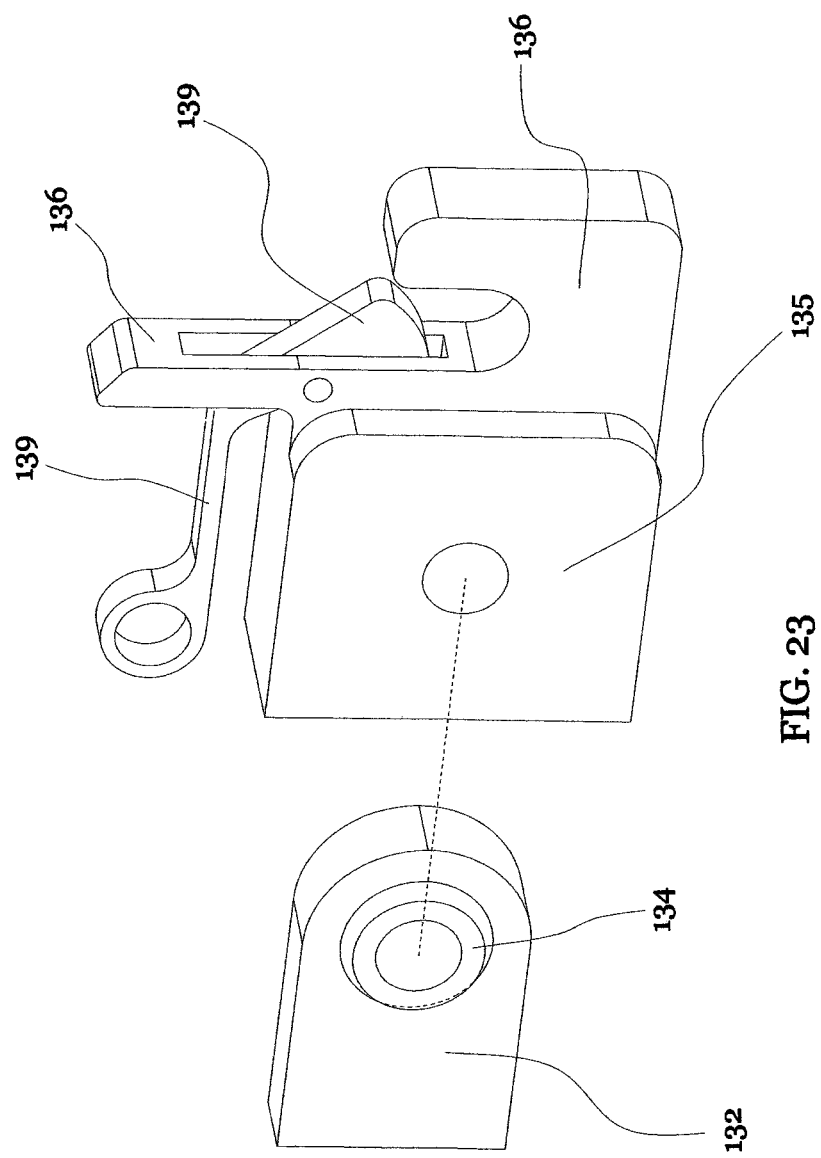

FIG. 23 is a close-up perspective view of the bar and distal ball socket style connection point of lower connection points of a three-point implement and a slip on quick-hitch style connection device as it would slip over and secure to the bar and distal ball socket style connection point as described in U.S. Pat. No. 7,059,419.

Figure 24:
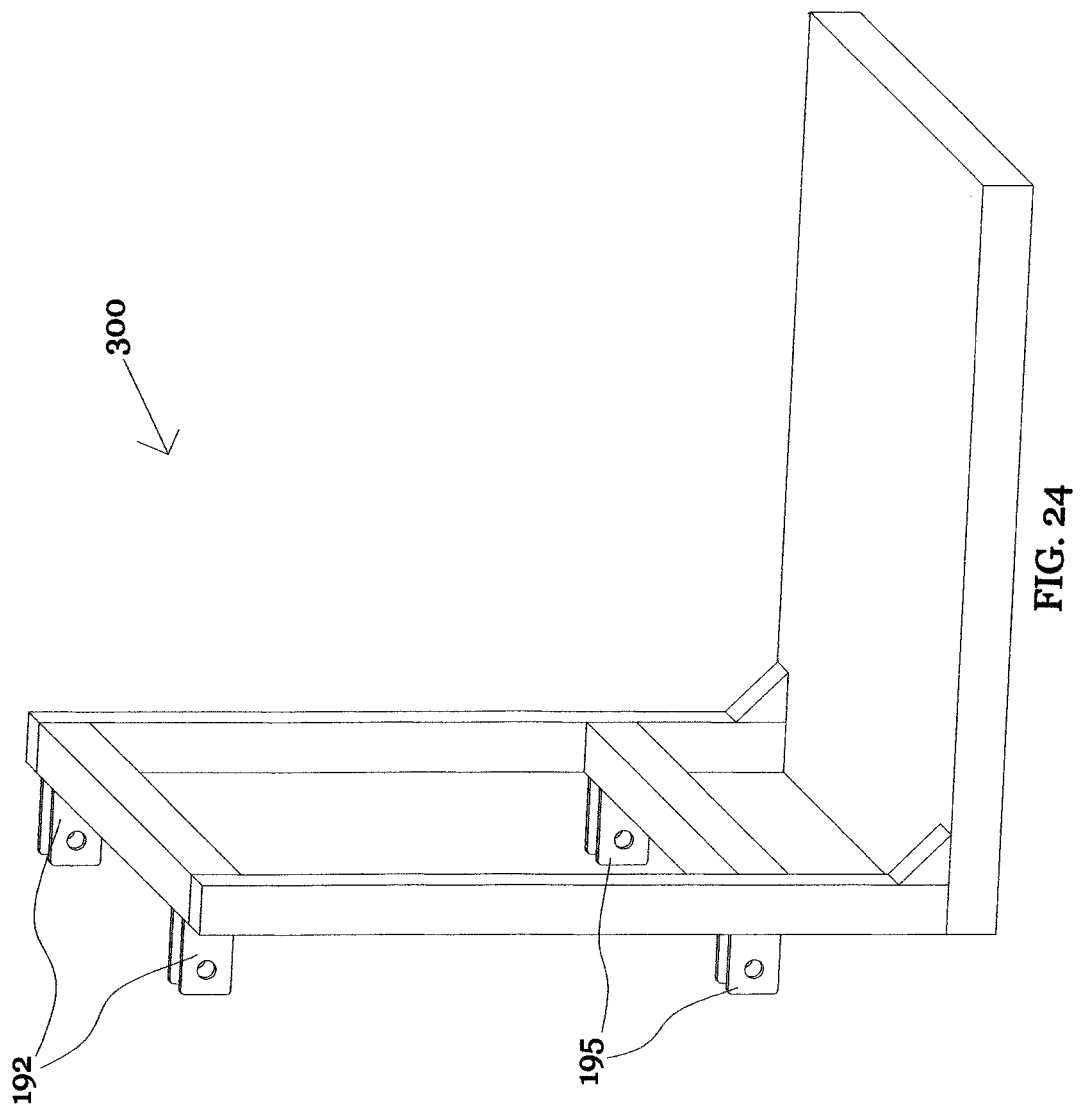

FIG. 24 is a perspective view of a Carry-All implement with a four-point hitch connection point configuration.

Figure 25:
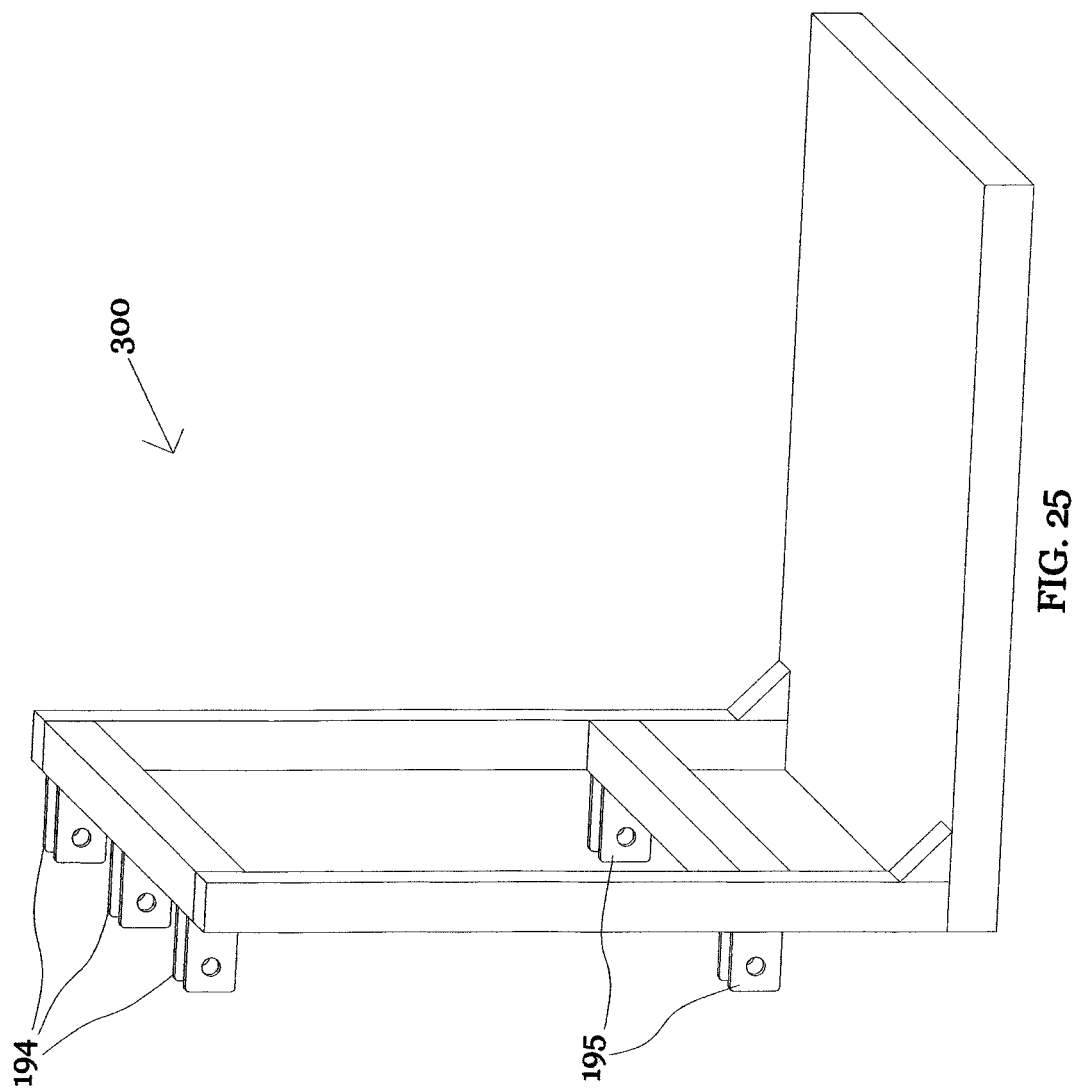

FIG. 25 is a perspective view of an implement that comprises a fifth connection point in the center of the top-link bar of a Carry-All implement useful with a three-point or a four-point implement connection.

Figure 7:
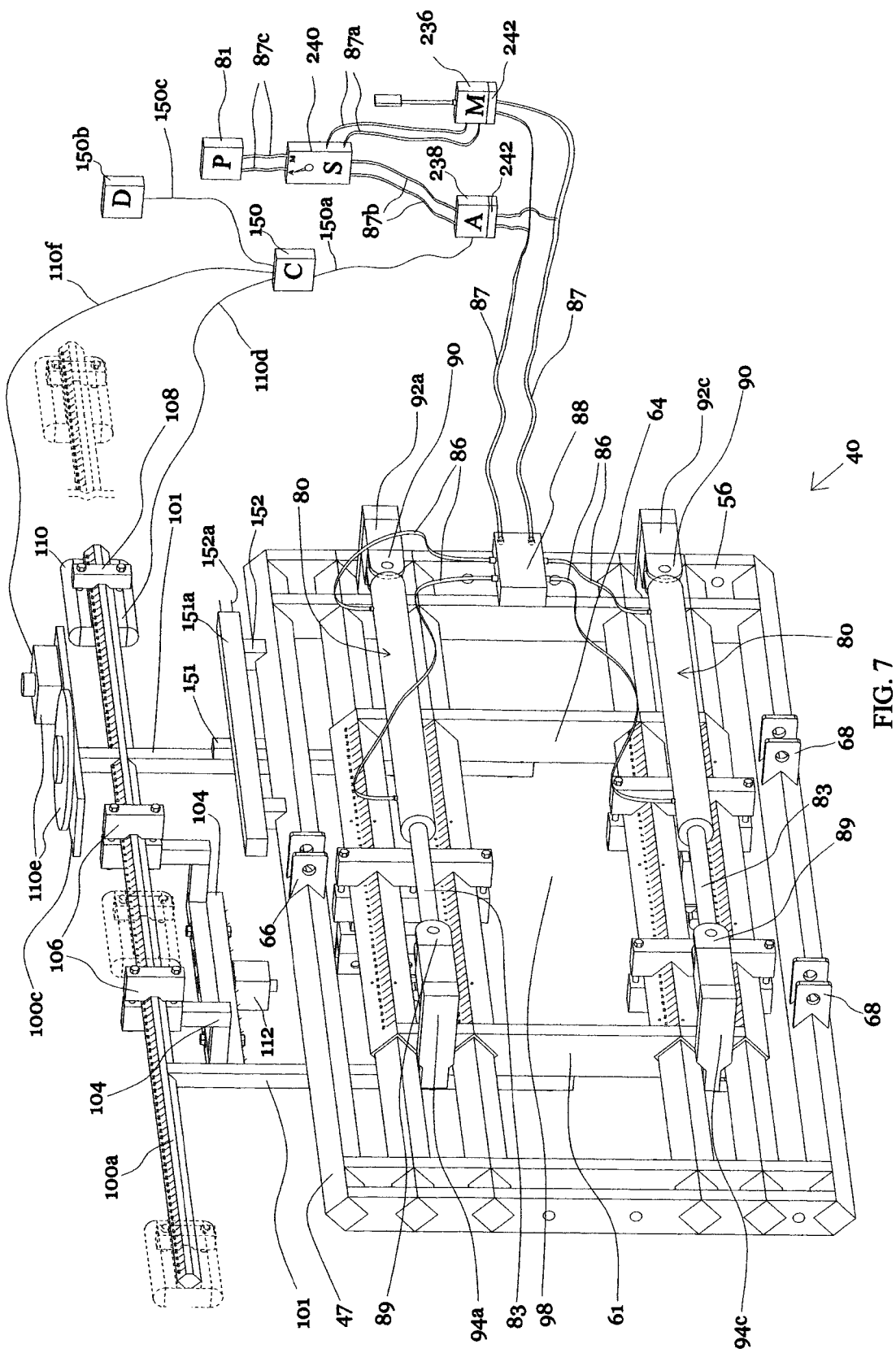
FIG. 7 is a perspective view of the mobile machinery-facing side of the apparatus of FIG. 6, with a double hydraulic cylinder mounting configuration, and an added top bar for additional accessories invention including added attachments for automatic and manual controls using laser or GPS equipment.
Figure 8:
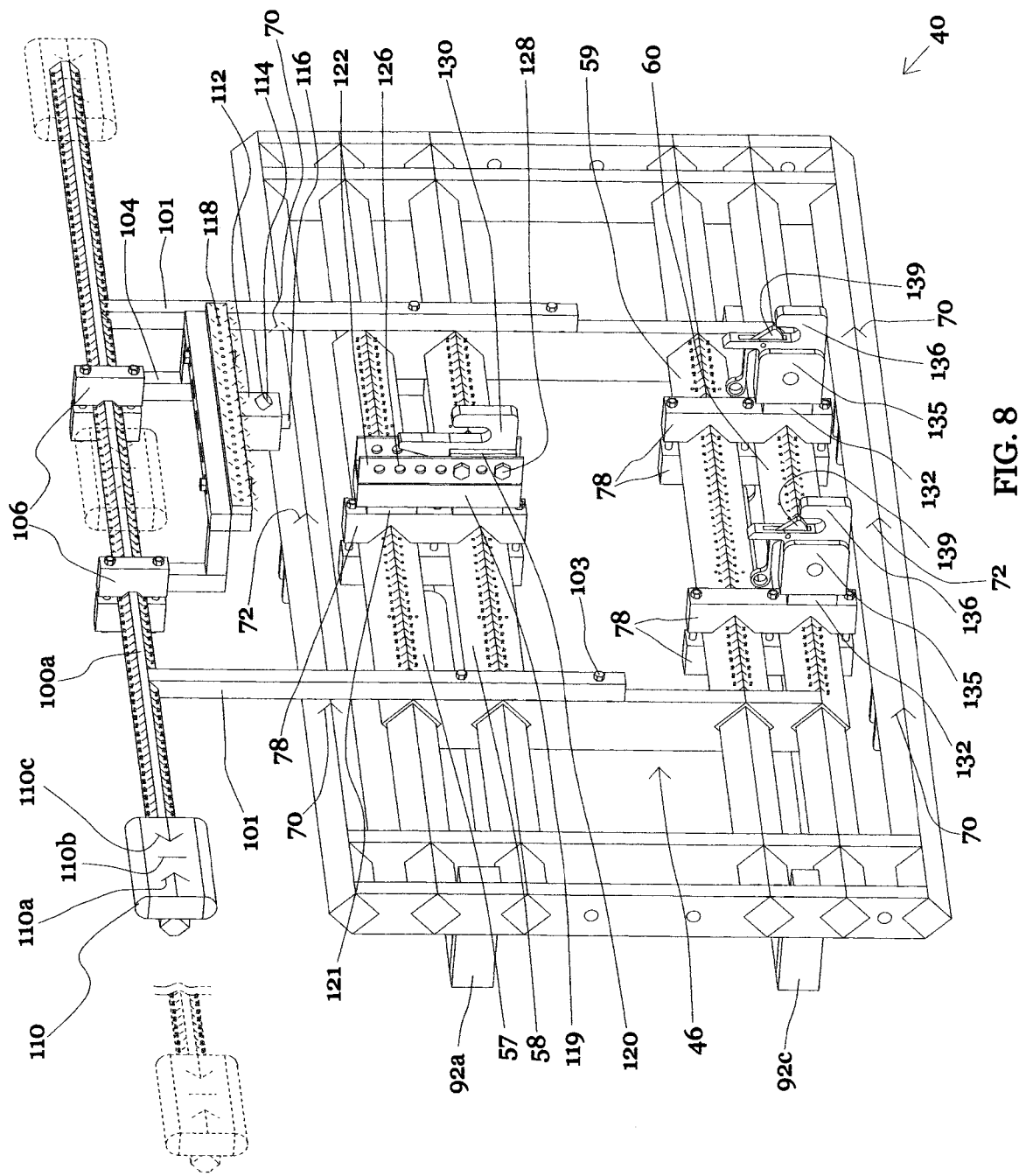
FIG. 8 is a perspective view of the implement-facing side of the apparatus of FIG. 7 showing attachment brackets to mount an implement, and accessories mounted on a top bar.
Figure 26:
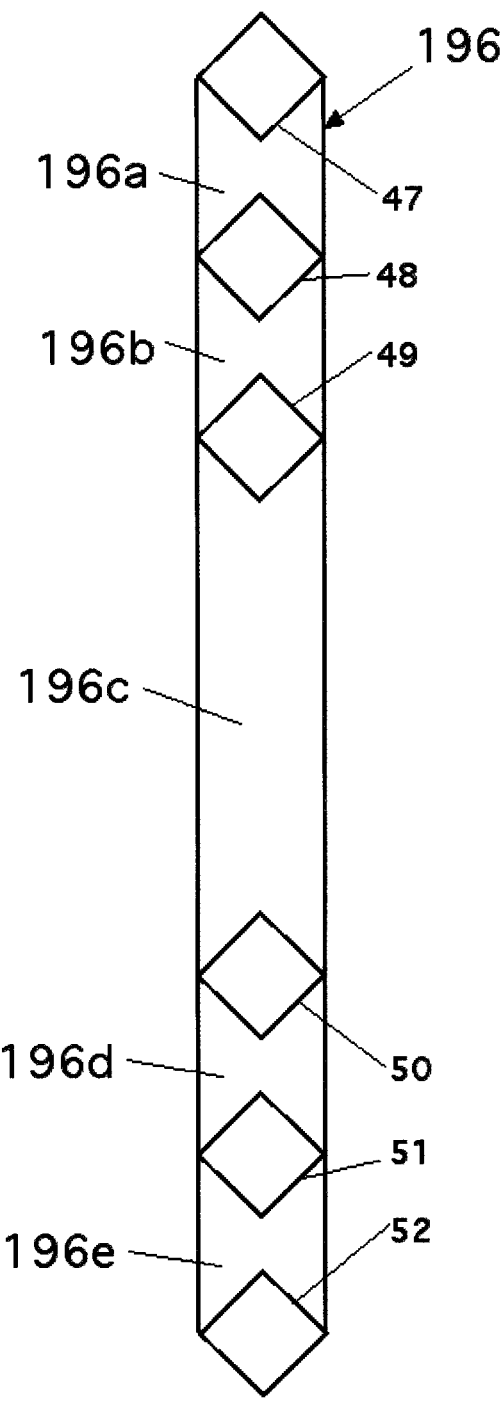
Figure 27:
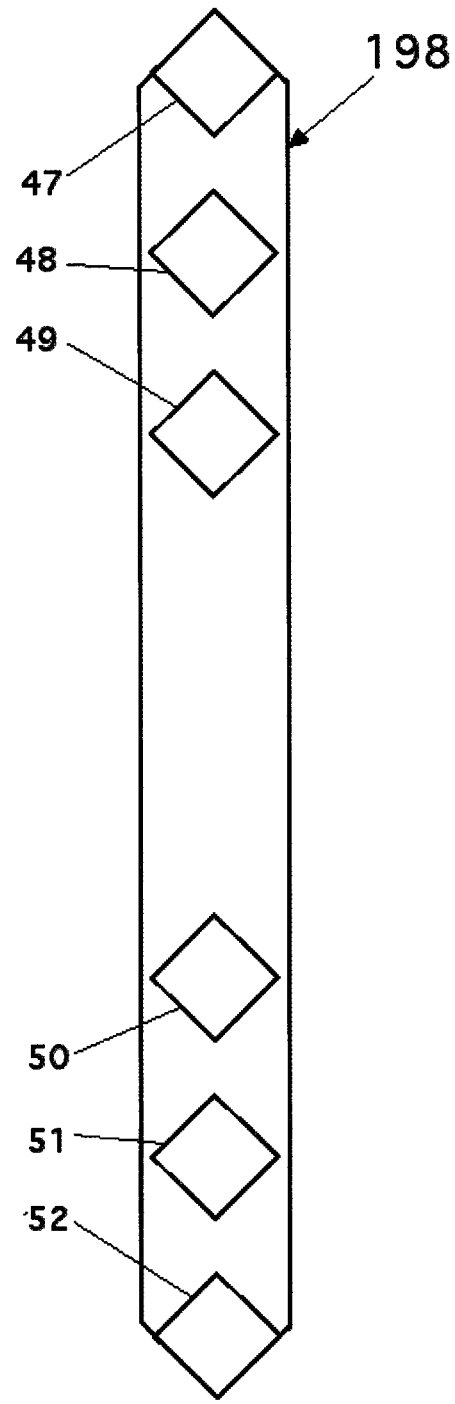

FIGS. 26 and 27 are side elevation views of a first framework suitable for use with the apparatus of FIGS. 7 and 8.

Figure 28:
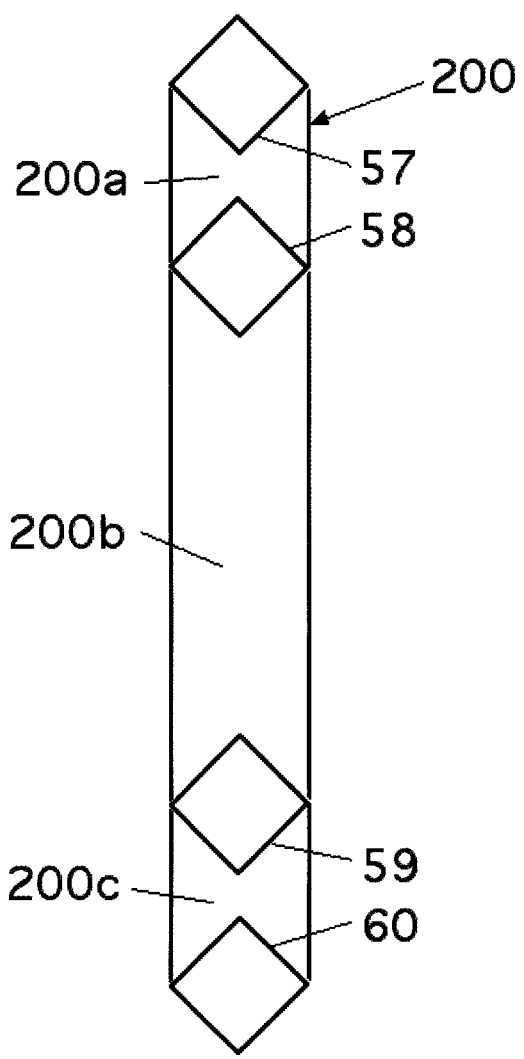
Figure 29:
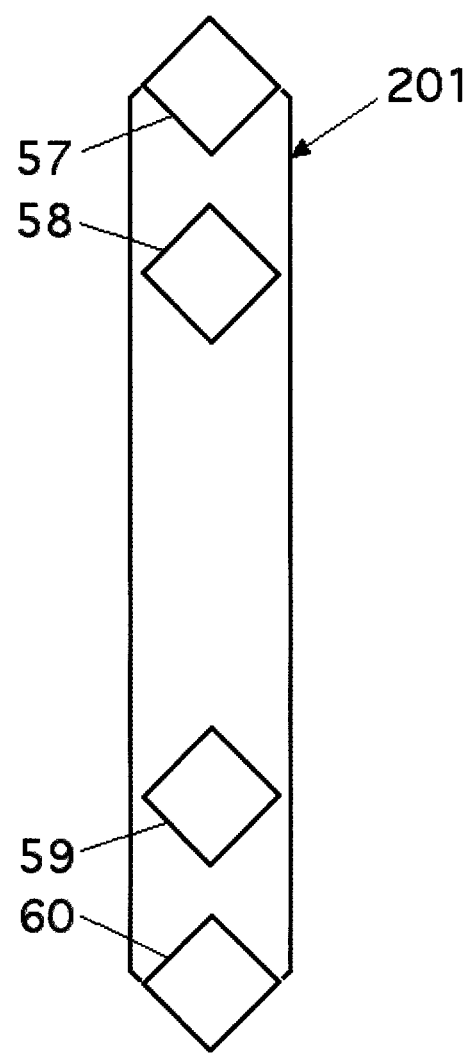

FIGS. 28 and 29 are side plan views of a second slidable framework suitable for use with the apparatus of FIGS. 7 and 8.

Figure 30:
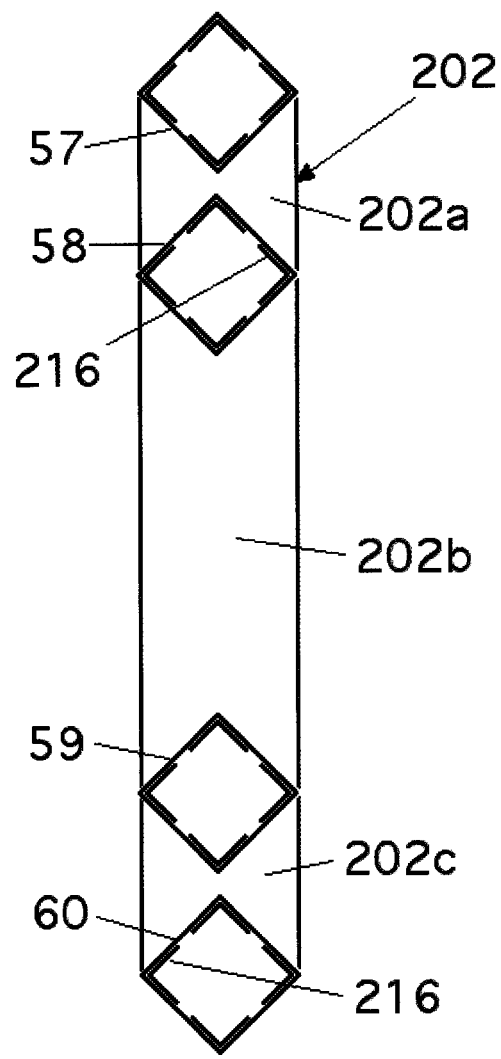
Figure 31:
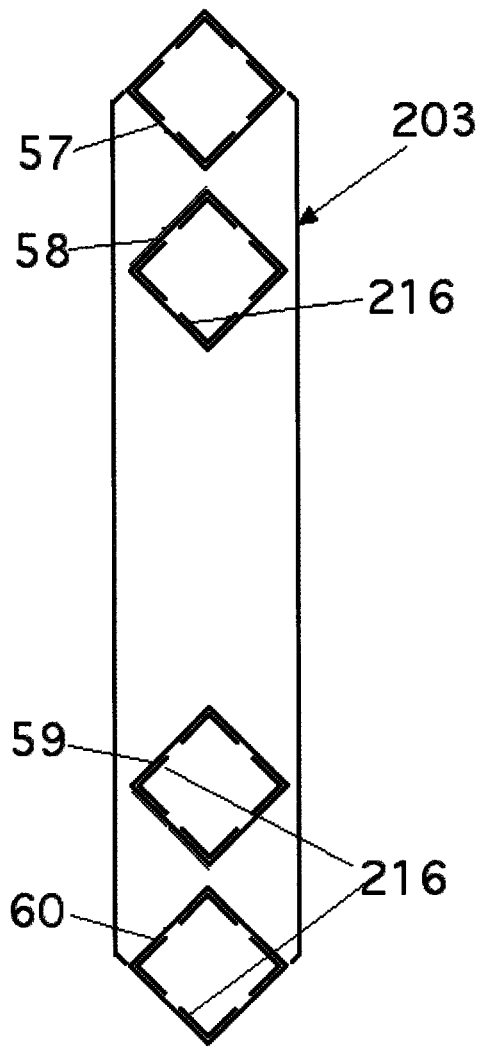

FIGS. 30 and 31 are side view of a slidable framework, with bearings, suitable for use with the apparatus of FIGS. 7 and 8.

Figure 32:
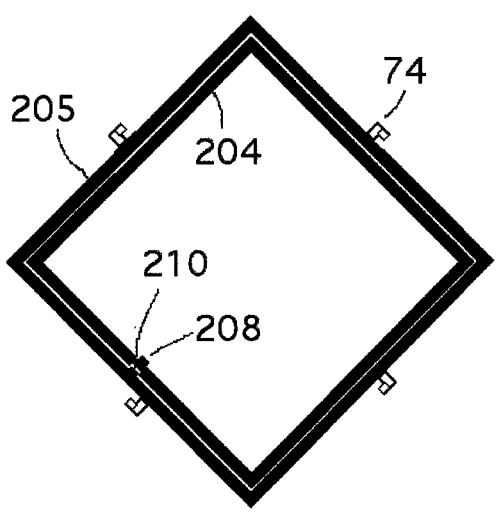
Figure 33:
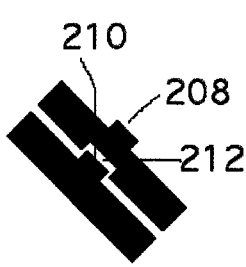

FIGS. 32, 34, 35, and 36 are side views of sleeves of the second framework and FIG. 33 is a close-up of weld seams of the sleeves.

FIG. 37 is a perspective view of needle bearing cages mounted to the interior of a slidably-mounted horizontal frame member, showing 50% of the needle bearings normally installed in the frame member for clarity of viewing.

FIG. 37*a* is a perspective view of sliding plates mounted to the interior of a slidably-mounted horizontal frame member.

FIG. 37*b* is a perspective view of ball bearing cages mounted to the interior of a slidably-mounted horizontal frame member.

FIG. 37*c* is a perspective view of needle bearing cages mounted to the interior of a slidably-mounted horizontal frame member.

Figure 38:
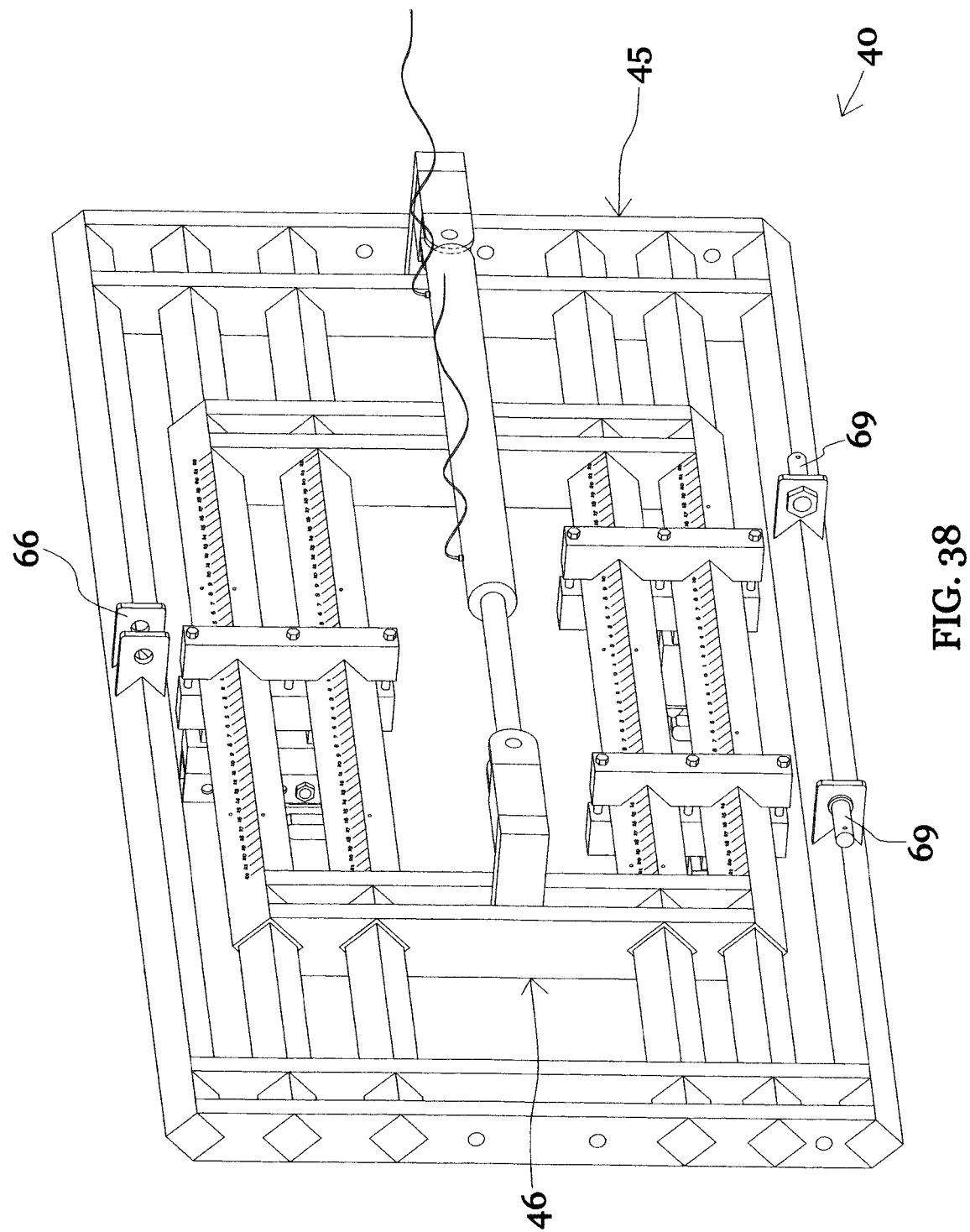

FIG. 38 is a perspective view of the mobile machinery facing side of an apparatus similar to that of FIG. 5, differing in having a rigidly-mounted frame two bottom-link attachments in a single plate and stud configuration that attach to a mobile machinery bottom-link arms of a three-point hitch.

Figure 39A:
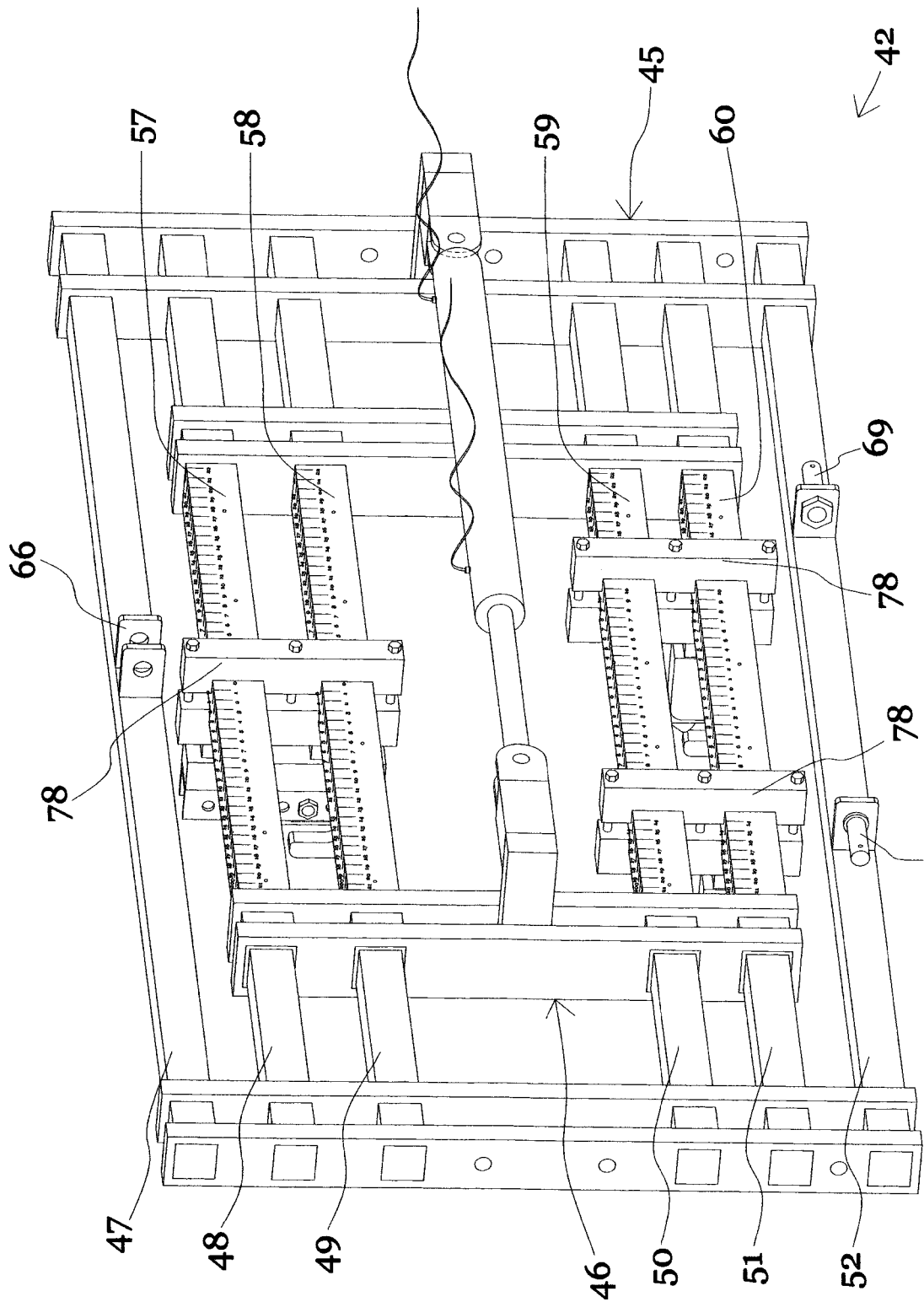
Figure 39B:
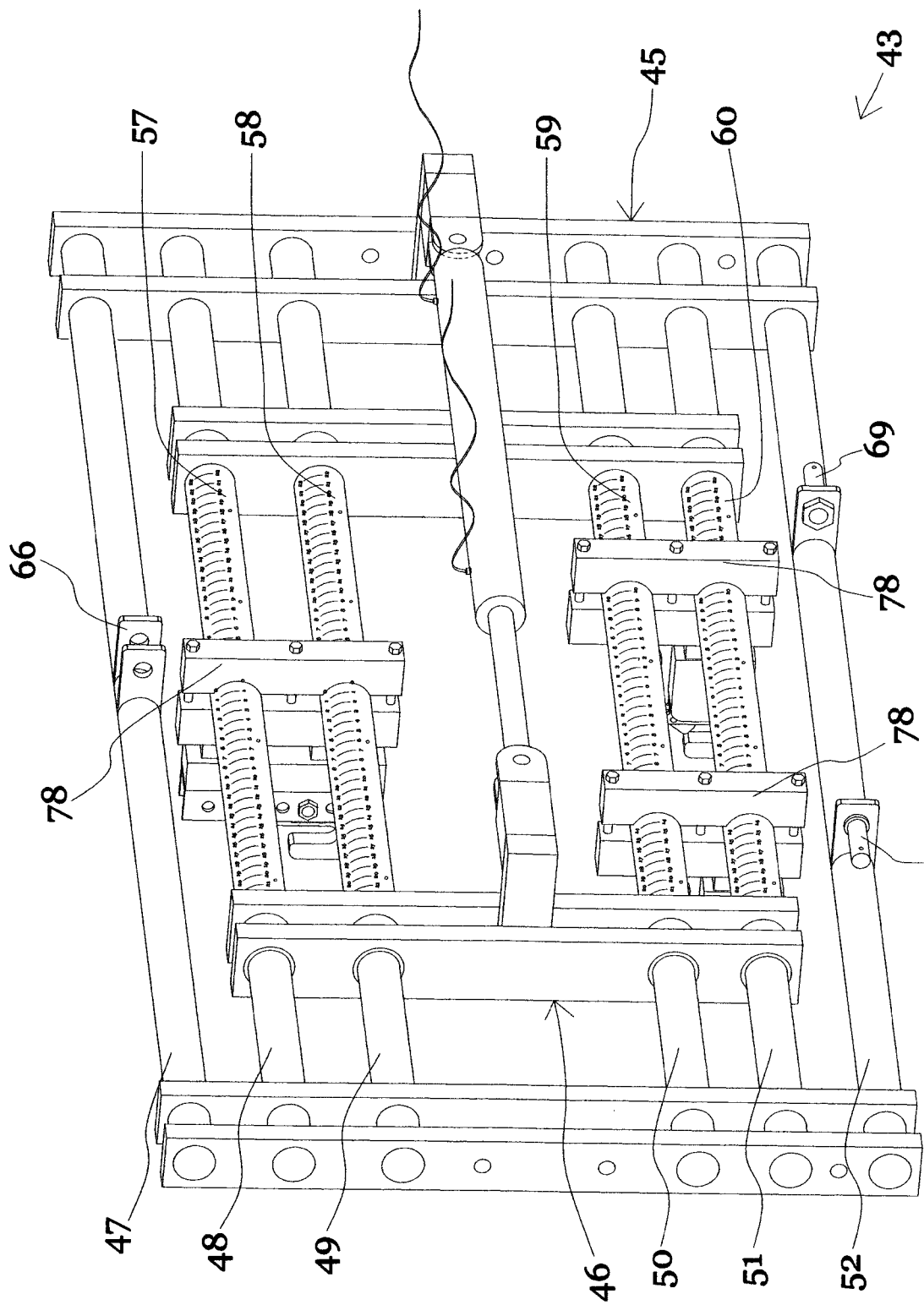

FIGS. 39*a* and 39*b* are perspective views of a third and fourth versions, respectively, of connecting apparatus according to the present invention, similar to that of FIG. 5 differing, in the cross-sectional configuration of the rails and sleeves.

Figure 39C:
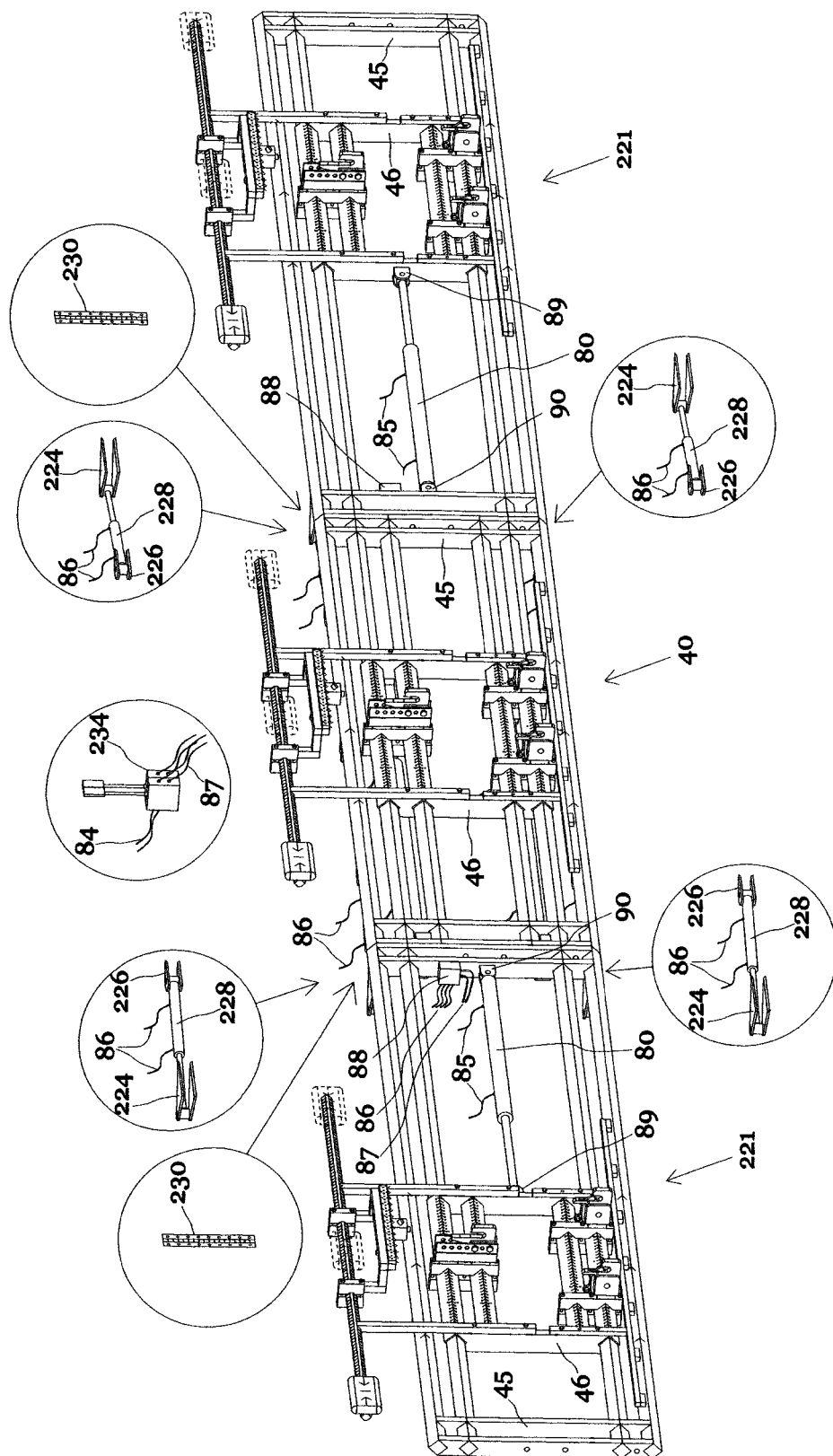

FIG. 39*c* is a perspective view of the implement side of a system for connecting multiple implements to a three-point hitch of mobile machinery.

DESCRIPTION

Reference Numerals

Figure 1A:
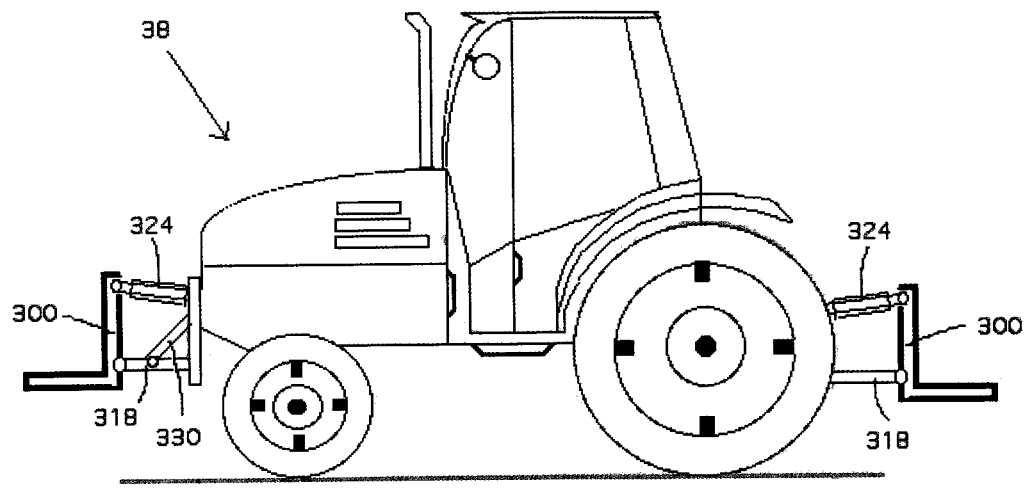
FIG. 1a is a side elevation view schematically showing a prior art tractor with a Carry-All implement mounted to the front and rear three-point hitches of a tractor.

For the convenience of the reader, the following is a list of reference numbers used in this description:
38 Tractor
40 First connecting apparatus
41 Second connecting apparatus, (compact-design)
42 Third connecting apparatus, (square horizontal frame members)
43 Fourth connecting apparatus, (round horizontal frame members)
45 Rigidly-mounted base frame, also referred to a first framework
46 Slidably-mounted frame, also referred to as second framework
47 Upper cross beam of first framework
48-51 Rails of first framework
52 Lower cross beam of first framework
53 Outer stud of first framework
54 Inner stud of first framework
55 Inner stud of first framework
56 Outer stud of first framework
57 Sliding-frame horizontal frame sleeve, upper
58 Sliding-frame horizontal frame sleeve, upper
59 Sliding-frame horizontal frame sleeve, lower
60 Sliding-frame horizontal frame sleeve, lower
61 Sliding-frame vertical frame post, outer
62 Sliding-frame vertical frame post, inner
63 Sliding-frame vertical frame post, inner
64 Sliding-frame vertical frame post, outer
66 Rigid-frame top-link attachment, tractor facing side
68 Rigid-frame bottom-link attachments, tractor facing side, double plate and pin
69 Rigid-frame bottom-link attachments, tractor facing side, single plate and stud
70 Rigid-frame alignment mark (edge), also referred to as positioning indicia
72 Rigid-frame alignment mark (center), also referred to as positioning indicia
73 Weld connection
74 Grease fitting
75 Connection support base
76 Single wrap-around bracket clamp
78 Double wrap-around bracket clamp
79 Triple wrap-around bracket clamp
80 Driver, hydraulic cylinder and piston assembly, double action, or electric actuator
81 Hydraulic Pump (Normally tractor mounted)
82 Hydraulic cylinder housing
83 Hydraulic cylinder piston arm
84 Hydraulic fluid line from hydraulic control valve to hydraulic power supply
85 Hydraulic fluid line from hydraulic cylinder to hydraulic control valve
86 Hydraulic fluid line from hydraulic cylinder to hydraulic flow divider
87 Hydraulic fluid line from hydraulic flow divider to hydraulic control valve
87a Hydraulic fluid line from manual hydraulic control valve to hydraulic valve selector switch
87b Hydraulic fluid line from automatic hydraulic control valve to hydraulic valve selector switch
87c Hydraulic fluid line from hydraulic valve selector switch to the hydraulic pump
88 Hydraulic fluid flow divider
89 Hydraulic cylinder attachment bracket to piston arm
90 Hydraulic cylinder attachment bracket to cylinder housing
92a Hydraulic cylinder brace to rigid-frame (centered on a plane between 48 and 49)
92b Hydraulic cylinder brace to rigid-frame (centered on a plane between 49 and 50)
92c Hydraulic cylinder brace to rigid-frame (centered on a plane between 50 and 51)
94a Hydraulic cylinder brace to sliding-frame, (centered on a plane between 57 and 58)
94b Hydraulic cylinder brace to sliding-frame, (centered on a plane between 58 and 59)
94c Hydraulic cylinder brace to sliding-frame, (centered on a plane between 59 and 60)
98 Pathway for a power take off ("PTO") driveline from the tractor to the implement
100a Top-bar first bar (lower)
100b Top-bar second bar (upper)
100c Top-bar plate (upper)
101 Top-bar mounting legs
102 Top-bar mounting leg pre-drilled hole
103 Top-bar mounting leg bolt
104 Top-bar camera and lights carriage
105 Top-bar mounting legs extension
106 Top-bar single-wrap around bracket
108 Laser receiver mounting bracket
110 Laser receiver
110a Laser receiver left alignment indicator
110b Laser receiver center alignment indicator
110c Laser receiver right alignment indicator
110d Laser receiver signal line
110e GPS antenna and receiver module
110f GPS module wire to controller
111 Wide laser receiver
111a Wide laser receive left alignment indicator
111b Wide laser receiver center alignment indicator
111c Wide laser receiver-right alignment indicator
112 Top-bar camera housing
113 Top-bar camera data transfer wire
114 Top-bar camera rear
116 Top-bar camera down
117 Top-bar camera monitor
118 Top-bar LED light fixture
119 Top-link channel back spacer
120 Top-link channel side spacer
121 Top-link bracket spacer
122 Adjustable mounting channel
126 Adjustable mounting channel mounting hole
128 Channel mounting bolt and nut
130 Sliding-frame Top-link hook and stop bar
131 Sliding-frame Top-link hook and stop bar forward extending connector
132 Sliding-frame Bottom-link mounting arm and ball socket
133 Sliding-frame Bottom-link mounting arm and ball socket, bolt-on
134 Sliding-frame Bottom-link mounting arm ball socket and rotatable ball with axial hole
135 Sliding-frame Bottom-link quick-hitch slip-on housing, U.S. Pat. No. 7,059,419
136 Sliding-frame Bottom-link quick-hitch hook and stop bar
137 Sliding-frame Bottom-link mounting arm and ball socket extended length
138 Sliding-frame Bottom-link quick-hitch bolt-on housing with hook and latch 139 Sliding-frame Bottom-link quick-hitch latch and lever with grab shape
140 Bottom-bar
141 Guidance wire
142 Bottom-bar mounting legs
143 Signal generator for guidance wire
144 Bottom-bar sensor or camera
144a Bottom-bar sensor or camera signal wire
145 Gauge mounting plate
146 Viewable gauge level measurement
147 Viewable gauge plumb measurement
148 Auto-sensor gauge level measurement
149 Auto-sensor gauge plumb measurement
150 Driver controller
150a Driver controller output signal
150b Data entry monitor
150c Data wire
151 Position sensor, sliding frame mounted
151a Position sensor bar, first frame mounted
151b Position sensor signal, sliding frame mounted
151c Position sensor bar signal, first frame mounted
152 Position sensor bar attachment brackets, first frame mounted
152a Position sensor bar electrical wires, first frame mounted
152b Position sensor electrical wires, sliding frame mounted
153 Auto-steer controller
153a Auto-steer controller signal
153b Auto-steer device
153c Auto-steer controller on-off switch
153d Auto-steer operator's visual screen
153e Auto-steer operator's visual screen signal
154 Implement position sensor or camera
155 Four-point implement connection in a double-link top-link configuration
156 Sliding-frame horizontal support member diamond (upper)
158 Sliding-frame horizontal support member diamond (lower)
160 Sliding-frame horizontal support member square (upper)
162 Sliding-frame horizontal support member square (lower)
164 Stand mounting holes in frame member
165 Stand
166 Stand center member
168 Stand support member
169 Stand base member
170 Stand to rigid-frame mounting stud
171 Stand to rigid-frame mounting stud clip
172 Rigid-frame horizontal member/upper/forward positioned
174 Rigid-frame horizontal member/lower/forward positioned
176 Rigid-frame vertical stud, outer, forward positioned
178 Rigid-frame vertical stud, outer, forward positioned
180 Rigid-frame vertical stud, outer, shortened
182 Rigid-frame vertical stud, inner, shortened
184 Rigid-frame vertical stud, inner, shortened
186 Rigid-frame vertical stud, outer, shortened
188 Rigid-frame brace to forward mount horizontal frame member
190 Indicia Markings, also referred to as positioning indicia
192 Implement top-link attachments for four point design
194 Implement top-link attachments for four-point or three-point design
195 Implement bottom-link flanges for pin
196 Rigid-frame vertical member narrow design
196a Rigid-frame vertical segment between horizontal frame members 47 and 48
196b Rigid-frame vertical segment between horizontal frame members 48 and 49
196c Rigid-frame vertical segment between horizontal frame members 49 and 50
196d Rigid-frame vertical segment between horizontal frame members 50 and 51
196e Rigid-frame vertical segment between horizontal frame members 51 and 52
198 Rigid-frame vertical member wide design
200 Sliding-frame vertical member narrow design (no bearing clearance)
200a Sliding-frame vertical segment between horizontal frame member 57 and 58
200b Sliding-frame vertical segment between horizontal frame member 58 and 59
200c Sliding-frame vertical segment between horizontal frame member 59 and 60
201 Sliding-frame vertical member wide design (no bearing clearance)
202 Sliding-frame vertical member narrow design (with bearing clearance)
202a Sliding-frame vertical segment between horizontal frame member 57 and 58
202b Sliding-frame vertical segment between horizontal frame member 58 and 59
202c Sliding-frame vertical segment between horizontal frame member 59 and 60
203 Sliding-frame vertical member wide design (with bearing clearance)
204 Rigid-frame horizontal frame member rail
205 Sliding-frame horizontal sleeve sized for minimal clearance
206 Sliding-frame horizontal sleeve sized for sliding plate or bearing clearance
208 Rigid-frame horizontal member weld seam
210 Sliding-frame horizontal member weld seam
212 Rigid-frame horizontal member notch
214 Sliding plates ninety degree V style with perforations
216 Roller cage double raceway ninety degree V style with needle bearings
218 Roller cage double raceway ninety degree V style with ball bearings
220 Bearing cap collar
221 Wing section frames
222 Bearing cage edge
224 Attachment hardware for pivoting action hydraulic cylinder on wing section frame
226 Attachment hardware for pivoting action hydraulic cylinder on center section frame
228 Hydraulic cylinder, dual action providing wing frame pivoting action
230 Piano hinge
234 Manual hydraulic control valve, dual action, dual valve with levers, tractor mounted
236 Manual hydraulic control valve, dual action, single valve with lever, tractor mounted
238 Automatic hydraulic control valve, dual action, controlling the driver
240 Hydraulic option valve switch (between automatic and manual)
242 Hydraulic power receptacle, dual quick connect couplers
244 Electric power receptacle
246 Manual electric switch for driver control 248 Automatic electric switch for driver control
250 Electric option switch to switch between manual and automatic
300 Implement, Carry-All
310 Implement top-link connecting pin
312 Implement top-link attachment brackets
314 Implement bottom-link attachment brackets or mounting studs
316 Bottom-link arms connection points to tractor
318 Bottom-link arms
320 Bottom-link arms connection to implement
322 Top-link arm connection to tractor
324 Top-link arm
326 Top-link arm connection to implement
328 Lift-link arms connection to tractor lift arms
330 Lift-link arms
332 Lift-link arms connection to bottom-link arms
334 Stabilizer arms connection to tractor
336 Stabilizer arms
338 Stabilizer arms connection to bottom-link arm
340 Top-link attachment bracket mounted on tractor FIG. 1a shows the positions of a front and rear three-point hitch as they are combined with a tractor 38 in the prior art. This side view shows a Carry-All implement 300 mounted to the front and rear three-point hitches of a tractor 38. Shown are the three points of attachment of a three-point hitch to the Carry-All implement 300 using two bottom-link attachment arms 318 and a top-link attachment arm 324. Two bottom link attachment arms 318 (see FIG. 2) are generally positioned on the same horizontal plane unless an application of use requires otherwise. Lift link arms 330 are visible on the front three-point hitch while not being visible on the rear three-point hitch being hidden by the larger rear tires. In many faming and excavating instances a rear three-point hitch is used by itself without a front three-point hitch being attached to the tractor 38. Using a combined front and rear three-point hitch can increase the efficiency of the farming or excavation application if used properly.

Figure 1B:
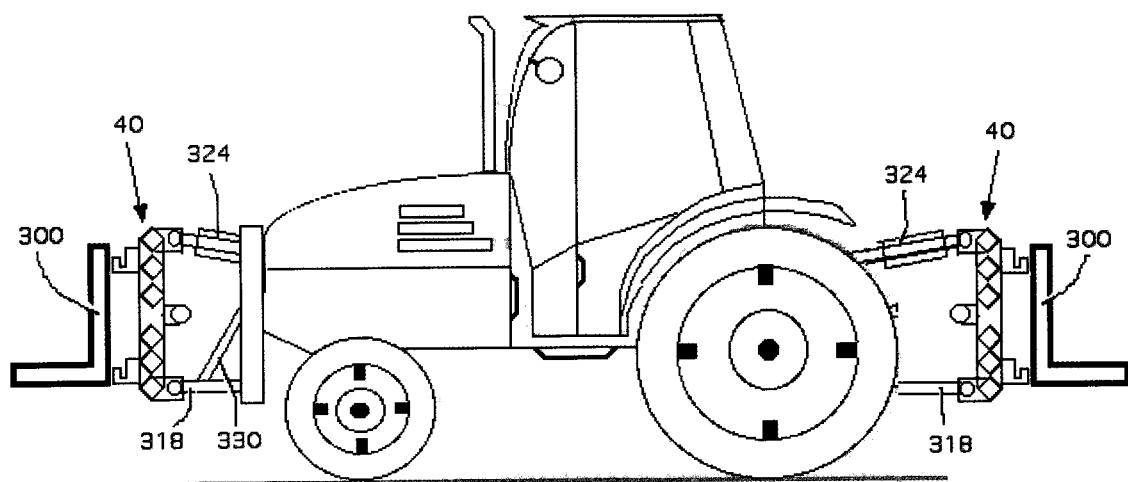
FIG. 1b is a side elevation view schematically showing the tractor of FIG. 1a with an apparatus according to the present invention mounted to the front and rear three-point hitches of a tractor with a Carry-All implement mounted to the present invention at both locations.

FIG. 1b shows schematically a system according to the present invention comprising a first connecting apparatus 40 attached to the front and rear three-point hitches of a tractor in addition with the Carry-All implement 300 mounted to the first connecting apparatus 40 at front and rear locations. The connection apparatus 40 mounts first to the three-point hitch of the tractor and the Carry-All implement 300 next mounts to the connection apparatus 40.

Figure 1C:
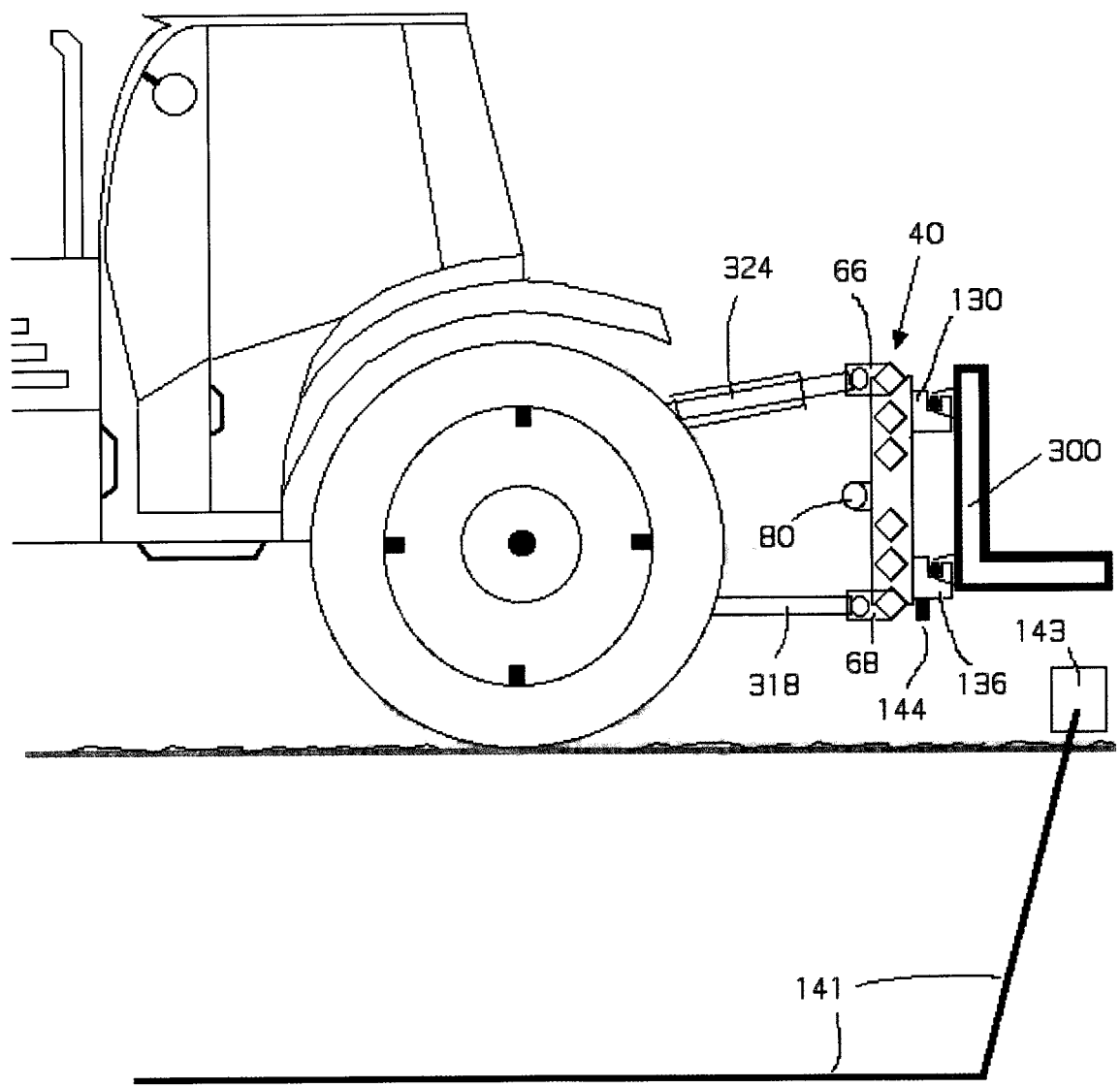
FIG. 1c is a close-up side view showing the rear portion of the tractor of FIG. 1b with guidance features schematically shown.

FIG. 1c shows a close-up side view showing a tractor with the connection apparatus 40 mounted to the rear three-point hitch of a tractor with the prior art Carry-All implement 300 mounted to the connection apparatus showing top-link arm 324 attaching to the rigid-frame top-link attachment 66, and the bottom link arms 318 attaching to the rigid-frame bottom-link connection points 68 of the connection apparatus 40. Sliding frame bottom-link quick hitch hook and stop bar 136 attaches the lower portion of the Carry-All implement 300 to the sliding-frame 46 and sliding-frame top-link hook and stop bar 130 attaches the upper portion of the Carry-All implement 300 to the sliding-frame 46. The sliding frame can be guided with a system using a buried guidance wire 141 utilizing a signal generator 143 to activate the guidance wire 141.

Figure 2:
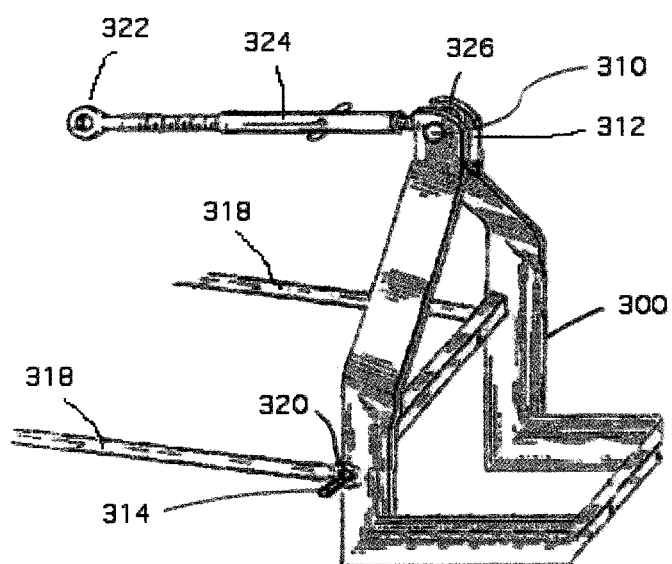
FIG. 2 is a perspective view showing a prior art Carry-All implement and the three points of attachment to the implement.

FIG. 2 shows the prior art implement 300, that includes a top attachment receiver 312 which usually comprises a pair of spaced apart aligned projections or flanges centrally disposed and having a hole there through for receiving a distal end 326 of the top-link arm 324 which is releasably held thereto by a pin or bolt 310. The distal end 326 can comprise a socket. The opposing end 322 of the top-link arm 324 also comprises a distal ball socket for attachment to the tractor top-link attachment location with similar spaced apart projections and retaining pin or bolt. The implement 300 typically includes a transversely extending tool bar or frame member having laterally spaced apart studs 314 extending from the tractor-facing side of the implement frame for removable attachment to the bottom-link arm 320 sockets held within the distal ends of the bottom-link arms 318. In the alternative, laterally spaced apart studs 314 are replaced with two flanges with axial centered holes 195 (see FIG. 24) with a pin therein for connection to the bottom-link arms 318. The distal end 326 of the top-link arm 324 and distal ends 320 of the two bottom-link arms 318 contain within sockets having rotatable balls including apertures extending there-through for insertion of pins for connecting these three ends to fixed points on the implement. The top-link arm 324 includes a turn-buckle assembly with threaded rods and a threaded hollow cylinder which can be rotated to lengthen or shorten the overall length of the top-link arm 324.

Figure 3:
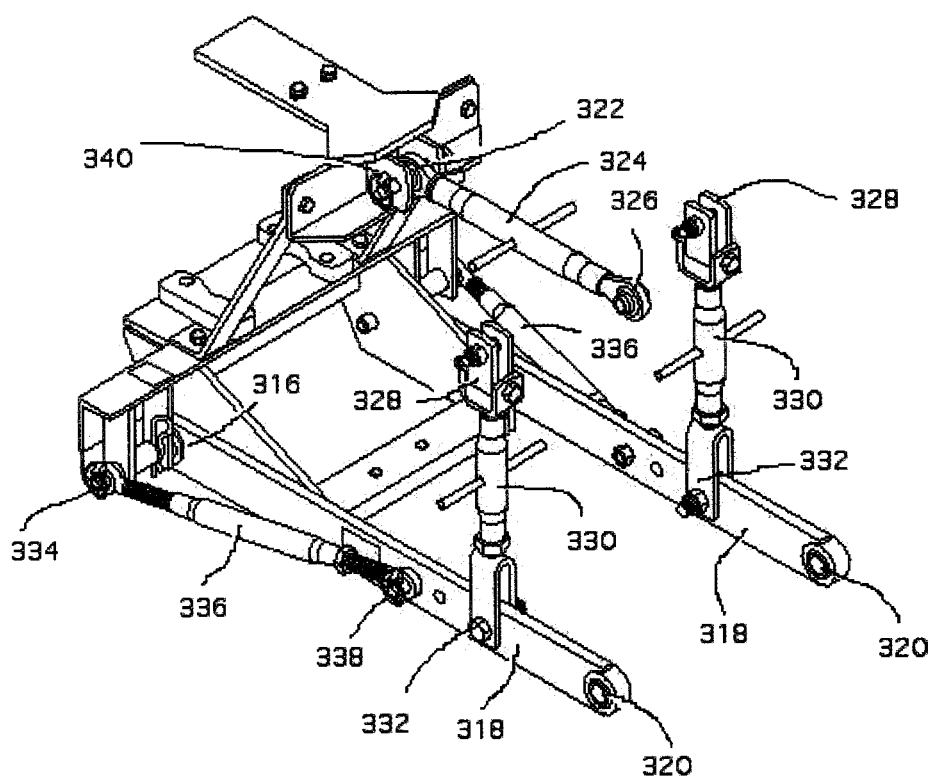
FIG. 3 is a perspective view showing a prior art three-point hitch arrangement with its various parts attached.

FIG. 3 shows prior art lift-link arms 330 connect at lift-link arms connection to bottom-link arms 332 that cause the bottom-link arms 318 to rotate upward and downward pivoting the proximate ends of the bottom-link arms on a spindle and raising the distal end of the bottom-link arms 320 and the implement attached thereto. The top-link arm 324, in turn, causes the upright portion of the carry-all implement 300 to maintain general uprightness or verticality. Consequently, the horizontal portion of the implement remains generally horizontal throughout the upward and downward motion of the carry-all implement 300 (see FIG. 2). Because the bottom-link arms 318 points of attachment to the tractor under-carriage location 316 are also ball and socket arrangements, the implement is free to move laterally a fixed distance providing "play" for with respect to the tractor. In some situations, this freedom of movement is desirable, and in other situations, undesirable. As in the case of this present invention, the freedom of movement situation is undesirable, additional stabilizer arms are connected, one to each of the bottom-link arms. One end of the stabilizer arms connected approximately half way down the length of each bottom-link arm 338, the other end is connected to a fixed point on the tractor under-carriage location 334 which is coaxial with the two bottom-link arm connections to the tractor under carriage at location 316. This allows full up and down movement of the implement but removes any random lateral motion of the implement. The stabilizer arms 336 may be a turn-buckle assembly with threaded rods and a threaded hollow cylinder which can be rotated to lengthen or shorten the overall length of the stabilizer arm. In the alternative, the stabilizer arms may be a rigid arm with an adjustable threaded screw device located at the bottom-link arm location 338. Another alternative to the above stated stabilizer arms is one or two stabilizer arms connected to a rigid point on the tractor and the other end connected crossways to one or both of the bottom-link connection pins 314 (see FIG. 2) to the implement.

Bottom-link arms 318 support the weight of the implement. Lift-link arms 330 attach between the bottom-link arms 318 and tractor hydraulic actuated lift arms at connection point 328. The adjustable top-link arm 324 attaches to the tractor mounted top-link bracket 340 with a removable pin or bolt thru the top-link arm distal end 322, which can have a mounted rotatable ball, while the opposed distal end 326 of the top-link arm has a rotatable ball and attaches to a top-link attachment plate 312 on the implement as shown in FIG. 2. A Power Take-Off shaft (PTO) (not shown) can be disposed centered on the rear of the tractor through the PTO pathway 98 in a plane between the height of the top-link attachment plates 340 on the tractor and the bottom-link attachments 316 to the tractor.

FIG. 5 and FIG. 6 show the tractor-facing side of the laterally adjustable three-point hitch implement attachment, of a first version of the invention, comprising a rigidly-mounted base frame 45 (also referred to as a first framework), and a slidably-mounted frame 46 (also referred to as a second framework). The rigidly-mounted base frame 45 is configured for connection to the bottom-link arms 318 and top-link arm 324 of mobile machinery, such as the tractor 38 (see FIG. 1a). Connections from the tractor to the rigidly-mounted base frame 45 occur at the top link attachment 66 and at the two bottom-link attachment 68. The rigidly-mounted base frame 45, also referred to as the first frame, has at least two parallel, vertically spaced apart, laterally extending rails. In the version shown in FIG. 5 and FIG. 6, the first frame 45 comprises four tiered horizontal longitudinal frame member rails 48, 49, 50, 51, which can be solid or hollow and any suitable shape in cross-section, rigidly connected at the ends to at least two vertical support members, also referred to as studs, and capable of being removably secured to the three-point hitch of the tractor. Preferably in the design of the rigidly-mounted base frame there are at least two upper and two lower horizontal frame members providing an opening of sufficient size between the upper and lower horizontal frame members to accommodate a Power Take Off "PTO" driveline if required for the attached implement. The PTO opening arraignment is shown in FIG. 7 using a double driver configuration allowing for the space needed for the PTO driveline to connect to an implement. FIG. 5 and FIG. 6 show three upper and three lower horizontal frame members for the rigidly-mounted base frame showing the rigidly-mounted base frame with six horizontal longitudinal aligned frame members, wherein frame member 47 (also referred to as upper cross beam), 48 and 49 are in an upper position and frame members 50, 51, 52 (member 52 is also referred to as lower cross beam), are in a lower positions, and four vertical frame members. Frame members 53 and 54, also referred to as studs, are positioned to one side of the rigidly-mounted base frame and frame members 55 and 56 are positioned to the opposing side of the rigidly-mounted base frame. Members 53, 54, 55, and 56 are also referred to as studs. Members 48, 49, 50, and 51 are also referred to as rails. The laterally adjustable three-point hitch implement attachment apparatus 40 has square shaped horizontal sliding-frame members 57,58,59, 60 (also referred to as sleeves) and square shaped horizontal rigid-frame members 47,48,49,50,51,52 oriented in a diamond shape with all sides placed at forty-five degree angles as compared to a horizontal plane. By square shaped this is with regard to a vertical cross section and preferably they are oriented with a corner facing upwardly.

The slidable-mounted frame 46 comprises at least two horizontal longitudinally aligned hollow frame member tubes securely and sturdily connected at the ends with at least two vertical frame members forming a generally rectangular sturdy frame that is transversely and slidably-mounted on at least two horizontal longitudinal frame members, bars or rails of the rigidly-mounted base frame 45 enabling the slidable-mounted frame 46 to travel transversely, also referred to as laterally, across from one side to the other side of the rigidly-mounted base frame 45. FIG. 5 shows two upper and two lower horizontal hollow frame members for the slidably-mounted frame, wherein frame members 57 and 58 are in the upper positions and frame members 59 and 60 are in the lower positions. They slide on the rails of the base frame 45. Shown in FIG. 5 are four vertical frame members, two vertical frame members 61 and 62 are positioned to one side and frame members 63 and 64 are positioned to the opposing side. Frame members 61-64 are also referred to as posts. Four hollow horizontal slidable-mounted frame members as opposed to two hollow horizontal slidable-mounted frame members can provide a greater load carrying capacity of the connecting apparatus.

The upper horizontal rigidly-mounted base frame members 48 and 49 pass thru the upper slidable-mounted frame members 57 and 58. The lower horizontal rigidly-mounted base frame members 50 and 51 pass thru the lower slidable-mounted frame members 59 and 60. The slidable-mounted frame 46 is free to laterally move with respect to the rigidly-mounted base frame 45. All six rigidly-mounted base frame members and all four slidable-mounted frame members are typically vertically coplanar. While FIG. 5 and subsequent figures show a frame made from longitudinal members having a rectangular or square cross-section, it is contemplated that longitudinal members may be formed having a cylindrical cross-sectional area such as pipes or solid rods (see FIG. 39b). FIG. 5 and subsequent figures show the square frame members turned in a diagonal horizontal position representing a diamond shape, the connecting apparatus would also work in a similar fashion with the frame members turned in the square position with the bottom and top of the frame members situated in a horizontal squared position (see FIG. 39a) as opposed to a forty-five degree diamond slanted position when compared to a horizontal plane.

As depicted in subsequent drawings, (see FIGS. 13, 14, 15, 16) a lighter more economical version of the connecting apparatus 40 as depicted in FIG. 5 can be configured with only two hollow horizontal frame members included in the slidably-mounted frame 46 and only four horizontal frame members included in the rigidly-mounted base frame 45. (see FIGS. 13, 14, 15, 16) In addition to the connecting apparatus as depicted in FIG. 5, a larger stronger version of the connecting apparatus can be configured by increasing the number of horizontal frame members included in the slidably-mounted frame to six or more (not shown) and increasing number of horizontal frame members in the rigidly-mounted frame to eight or more. (not shown) Also in addition to adding horizontal and vertical frame members to gain more strength and weight carrying capacity of the connecting apparatus, using a stronger or greater diameter and thickness of the metal used in all of the frame members will achieve a greater weigh carrying and working capacity. For great weight carrying and working capacity of the connecting apparatus, all of the rigidly-mounted base frame horizontal frame members can be constructed of solid steel bars.

FIG. 6 shows a single location of top-link attachment plate 66 and two locations of bottom-link attachment plates 68 located on the rigidly-mounted frame 45, which are for attachment to the tractor top-link and bottom-link points, respectively, of the three-point hitch. Four horizontal sliding-frame members or sleeves are shown. Pushing or pulling means such as a hydraulic actuator and cylinder, electric actuator and cylinder, pneumatic actuator and cylinder, other positioning devices, chain, cable, belt or combinations thereof are provided for moving the slidable-mounted frame 46 laterally and parallel to the rigidly-mounted frame 45.

For example, a single hydraulic driver 80 is mounted for the lateral adjustments of the sliding-frame 46. The hydraulic driver 80 provides lateral movement of the slidably-mounted frame 46 across the rigidly-mounted base frame 45. The slidably-mounted frame 46 is free to slide laterally with respect to the base frame 45. The left-right movement and position of slidably-mounted frame 46 is changed by at least one hydraulic driver 80 comprising a housing 82 and a piston 83, or optionally more than one driver, such as two hydraulic drivers 80 (see FIG. 7). Typically, the driver has an internal stop for limiting the lateral movement of the slidably-mounted frame 46. The hydraulic driver is connected between the rigidly-mounted base frame 45 and the slidably-mounted frame 46. The cylinder housing 82 of the hydraulic driver 80 is removably attached at one end to a bracket 90 with a pin and clip and the bracket 90 is connected to bracket 92b which is connected to the rigidly-mounted base frame 45 at vertical frame member 56. The piston 83 of the hydraulic driver 80 is removably attached to a bracket 89 with a pin and clip and the bracket 89 is connected to a bracket 94b which is connected to the slidably-mounted frame 46 at the vertical frame member 61. In this configuration, when the piston 83 of the hydraulic driver 80 moves out of the housing 82, the slidably-mounted frame 46 is caused to slide away from the bracket 90 of the rigidly-mounted base frame 45. When the piston 83 of the hydraulic driver 80 moves back into housing 82, the slidably-mounted frame 46 is caused to move closer to the bracket 90 of the rigidly-mounted base frame 45. The hydraulic cylinder housing 82 has two hydraulic flexible lines 85 attached which in turn can be attached to a tractor manual hydraulic control valve 236 and the automated hydraulic control valve 238. The driver 80 can be operated manually or automatically.

The single hydraulic cylinder 80 is mounted in a centered location between the top and bottom of the sliding-frame 46 for lateral adjustment of the sliding-frame 46. The single hydraulic cylinder centered design can be used when a Power Take Off "PTO" driveline is not required for the implement that is attached to the connection apparatus as this centered single hydraulic cylinder position would obstruct the pathway 98 of a PTO driveline (see FIG. 7) as it is connected between the tractor PTO shaft and the implement to be attached to the connection apparatus.

The driver typically has static loading capacity, meaning that when the driver stops and reaches a predetermined adjustment point, the driver essentially locks in place and can support a load that is either pulling or pushing on the driver. Typically, in an agricultural tractor application, the tractor hydraulic system control valves and hydraulic cylinders are valved for a static loading capacity. Typical electric linear actuators that are screw or gear driven generally have a static loading capacity or an electro-mechanical brake added to provide improved static loading capacity.

Preferably hydraulic drivers are used as compared to electric, sprocket and chain drives, pneumatic drives and electro-magnetic drives. Hydraulic actuators are rugged and suited for high-force applications. They can produce forces 25 times greater than pneumatic cylinders of equal size. They also operate in pressures of up to 4,000 psi.

Electric motor actuator drives are weak and usually expensive compared to hydraulic cylinder movement applications. Electrical actuators can be used, because they have fewer component parts and can provide precision-control positioning. An example of the range of accuracy is +/−0.0003 in. and a repeatability of less than 0.00004 in. Their setups are scalable for any purpose or force requirement, and are quiet, smooth, and repeatable. The initial unit cost of an electrical actuator is higher than that of pneumatic and hydraulic actuators.

Sprocket and chain drives can be used, but they have slack between the parts causing less precise movement when compared to a hydraulic cylinder positioning system.

Pneumatic cylinder drives can be used but they have limited position control Electro-magnetic actuators such as linear motor actuators, although possible in this application, generally do not possess sufficient force capacity for linear movement. Linear motor actuators do have the advantage of being able to be sealed very easily against moisture and corrosion allowing for a long service life. As technology advances, electro-magnetic actuators may be a preferred choice in many applications. Mechanical actuator means only of controlling the driver may be useful in a limited number of applications using mobile machinery.

Manual operational control of the hydraulic or electric driver can be preferred in some applications while using the connecting apparatus. A switch switching between manual and automatic control of the driver can be provided along with a manual control valve or switch. One instance when manual control of the driver may be utilized is when then mobile machine operator is attaching or removing implements from the connecting apparatus. The manually operated valve or switch would provide manual lateral positioning of the connecting apparatus slidable frame for hookup of an implement. Another instance where manual operation of the driver may be utilized is when the mobile machine operator has no automatic guidance system setup for use or the mobile machine operator simply prefers the manual operation of the driver in certain applications.

Also shown in FIG. 6 is the rear face of the double wrap-around bracket clamps 78, which are used for the opposing implement side connection.

Attachment plates 66 are mounted on the tractor facing side of the rigidly-mounted base frame 45 top horizontal frame member 47 for connection of the top-link arm 324 (see FIG. 1c) to the tractor top-link attachment brackets 340 (see FIG. 3). Two attachment plates 68 are mounted on the tractor facing side of the rigidly-mounted base frame 45 bottom horizontal frame member 52 for hookup of the tractor bottom-link arms 318 (see FIG. 3) to the connecting apparatus. Top-link attachment plates 66 includes two vertical parallel plates or flanges defining a bracket with coaxial aligned thorough holes projecting outward or upward from the surface of the rigidly-mounted base frame top horizontal member 47 which provides for connecting a top-link arm 324 (see FIG. 1b) to the tractor. Bottom-link attachment plates 68 include two vertical parallel plates or flanges defining a bracket with coaxial aligned thorough holes projecting outward or outward and upward from the surface of the rigidly-mounted base frame bottom horizontal member 52 which provides for connecting the two bottom-link arms 318 (see FIG. 3) of the tractor to the rigidly-mounted base frame 45.

At least four grease fittings 74 for each horizontal frame member of the slidable-mounted frame 46 are provided to lubricate the sliding action of the slidable-mounted frame 46 upon the rigidly mounted frame 45. Optimally, sixteen or more grease fittings are provided for each horizontal frame member of the slidably-mounted frame 46 for complete coverage of lubricant between the two frames. Grease fittings 74 are shown mounted on the slidable-mounted frame 46 screwed into threaded holes or fittings on all sliding horizontal frame members of the sliding-frame 46.

Shown in FIG. 6 are viewable rigid-frame alignment marks 70, also referred to as positioning indicia, located on the upper rigid-frame horizontal frame member 47 marking the edge of the sliding-frame when the sliding-frame is centered on the rigid frame, the rigid-frame alignment marks 70 located on the lower rigid-frame horizontal frame member 52 marking the edge of the sliding-frame when the sliding-frame is centered on the rigid frame. A rigid-frame alignment mark 72, also referred to as positioning indicia, is located on the lower rigid-frame horizontal frame member 52 for marking the center of the sliding-frame when the sliding-frame is centered on the rigid-frame. This allows centering of the slidable frame. For the upper rigid-frame horizontal frame member 47, the rigid-frame top-link attachment plates 66 serves as a center mark. The hydraulic cylinder 80 length and rigidly-mounted frame section 45 width can be altered depending on the length of lateral movement required of the sliding-frame section 46.

FIG. 6 shows the hydraulic lines 85 connected between the hydraulic driver 80 and both the manual hydraulic control valve 236 and the automatic hydraulic control valve 238. FIG. 7 show hydraulic lines 87 connected between a hydraulic flow divider 88 and both the manual hydraulic control valve 236 and the automatic hydraulic control valve 238. FIG. 6 and FIG. 7 show hydraulic lines 87a connected between the manual hydraulic control valve 236 and a hydraulic valve selector switch 240. Hydraulic lines 87b are connected between the automatic hydraulic control valve 238 and the hydraulic valve selector switch 240. Hydraulic lines 87c are connected between the hydraulic valve selector switch 240 and the hydraulic pump 81. Hydraulic power receptacle 242 comprising dual quick connect couplers serve as the hydraulic power receptacle and connect and disconnect means for the hydraulic lines when attaching or removing the first connecting apparatus 40 from the tractor three-point hitch.

Figure 4A:
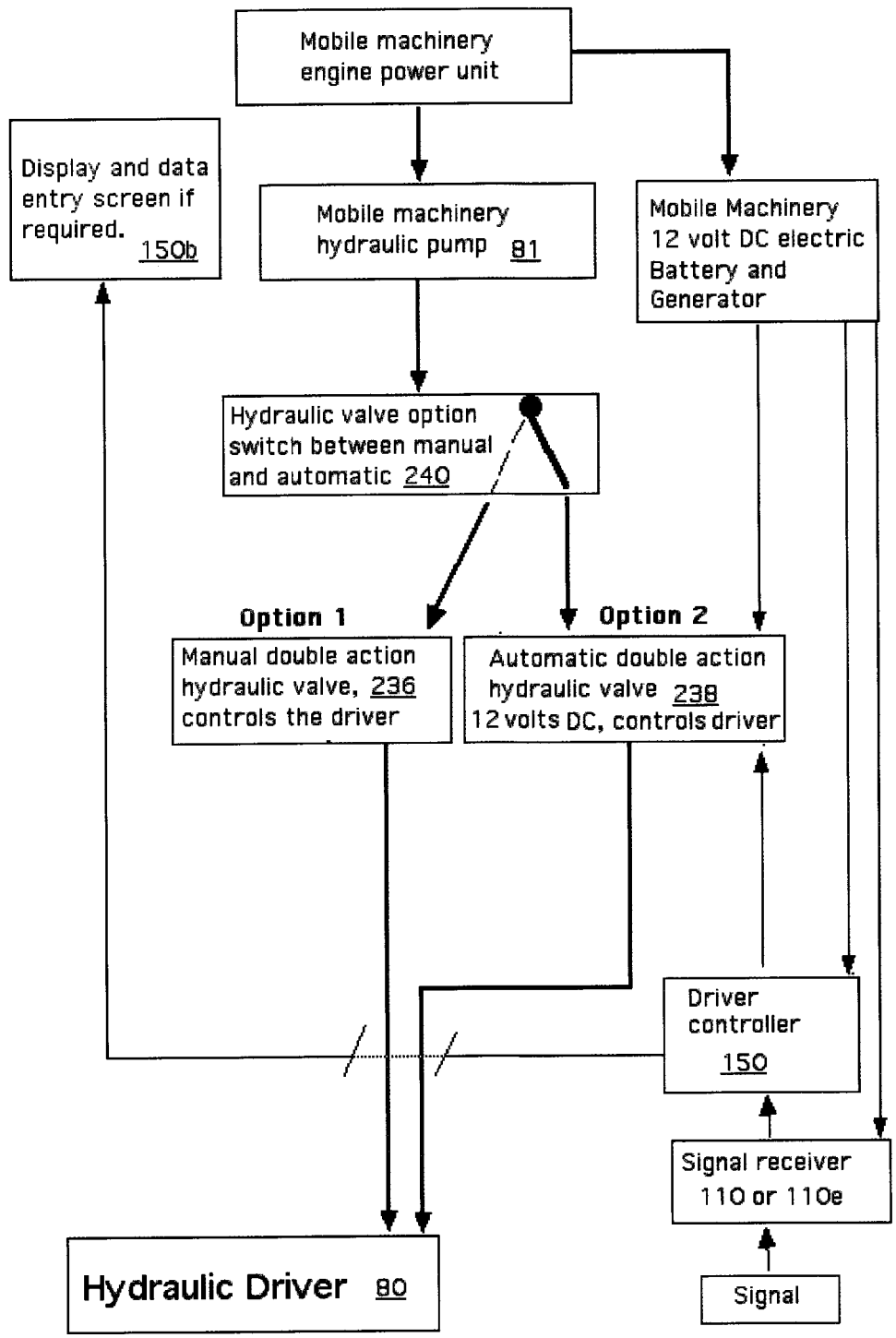
FIGS. 4a and 4b are flow charts depicting relationship between components of the present invention.
Figure 4B:
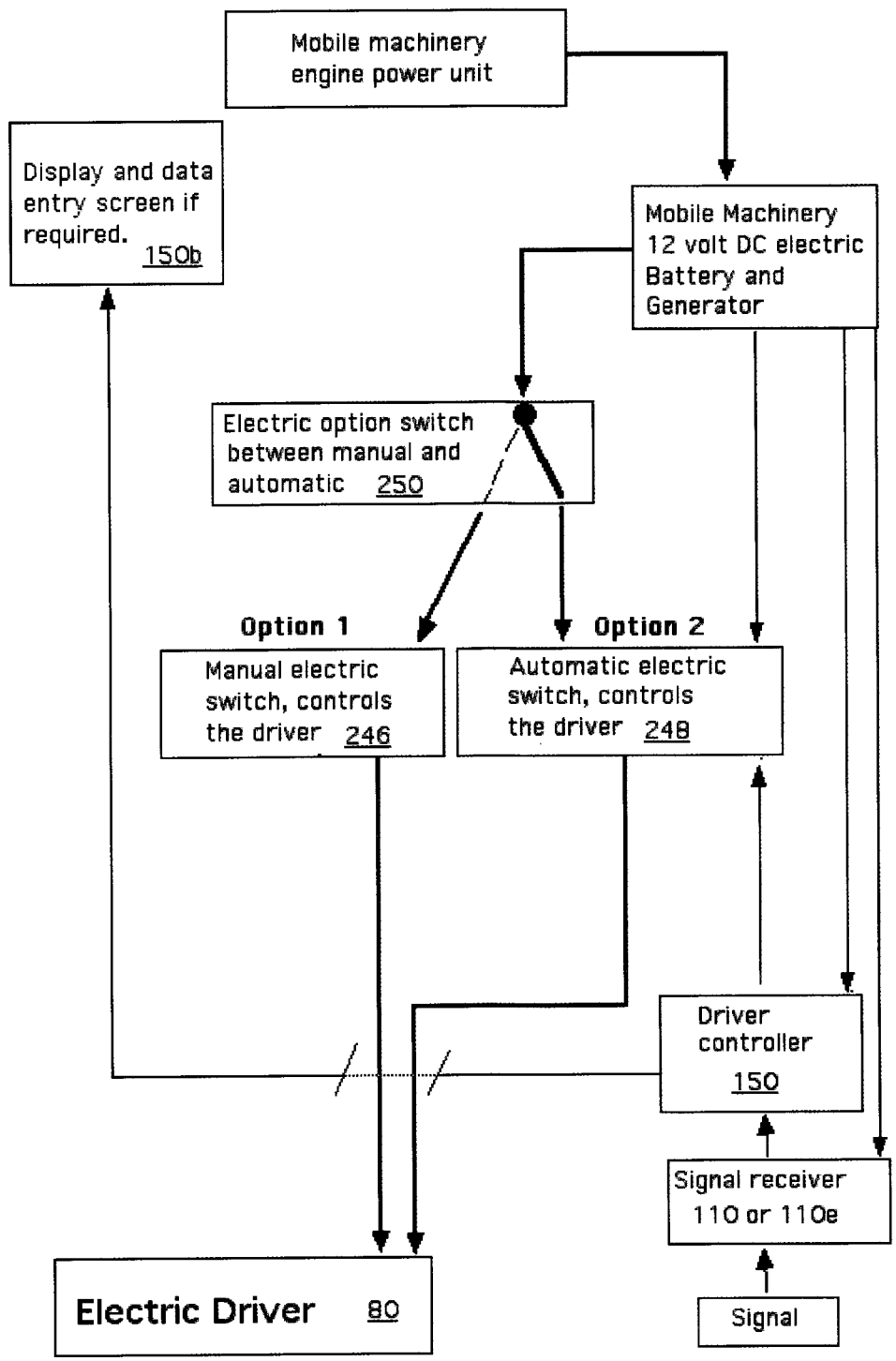

With reference to FIG. 7, a laser receiver and a GPS antenna and receiver module 110e is also shown mounted on the top bar 100a. A choice can be made as to which receiver and controller is used depending on the application. Both receivers normally are not used at the same time. A GPS controller can be required to be matched to the GPS antenna and receiver module 110e; likewise, a laser controller can be required to be matched to the laser receiver 110. Each receiver receives a signal from a transmitter and then relays a signal that can be digital or analog or other to the controller 150 through signal wire 110d or 110f. A data entry monitor 150b can be provided if required to enter data to the controller such as in the case of the GPS controller. Data wire 150c is connected from the data entry monitor 150b to the controller 150. (see FIGS. 6 and 7) The controller 150 sends a signal 150a to the automatic hydraulic control valve 238. (see FIGS. 6 and 7) In the instance where an electric actuator is used for the driver 80, FIG. 4b shows the configuration of the electrical components for the operation of the driver 80.

FIG. 7 shows a double hydraulic cylinder providing lateral movement of the slidably-mounted frame 46 across the rigidly-mounted base frame 45. The double hydraulic cylinder design can be used when a Power Take Off ("PTO") driveline is required for the implement that is attached to the connection apparatus, as this double hydraulic cylinder design normally does not obstruct the pathway of a PTO driveline as it is connected between the tractor PTO shaft and the implement to be attached to the connection apparatus. In addition, heavy loads that may be mounted on the connection apparatus can benefit from the double hydraulic cylinder design by spreading out the push-pull force of the hydraulic cylinders to two locations of the sliding-frame 46 instead of one location. The slidably-mounted frame 46 is free to slide laterally with respect to the base frame 45.

The left-right movement and position of slidably-mounted frame 46 is controlled by two hydraulic drivers 80. Each hydraulic driver is connected between the rigidly-mounted base frame 45 and the second slidably-mounted frame 46. The housing 82 (see FIG. 6) of the top hydraulic cylinder 80 is connected at one end to the bracket 90 which is connected to brackets 92a which are connected to the rigidly-mounted base frame 45 at vertical frame member 56. The piston 83 of the top hydraulic driver 80 is connected at one end to the bracket 89 which is connected to bracket 94a which is connected to the slidably-mounted frame 46 at vertical frame member 61. The housing 82 of the bottom hydraulic driver 80 is connected at one end to the bracket 90 which is connected to bracket 92c which is connected to the rigidly-mounted base frame 45 at vertical frame member 56. The piston 83 of the bottom hydraulic driver 80 is connected at one end to the bracket 89 which is connected to bracket 94c which is connected to the slidably-mounted frame 46 at vertical frame member 61. In this double hydraulic driver configuration, when the pistons 83 of the hydraulic drivers 80 moves out of hydraulic housing, the slidably-mounted frame 46 is caused to slide away from the bracket 90 of the base frame 45. When the pistons 83 of the hydraulic driver 80 moves back into the housings 82, slidably-mounted frame 46 is caused to move closer to brackets 90 of the base frame 45. In the double hydraulic cylinder configuration, the hydraulic fluid flow divider 88 is utilized to provide even distribution of hydraulic fluid to each hydraulic driver 80, causing both hydraulic drivers 80 to be synchronized with each other while moving in parallel to provide the lateral movement of the slidably-mounted frame 46 with respect to the rigidly-mounted base frame 45. Hydraulic lines 86 are disposed between each hydraulic cylinder 80 and the hydraulic fluid flow divider 88 for even fluid distribution to the hydraulic cylinders 80 while hydraulic lines 87 are disposed between the hydraulic fluid flow divider 88 and the hydraulic control valve normally equipped on a tractor carrying the connecting apparatus. The double hydraulic cylinder configuration can be helpful in moving the slidably-mounted frame 46 when the implement is to be carried by the connecting apparatus is of the larger and heavier nature.

With reference to FIGS. 7 and 8, a top-bar first bar 100a is rigidly attached to the slidably-mounted frame section 46 with attachment legs 101. The top-bar first bar 100a supports (i) a laterally adjustably positioned laser receiver 110 or a GPS antenna and receiver module 110e provided with an adjustable holding bracket 108 for supporting a GPS or a laser guidance system, (ii) an LED light fixture 118, and (iii) mounted camera housing 112 comprising two cameras 114 and 116 focused rearwardly and downwardly, respectively, being mounted on a slidable bar 104 for lateral adjustment. The separate viewing cameras 114 and 116 are enclosed in the camera housing 112. Top-bar 100a has a top-bar plate 100c for the mounting of the GPS antenna and receiver module 110e with dual antennas (see FIG. 11). The slidably-mounted frame 46 horizontal frame members and the top-bar first bar 100a have indicia markings, also referred to as positioning indicia, laid down in inches or millimeters thereon, to provide useful adjustment marks. Laser receiver 110 has a left alignment indicator 110a, center alignment indicator 110b and a right alignment indicator 110c. The top-bar first bar 100a extends laterally beyond the slidable frame 46 as is needed. A position-sensor 151 is attached to the-top-bar mounting leg 101. A position-sensor bar 151*a* is attached to the rigid-frame horizontal frame member 47 with position-sensor bar attachment brackets 152, with position sensor electrical wires 152*a* extending from position sensor bar 151*a*.

With reference to FIG. 7, optionally the position signal receiver 110 or 110*e*, such as a GPS or laser signal receiver, supported by the slidable second framework, can determine the position of slidable second framework, and can provide a position signal through signal wires 110*d* or 110*f* to the controller 150. The controller 150 is adapted to control the driver 80 for keeping the implement on track via the controller output signal 150*a* to the automated hydraulic valve that controls the driver 80. A suitable programmed controller 150 that can provide output signals can be obtained from by Trimble of Sunnyvale, Calif. for either the laser or GPS system.

FIG. 8 is a perspective view of the implement-facing side of the connecting apparatus 40. The slidably-mounted frame 46 provides connection means for most three-point hitch implements in the agricultural and earth excavating fields, such as bed shapers, seed planters, plant transplanters, cultivators, weeders, sprayers, rippers, box scrapers and the like. The slidably-mounted frame 46 is fitted with two double-frame member wrap around bracket clamps 78, which are mounted to the slidably-mounted horizontal frame sleeves 59 and 60. Sliding-frame bottom-link mounting arms 132 attach to two double wrap-around bracket clamps 78 which protrude out towards the implement to be attached. Sliding-frame bottom-link quick-hitch slip-on housing 135, as described in U.S. Pat. No. 7,059,419, attach and secure over the sliding-frame bottom-link mounting arms 132. (see FIG. 23) The bottom-link attachment points are normally spaced between 20 and 36 inches apart in a centered location on the slidably-mounted frame 46 and located near the horizontal plane of sliding-frame member 60. The slidably-mounted frame 46 is also fitted with a top-link quick hitch attachment point attached to the double wrap-around bracket clamp 78 which is mounted to slidably-mounted horizontal frame members 57 and 58. The top-link quick hitch attachment point is normally horizontally centered between left and right on the slidably-mounted frame 46 and adjustably located near or between the horizontal planes of sliding-frame members 57 and 58. The two sliding-frame bottom-link attachment hooks 136 and latching mechanism 139 combined with the sliding-frame top-link hook 130 provides for quick and easy attachment of a three-point hitch implement such as the carry-all 300 (see FIG. 2) and serve as connectors.

The rigid-frame alignment marks 70 are located on the top rigid-frame horizontal frame member 47 marking the edge of the sliding-frame when the sliding-frame is centered on the rigid frame. The rigid-frame alignment mark 72 located on the top rigid-frame horizontal frame member 47 marks the center of the sliding-frame when the sliding-frame is centered on the rigid frame. Rigid-frame alignment marks 70 located on the bottom rigid-frame horizontal frame member 52 mark the edge of the sliding-frame when the sliding-frame is centered on the rigid frame. The rigid-frame alignment mark 72 located on the bottom rigid-frame horizontal frame member 52 marks the center of the sliding-frame when the sliding-frame is centered on the rigid frame.

With reference to FIGS. 14 and 23, there is shown the sliding-frame bottom-link mounting arms 132 and rotatable ball joints 134 that are normally located on the end of a tractor's bottom-link arms 318. (see FIG. 1*c*) Serving as the bottom connector on the sliding frame is a quick-hitch slip on housing 135 as described in U.S. Pat. No. 7,059,419. Connector 135 securely mounts over the sliding-frame bottom-link mounting arms 132. The sliding-frame bottom-link quick hitch slip on housing 135 and latching mechanism 139 allow for a quick hookup and release of the implement from the tractor bottom-link arms. Direct hookup of sliding-frame bottom-link mounting arms 132 (see FIG. 14) to the implement is a more cumbersome hookup procedure as compared to the quick hitch style of implement hookup, although this direct sliding-frame bottom-link mounting arm 132 hookup may provide a more secure and tighter fit to the implement in very precise method of use applications. The quick hitch slip on housing 135, U.S. Pat. No. 7,059,419 includes a hook means 136 open at the top and a manually or spring operated latch 139 as shown in a close up view (see FIG. 23). This close-up view shows the slip on housing slips over the sliding-frame bottom-link mounting arm 132 and is then held in place by a pin which enters the slip on housing 135 and then extends through the rotatable socket and ball with axial hole of arm 132. Additional securing and adjustment screws are located around the slip on housing 135 for fine adjustments and a tight level fit.

With reference to FIG. 8, the top-link quick hitch attachment comprises a top-link channel back spacer 119 to vertically align the top-link quick hitch attachment points with the sliding-frame bottom-link quick hitch attachment points 136. An additional top-link bracket spacer 121 is attached between the double wrap around bracket clamp 78 and the top-link channel back spacer 119 to provide access to the double wrap-around bracket clamp 78 mounting bolts. Attached to the top-link channel back spacer 119 is an adjustable mounting channel 122. Bolted into the adjustable mounting channel 122 is a sliding-frame top-link hook and stop bar 130 top-link channel side spacers 120 inserted and bolted through. The sliding-frame top-link hook 130 generally is deeper and longer than the sliding-frame bottom-link quick-hitch hook and stop bar 136, the sliding-frame top-link hook 130 does not generally perform lifting functions of the attached implements, the sliding-frame top-link hook 130 hooks under and then up to catch the top-link hookup connection on the implement 312 (see FIG. 2) and holds the implement in place and allows the adjustment of tilting forward and backwards performed by the tractor mounted top-link arm 324. (see FIG. 1*c*) Top-link arm 324 is mounted to the tractor at location 340 (see FIG. 3) and to the connecting apparatus, and in many applications can be a double action hydraulic cylinder performing tilting adjustments for the attached implement.

Figure 9:
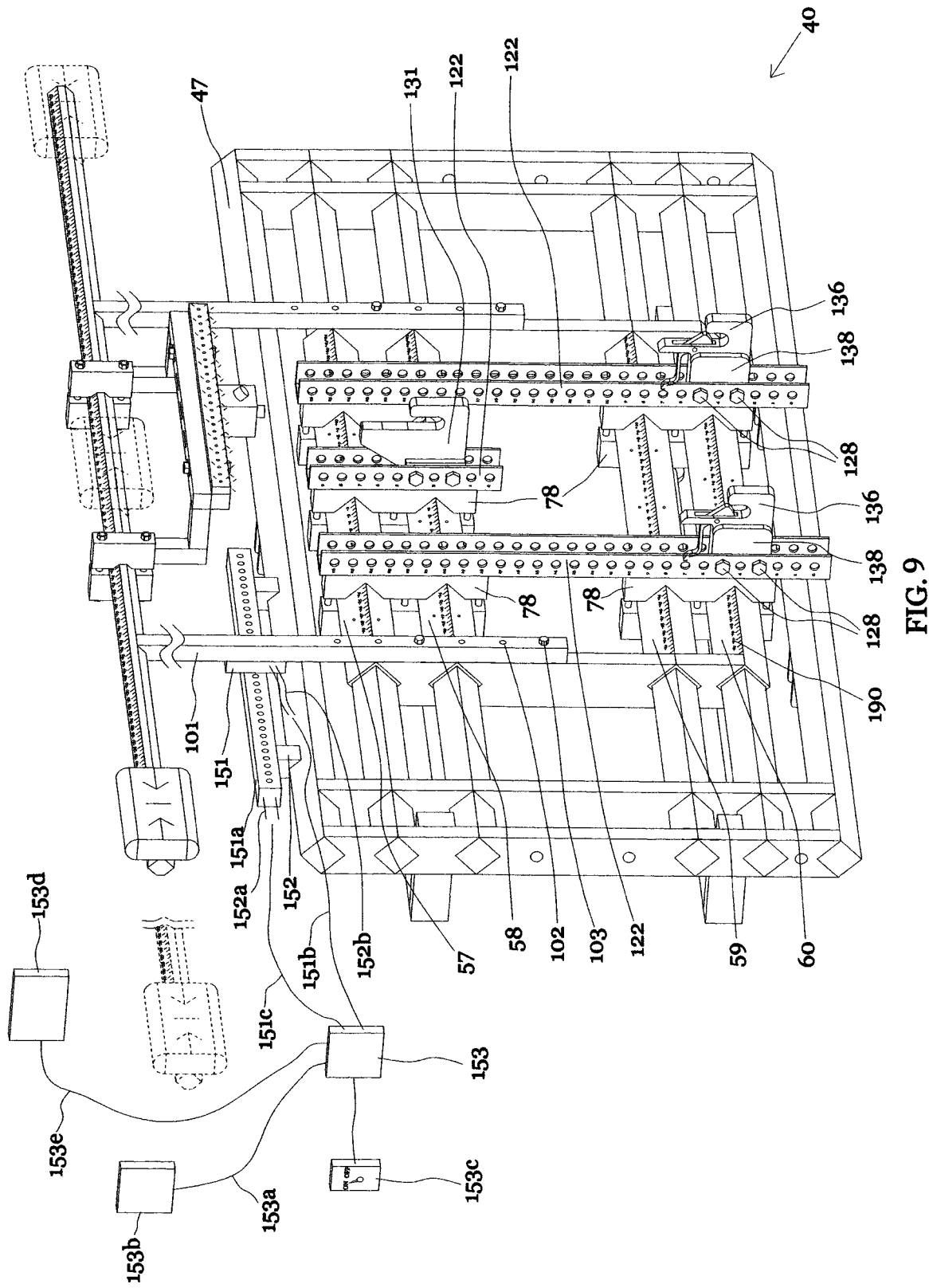
FIG. 9 is a perspective view of the implement-facing side of a connecting apparatus similar to that of FIG. 8, showing a four frame member traversing channel mounting configuration for the bottom-link connections to the implement.

FIG. 9 is a perspective view of the implement facing side of the connecting apparatus, showing the sliding-frame bottom-link housing 138 attached to the adjustable mounting channel 122 which traverses the four horizontal frame members 57, 58, 59, 60 of the sliding-frame 46. The adjustable mounting channel 122 attaches to two double wrap-around bracket clamps 78 of the sliding-frame 46. The adjustable mounting channel 122 in this configuration can provide additional bottom-link higher or lower adjustments and added strength to the sliding-frame 46 while allowing space for an implement PTO driveline to pass through the connecting apparatus from the implement being carried to the tractor PTO shaft. A sliding-frame bottom-link quick-hitch bolt-on housing 138 can be provided in place of the sliding-frame bottom-link quick-hitch slip-on housing 135, U.S. Pat. No. 7,059,419. The sliding-frame bottom-link quick-hitch bolt-on housing 138 can be a more stable attachment for the bottom-link connection point to the implement of the connecting apparatus as compared to the sliding-frame bottom-link quick-hitch slip-on housing 135. In the alternative for connecting an implement to the connecting apparatus, the sliding-frame bottom-link mounting arm and ball socket, bolt-on 133, as shown in FIG. 20, can be used in place of the sliding-frame bottom-link quick-hitch bolt-on housing 138 to provide a more stable attachment of the implement to the connecting apparatus. The position-sensor 151 sliding-frame mounted is attached to a top-bar mounting leg 101.

The position-sensor bar 151*a* is rigid-frame mounted, and is attached to the top rigid-frame horizontal frame member 47 with position-sensor bar attachment brackets 152. Position sensor electrical wires 152*b* and the position sensor bar electrical wires 152*a* extend from both position sensor 151 and position sensor bar 151*a* to provide the conductors for the position sensor signal 151*b* and the position sensor bar signal 151*c*. Optionally a wireless connection can be used. The position sensor 151 and the position sensor bar 151*a* can send a visual screen signal 153*e* for an operator's viewable positioning screen 153*d* for the tractor operator to view the position of the slidable-frame 46 position as related to the rigid-frame 45 position while looking forward and away from the rear three-point hitch mounted connecting apparatus. This allows the tractor operator to reposition the rigid-frame 45 by repositioning the tractor using the tractors steering if the tractor is diverging from the prescribed path. Auto-steering of the tractor can also be utilized by configuring the position sensor 151 and the position sensor bar 151*a* with an automated auto-steer controller 153 utilizing an auto-steer controller signal 153*a* sent to the auto-steer device 153*b* to control the steering of the tractor. The auto-steer controller can be equipped with an auto-steer controller on-off switch 153*c* to allow the tractor operator to manually steer the tractor when necessary.

In the instance the auto-steer function is utilized, and in the instance the tractor is to be steered in a straight line only by the auto-steer function, mounting the connecting apparatus on the rear three-point hitch of a front wheel steered tractor is sufficient to keep the tractor in a straight line. In the instance a front wheel steered tractor is required to auto-steer in a path that is not a straight line such as turns, the connecting apparatus 40 can be mounted on the front of the tractor for precise steering along a predetermined path. In this instance the present apparatus 40 can be mounted on the front three-point hitch of the tractor and another apparatus 40 can be mounted on the rear three-point hitch of the tractor depending on the application and implements being used. In the alternative to mounting the apparatus 40 on the front of a front wheel steered tractor in a situation where the predetermined path follows turns and the apparatus 40 is required to be mounted on the rear three-point hitch of the tractor, a separate auto steer device can be mounted on the front of the tractor to achieve sufficient auto-steering results in a predetermined path following turns.

Optionally for mobile machinery equipped with an auto-steering system 153 and 153*b*, such as those provided by Trimble of Sunnyvale, Calif., the position sensor 151 sensing the position of the second framework relative to the first framework, can use the auto-steer system for automatically adjusting the position of the mobile machinery based on the sensed position of the second framework relative to the first framework. Current auto-steering devices work by either controlling the hydraulic fluid of the mobile machinery hydraulic steering system or controlling the mechanical steering wheel of the mobile machinery.

Figure 10:
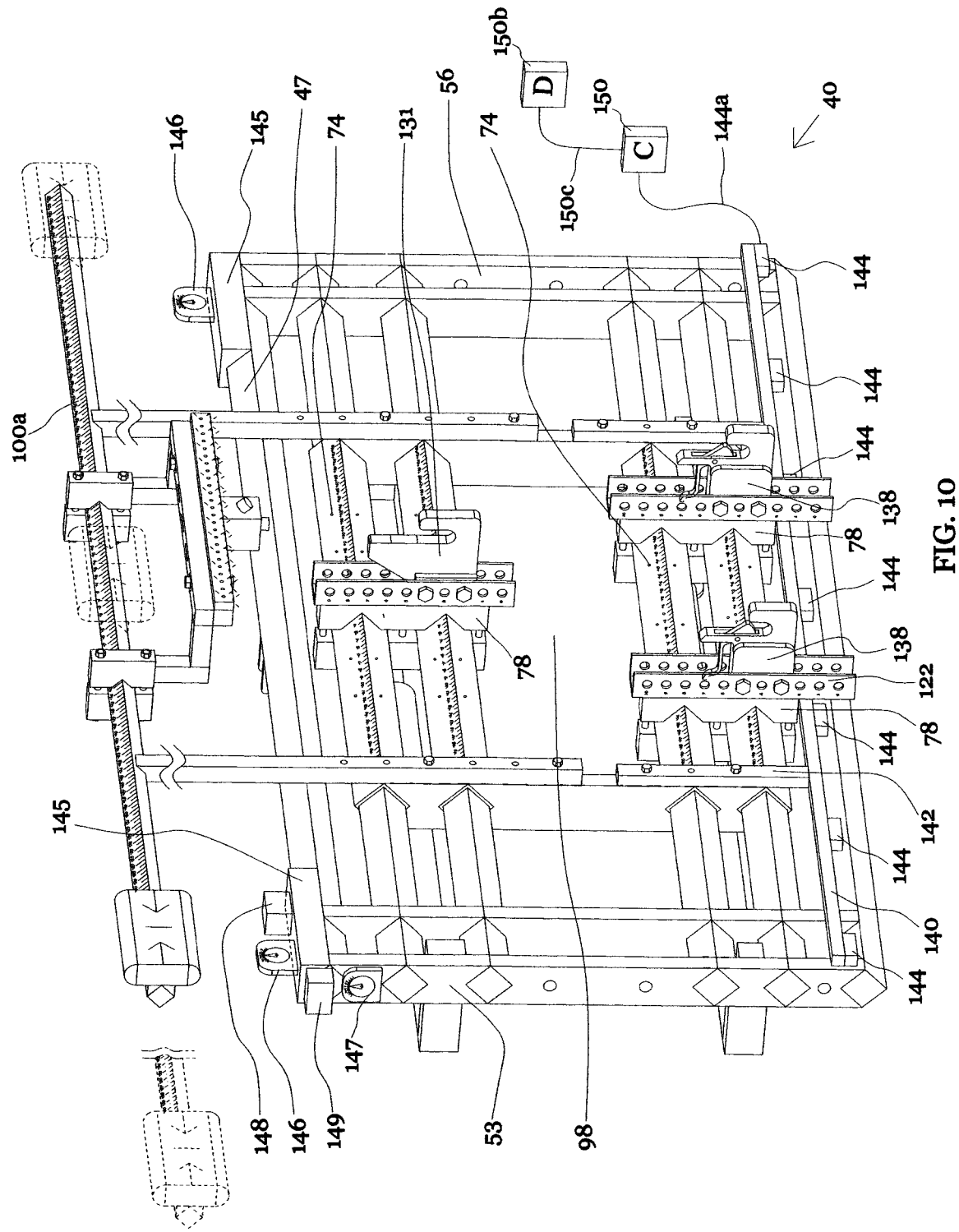
FIG. 10 is a perspective view of the implement-facing side of an apparatus similar to that of FIG. 9, with a two frame member channel mounting configuration for the bottom-link connections to the implement, with level and plumb gauges.

FIG. 10 is a perspective view of the implement facing side of the connecting apparatus 40, showing the adjustable mounting channel 122 attached to the double wrap around bracket clamp 78 comprising a two horizontal frame member channel mounting configuration of the sliding-frame for the bottom-link connections to the implement. This configuration expands the pathway 98 for a PTO driveline as compared to FIG. 9. Grease fittings, also referred to as great joints 74, are shown. Two viewable gauges level measurement 146 are secured to a gauge mounting plate 145 mounted on the top and at each end of the rigid-frame top horizontal frame member 47, and situated to be viewed from the rear of the tractor such as from the tractor seat area allowing the tractor operator to view and adjust the connecting apparatus accordingly. Two viewable gauges plumb measurement 147 are mounted on the side, near the top of each rigid-frame vertical frame member 53 and 56. One auto-sensor gauge level measurement 148 is mounted on one of the gauge mounting plates 145 situated on the rigid-frame horizontal frame member 47. One auto-sensor gauge plumb measurement 149 is mounted on the side, near the top of rigid-frame vertical frame member 53. The auto-sensor devices can automate the level and plumb positions of the connecting apparatus utilizing the tractor installed hydraulic positioning of the tractors three-point hitch. This automated leveling and plumbing of the connecting apparatus requires the tractor three-point hitch to accommodate controlled hydraulic cylinders at the top-link arm 324 and on at least one of the bottom-link arms 318.

A bottom-bar 140 is mounted on the bottom of the slidable-mounted frame 46 and below the sliding-frame bottom-link 138, and below a double wrap-around bracket clamp 78 being securely fastened to the slidable-mounted frame 46 with bottom-bar mounting legs 142. Bottom-bar sensor or cameras 144 are securely mounted to the underside of the bottom-bar 140, in the case of sensors, for the detection of electronic signals transmitted from an underground buried cable in which the slidable-mounted frame 46 adjusts laterally to follow the path of the signal transmitted from the underground buried cable. In the case of cameras, recognition computer software can be used to detect the position of crops or other items like line markers or shapes to adjust the slidably-mounted frame 46 in position. Bottom-bar signal wire 144*a* can transmit the signal to controller 150 (see FIG. 6) utilizing the same configuration of controller and related equipment as shown in FIG. 6. Bottom-bar 140 is extendable horizontally past the ends of the rigidly-mounted frame 45 to accommodate a particular purpose and also be repositioned if needed on a higher plane on the slidable-mounted frame 46.

Figure 11:
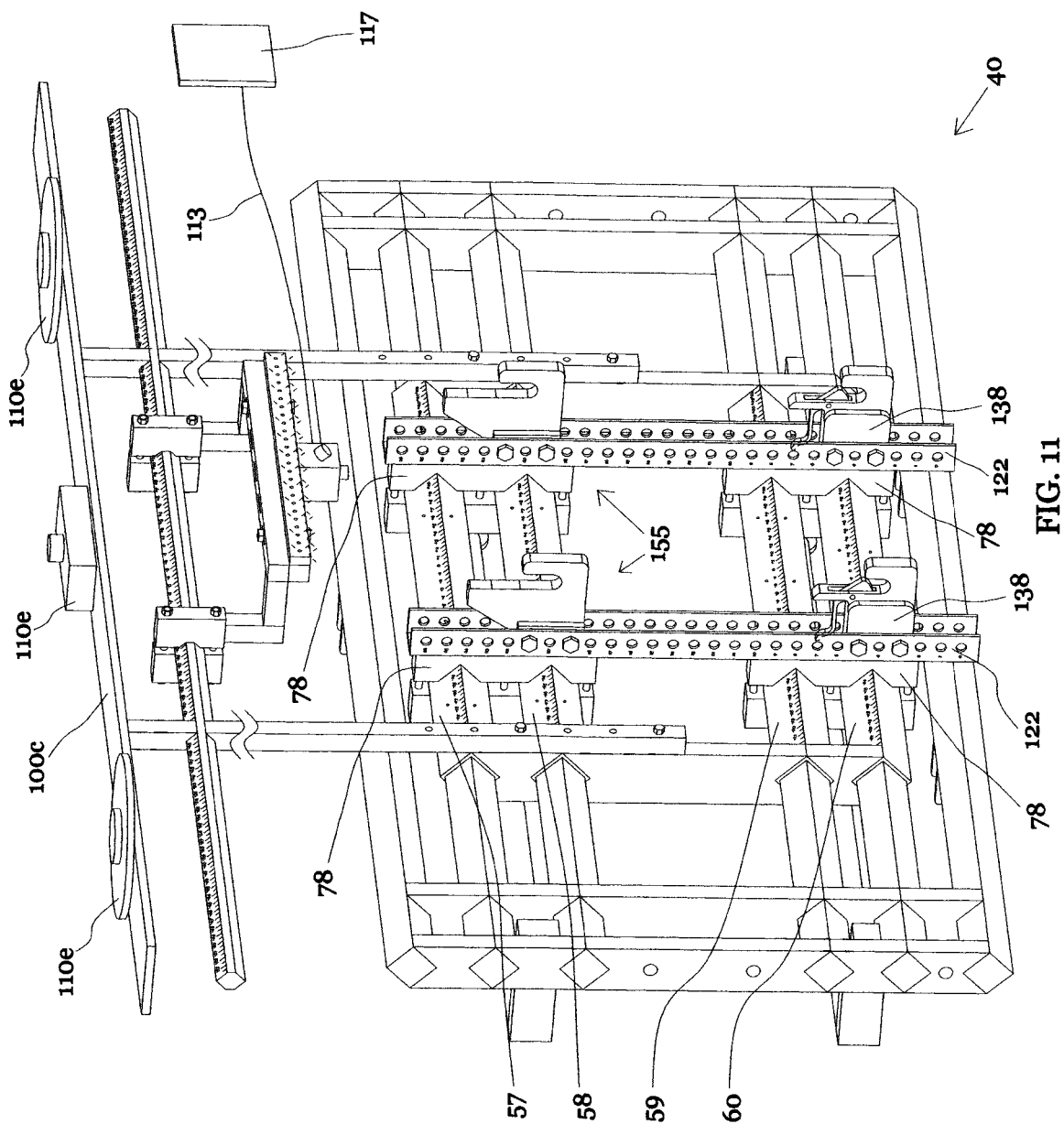
FIG. 11 is a perspective view of the implement-facing side of a connecting apparatus similar to that of FIG. 10, showing a four-point implement attachment configuration utilizing a four-member traversing channel mounting configuration for bottom-link and top-link connections to the implement.

FIG. 11 is a perspective view of the implement facing side of the connecting apparatus, showing a four-point implement connection design in a double-link top-link configuration 155 of the sliding-frame 46 as it connects to a four-point bracketed implement. Two sliding-frame bottom-link quick hitch attachments with bolt-on housings 138 and two sliding-frame top-link hook and stop bar 130(see FIG. 12) attachments are shown. The sliding-frame 46 bottom-link quick-hitch bolt-on housings 138 are attached to the adjustable mounting channel 122 which traverses four horizontal frame members 57, 58, 59, 60 of the sliding-frame 46. The adjustable mounting channel 122 mounts to two double wrap-around bracket clamps 78 of the sliding-frame 46 and the two sliding-frame top-link hook and stop bar 130 connections are mounted on the same adjustable mounting channel 122 aligned vertically and at or near the horizontal plane of the sliding-frame horizontal frame members 57 and 58. A camera monitor 117 and camera data transfer wire 113 can be mounted near the mobile machinery operator for viewing the two cameras output data. A top bar plate 100*c* houses two GPS antennae and a GPS receiver module as one unit referred to as a GPS antenna and receiver module 110*e*.

Figure 12:
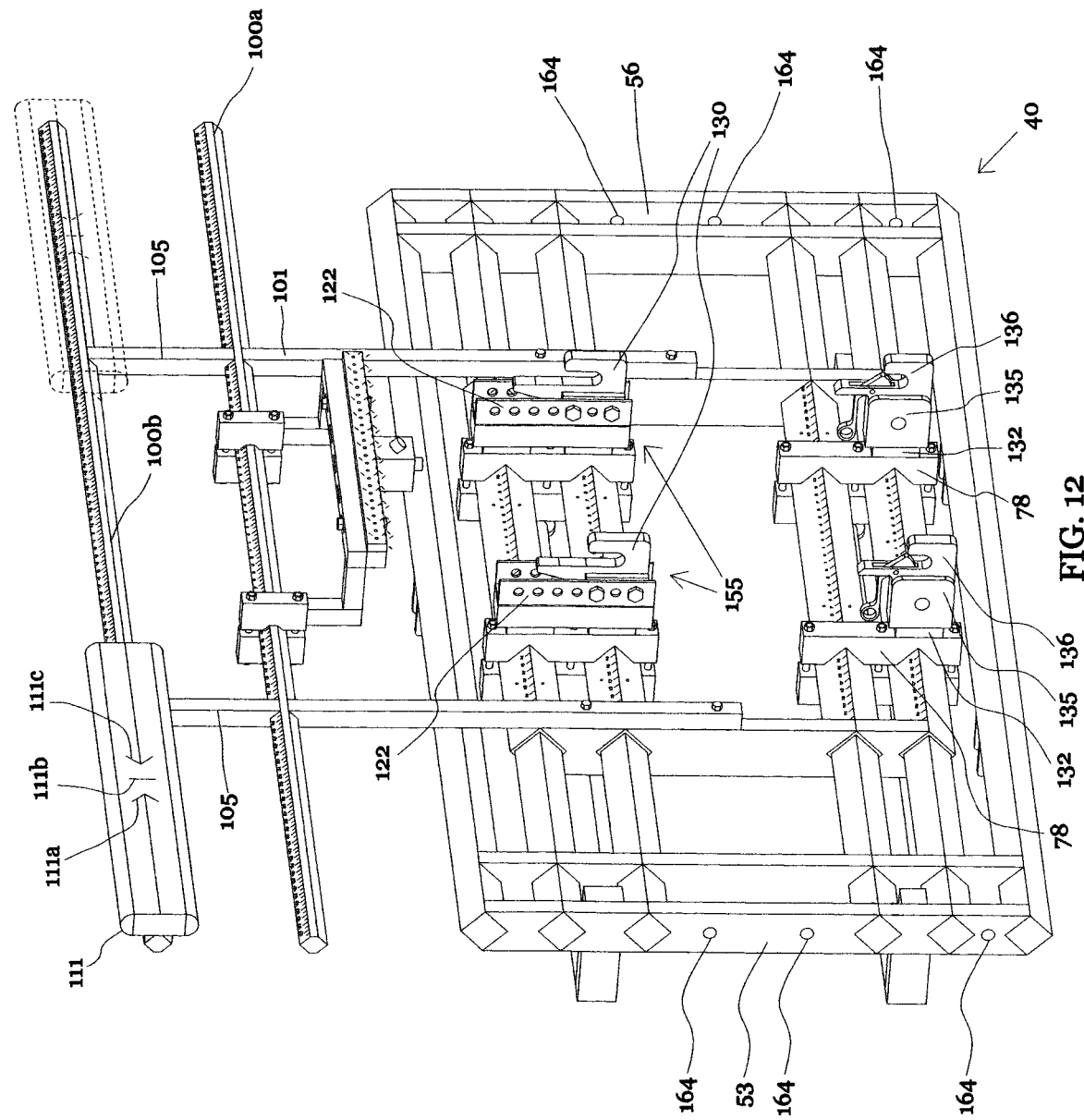
FIG. 12 is a perspective view of the implement-facing side of a connecting apparatus similar to that of FIG. 11, showing a four-point implement attachment configuration utilizing a two frame member channel mounting configuration for the top-links, bottom-link mounting arms and quick-hitch attachments for the bottom-link connections to the implement and a double top bar configuration.

FIG. 12 is a perspective view of the implement facing side of the connecting apparatus, with a four-point implement connection design in the double-link top-link configuration 155 of the sliding-frame 46 as it connects to a four-point bracketed implement. Two sliding-frame bottom-link quick hitch attachments with slip-on housings 135 attach to sliding-frame bottom-link mounting arms 132 which are attached to double wrap-around brackets clamps 78, shown are two sliding-frame top-link hook and stop bar 130 attachments to complete the four-point implement attachment configuration. Rigid-mounted frame section vertical frame members 53 and 56 have stand mounting holes 164. A double top-bar second bar 100*b* is mounted above top-bar first bar 100*a* using top-bar mounting leg extensions 105. This configuration provides a flexible laser receiver adjustment range. There is provided a wide laser receiver 111 with wide laser receiver left alignment indicator 111*a*, wide laser receiver center alignment indicator 111*b*, and wide laser receiver right alignment indicator 111*c*.

FIG. 13 is a perspective view of the implement facing side of the connecting apparatus, showing a version of the connecting apparatus with the sliding frame comprising four horizontal frame members wherein two of the horizontal frame members are sliding members 57 and 60 and the remaining two horizontal frame members are support members 156 and 158 in a diamond position to accommodate the double wrap-around bracket clamps 78. In the case of a slightly reduced weight load on the connecting apparatus, four horizontal sliding-frame members may not be needed. Consequently, two horizontal sliding-frame members which slide on the rigidly-mounted base frame 45 horizontal members are provided, while two additional sliding-frame horizontal members do not contact the rigidly-mounted base frame and thus are utilized as support members only. Stand mounting holes 164 are positioned between the upper and lowers rigid-mounted base frame members. Implement positioning sensors or cameras 154 are mounted to the implement facing side bottom-links and the implement facing side top link. Implement positioning sensors or cameras 154 can be utilized and wired to controller 150 (see FIG. 6) for assisting in the connection of the implements to the connecting apparatus by adjusting the position of the sliding-frame to align the first connection apparatus 40 implement facing side bottom and top links with the implement bottom and top link attachment pins or hardware.

FIG. 14 is a perspective view showing the connecting apparatus of FIG. 13, showing the two sliding-mounted frame bottom-link connections as sliding-frame bottom-link mounting arm and ball sockets 132 without the bottom-link quick-hitch slip-on housing.

FIG. 15 is a perspective view showing the connecting apparatus of FIG. 14, showing the two sliding-frame bottom-link connections as bottom-link mounting arm and ball sockets extended length 137 without the sliding-frame bottom-link quick-hitch slip-on housings 135 attached thereon. Shown is a four-point implement connection design in the double-link top-link configuration 155. Sliding-frame bottom-link mounting arm and ball sockets extended length 137 may be required for a recessed implement mount at the bottom-link connection on an implement.

FIG. 16 is a perspective view of the connecting apparatus of FIG. 13 with the implement-facing side showing the double wrap-around brackets clamps 78 replaced with single wrap-around bracket clamps 76 and shows adjustable mounting channel 122 when there is a reduced weight load on the connecting apparatus. Two sliding-frame horizontal frame members 160 and 162 used as support members are mounted in a square position, sliding-frame horizontal support member square 160 for the upper member and sliding-frame horizontal support member square 162 for the lower member. A single hydraulic cylinder configuration is shown with the hydraulic cylinder brace 94*c* to sliding-frame attached to slidably-mounted frame vertical member 64 and hydraulic cylinder brace 92*c* to rigid-frame attached between rigidly-mounted base frame vertical members 53 and 54. Hydraulic cylinder attachment bracket to piston arm 83 is attached between the hydraulic cylinder piston arm and the hydraulic cylinder brace 94*c* to sliding-frame. This lower situated hydraulic cylinder configuration allows the use of a PTO driveline utilizing the pathway for a PTO driveline 98 from the tractor to the implement.

FIG. 17 is a perspective view showing an alternative design of a second connecting apparatus 41 in a more compact-design as compared to the previously disclosed upright-design 40 wherein the top and bottom rigidly-mounted horizontal frame members 47 and 52 as depicted in FIG. 5 are moved forward and level with the adjoining rigidly-mounted horizontal frame members 48 and 51. The new forwardly mounted rigidly-mounted frame members are numbered 172 for the top member and 174 for the bottom member for the purpose of this compact-design 41 as shown in in FIG. 17 and FIG. 18. Rigid-frame top-link attachment 66 is attached to rigidly-mounted frame member 172 and two rigid-frame member bottom-link attachments 68 are connected to rigidly-mounted frame member 174. The compact-design 41 of the connecting apparatus has shortened rigid-frame vertical studs 180, 182, 184, 186 with two forward mounted rigid-frame vertical members 176 and 178. Four rigid-frame braces 188 between forward mounted horizontal frame member 172 and rigid-mounted frame member 48 are shown. Two of the four rigid-frame braces 188 between forward mounted horizontal frame member 174 and rigid-mounted frame member 51 are shown. Rigid-frame braces 188 can be installed on these two members to mirror the frame braces for the top forward horizontal rigid-frame bar 172. The compact-design 41 of the connecting apparatus provides a lower elevation plane of the implement facing side sliding-frame bottom-link connections 136 and the sliding-frame top-link 130 connection as compared to the upright-design 40 of the connecting apparatus. The compact-design 41 disposes the rigidly-mounted frame top-link attachment 66 on or near the same horizontal plane as the sliding-frame top-link connection 130 and also disposes the rigidly-mounted frame bottom-link attachment 68 on or near the same horizontal plane as the sliding-frame bottom-link connection 136, allowing for the attachment of lower elevated implement bottom-link connection points 314 and top-link connections 312 when compared to the upright-design 40 of the connecting apparatus. The compact-design 41 can be utilized on smaller tractors with lighter weighted implements to be carried and used.

FIG. 18 is a perspective view showing the connecting apparatus of FIG. 17 with a stand 165 attached to the outer vertical rigid frame support members through holes 164 for removably supporting the connecting apparatus 41 in a stored position. The stand 165 is designed for attachment and use for both the upright-design 40 and the compact-design 41 of the connecting apparatus. Stand to rigid-frame mounting stud 170 is rigidly attached to stand center member 166 in at least two locations and inserts into hole 164 of the rigidly-mounted frame 45, followed by the attachment of the stand to rigid-frame mounting stud clip 171 for a secure removable connection. Stand center member 166 is supported by stand support members 168 and a stand base member 169 provided for a sturdy standing frame. The stand 165 holds and supports the rigidly-mounted frame section 45 along with the slidably-mounted frame section 46 off of the ground for stable storage.

FIG. 19 is a close-up perspective view of the implement-facing side of the sliding-frame bottom-link quick-hitch style connection point in a bolt-on configuration to the adjustable mounting channel 122. Instead of a sliding-frame bottom-link quick-hitch slip-on housing 135 (see FIG. 8), a sliding-frame bottom-link quick-hitch bolt-on connector is used, the connector comprising a housing 138 with latch and lever 139, mounted to the adjustable mounting channel 122. The connector includes a hook and stop bar 136. Channel mounting bolt and nut 128 attaches the sliding-frame quick-hitch bolt-on housing 138 with the bolt passing through both sides of the adjustable mounting channel 122 through holes 126 and through the sliding-frame quick-hitch bolt-on housing 138. Adjustable mounting channel 122 is attached to triple wrap-around bracket clamp 79 for added weight carrying capacity, utilizing six sliding-frame horizontal frame brackets. Lower three sliding-frame horizontal frame brackets support the sliding-frame bottom-links 138. Sliding-frame bottom-link quick-hitch bolt-on housing 138 with hook and latch 139 is a complete assembly, including a sliding-frame bottom-link quick-hitch hook and stop bar 136 and sliding-frame bottom-link quick-hitch latch & lever with grab shape 139. Indicia markings 190 are provided on two sliding-frame horizontal frame members 59 and 60.

FIG. 19*a* shows attachment support bases 75 in place of triple wrap around bracket clamps 79. Attachment support bases 75 are attached to the sliding frame horizontal frame members in a manner such as welding them in place with weld connections 73 shown on one section of the bracket to be duplicated on the remaining sections of the bracket where the bracket intersects the horizontal frame members of the sliding frame 46. Attachment support bases 75 can replace the triple wrap around bracket clamps 79 and also can replace double wrap around bracket clamps 78 (see FIG. 10) and single wrap around bracket clamps 76 (see FIG. 16). Currently many of the agricultural implement bottom link and top link positions are being standardized to simplify quick hitch hookup arrangements as built into many quick hitch adapters which mount on the tractors three-point hitches. This standardization eliminates the need to adjust the bottom link and top link positions on an apparatus such as the connecting apparatus 40. In the above stated case of standardization, attachment support bases 75 would be appropriate to mount to the connecting apparatus and attached in a fixedly attachment such as metal welding.

FIG. 20 is a close-up perspective view of the implement-facing side of the sliding-frame bottom-link mounting arm and ball socket style 132 connection point in a bolt-on configuration to the adjustable mounting channel 122. Sliding-frame bottom-link mounting arm and ball socket with bolt-on housing 133 is mounted to the adjustable mounting channel 122. Channel mounting bolt and nut 128 attaches sliding-frame bottom-link mounting arm and ball socket with bolt-on housing 133 with the bolt passing through both sides of the adjustable mounting channel 122 through holes 126 and through the sliding-frame bottom-link mounting arm and ball socket with bolt-on housing 133. Adjustable mounting channel 122 is attached to double wrap-around bracket clamp 78. Indicia marks 190 are shown on two sliding-frame horizontal frame members 59 and 60.

FIG. 21 shows a connector 131 that extends further towards the implement than the connector 130. Connector 131 comprises a sliding frame top-link hook and stop bar in a bolt-on configuration to the adjustable mounting channel 122. The connector 131 has the top-link channel side spacers 120 on each side. Channel mounting bolt and nut 128 the connector 131 with the bolt passing through both sides of the adjustable mounting channel 122 through holes 126 and through the connector 131 and passing thru the top-link channel side spacers 120. Adjustable mounting channel 122 is attached to double wrap-around bracket clamp 78. Indicia marks 190 are shown on two sliding-frame horizontal frame members 57 and 58. Top-bar mounting legs 101 are shown with the top-bar mounting leg bolt 103 passing through the top-bar mounting leg pre-drilled hole 102 and attaching to two of the sliding-frame vertical frame members.

FIG. 22 is a close-up perspective view of the upper-mounted top-bar camera and lights carriage 104 attachment to the top-bar with single-wrap around brackets 106, also showing top-bar inscribed indicia marks 190.

FIG. 23 is a close-up perspective view of the bar and distal ball socket style 132 connection point of the lower connection points of a three-point implement and a quick-hitch style connection device 135 as described in U.S. Pat. No. 7,059,419, as it can slip over and secure to the bar and distal ball socket style connection point 133. FIG. 23 shows the sliding-frame mounting arm ball socket and rotatable ball with axial hole 134 as the rotatable ball slips over quick-hitch slip-on housing 135 and connects via round pin and held in place with a cotter pin. Sliding-frame bottom-link quick-hitch latch and lever with grab shape 139 combined with sliding-frame bottom-link quick-hitch hook and stop bar 136 receives a mounting stud 314 (see FIG. 2) from an implement bottom-link connection. Sliding-frame bottom-link quick-hitch latch 139 rotates downward and then back into the upward position after the implement mounting stud 314 (see FIG. 2) is engaged in the sliding-frame bottom-link quick-hitch hook and stop bar 136 for a secure holding connection of the implement and the sliding-frame bottom-link quick-hitch hook and stop bar 136. Sliding-frame bottom-link quick-hitch hook and stop bar 136 allows for a stopping point when positioning the bottom-links of the connecting apparatus sliding-frame 46 to the implement bottom-links connection point or mounting stud 314. (see FIG. 2)

FIG. 24 is a perspective view of an Carry-All implement 300 with a four-point hitch connection point configuration comprising two bottom-link connection points 195 and two top-link connection points 192. Although four-point connections of implements to agricultural or excavating tractors are not commonly in use, using the connecting apparatus to carry a four-point attached implement can have a positive effect on the stability of the implement as the implement is attached and carried by the sliding frame of the connecting apparatus. The connecting apparatus being attached to the agricultural or excavation tractor in a three-point attachment configuration preserves the three-point mounting advantages of the four-point attached implement. The four-point implement attachment to the connecting apparatus creates a secure attachment to the connecting apparatus wherein the implement is a rigidly mounted extension of the three point attached connecting apparatus.

FIG. 25 is a perspective view of FIG. 24 that comprises a fifth connection point in the center of the top-link bar of the Carry-All implement 300. This three top-link bracket setup allows for a four-point or a three-point implement attachment to the connecting apparatus wherein the implement top-link attachments for four-point or three-point design 194 is utilized as a convenient application for the user of the implement as the implement in use is able to hookup to a three-point or four-point connection. During a four-point implement connection hookup, the center top-link bracket connection is not utilized. During a three-point implement connection hookup, the two outer top-link bracket connections are not utilized.

FIG. 26 is a side view of the rigid-frame 45 of the connecting apparatus in a narrow style. Shown are five segments that comprise the rigid-frame vertical frame member 196 in addition to the six rigid-frame horizontal frame members 47, 48, 49, 50, 51, 52. (see FIG. 5) First from the top to the bottom of the rigid-frame vertical frame member 196 is horizontal frame 47, vertical frame segment 196a, horizontal frame 48, vertical frame segment 196b, horizontal frame 49, vertical frame segment 196c, horizontal frame 50, vertical frame segment 196d, horizontal frame 51, vertical frame segment 196e, horizontal frame 52. Each vertical frame segment is securely attached with welding or other means such as fasteners to the adjoining horizontal frame member and each adjoining vertical frame segment edge to form a linear, straight and sturdy rigid-frame vertical frame member 196.

FIG. 27 is a side view of the rigid-frame 45 of the connecting apparatus in a wide style. Shown is a continuous single piece of metal with apertures cut out of the rigid-frame vertical member wide design 198 to allow for the six horizontal rigid-frame members 47, 48, 49, 50, 51, 52 (see FIG. 5) to pass into and through to the other side of the vertical frame member 198. Each horizontal rigid-frame member is securely attached with welding or other means such as fasteners to the rigid-frame vertical member wide design 198 to form a linear, straight and sturdy rigid-frame vertical member wide design 198.

FIG. 28 is a side view of the sliding-frame of the connecting apparatus in a narrow style with no bearings or sliding plates between the sliding-frame 46 and rigid-frame 45. Shown are three segments that comprise the sliding-frame vertical frame member 200 in addition to the four sliding-frame horizontal frame members 57, 58, 59, 60. (see FIG. 5) First from the top to the bottom of the sliding-frame vertical frame member 200 is sliding-frame horizontal frame member 57, vertical frame segment 200a, sliding-frame horizontal frame member 58, vertical frame segment 200b, sliding-frame horizontal frame member 59, vertical frame segment 200c, and sliding-frame horizontal frame member 60. Each vertical frame segment is securely attached with welding or other means to the adjoining horizontal frame member and each adjoining vertical frame segment edge to form a linear, straight and sturdy sliding-frame vertical frame member 200.

FIG. 29 is a side view of the sliding-frame of the connecting apparatus in a wide style with no bearings or sliding plates between the sliding-frame 46 and rigid-frame 45. Shown is a continuous single piece of metal with apertures cut out of the sliding-frame vertical member wide design 201 to allow for the sliding-frame horizontal members 57, 58, 59, and 60 to pass into and through to the other side of the sliding-frame vertical member wide design 201. Each sliding-frame horizontal member is securely attached with welding or other means to the sliding-frame vertical member wide design 201 to form a linear, straight and sturdy sliding-frame vertical member wide design 201.

FIG. 30 is a side view of the sliding-frame 46 of the connecting apparatus in a narrow style with bearings or sliding plates between the sliding-frame 46 and rigid-frame 45. Shown are three segments that comprise the sliding-frame vertical frame member 202 in addition to the sliding-frame four horizontal frame members 57, 58, 59, 60. First from the top to the bottom of the rigid-frame vertical frame member 202 is horizontal frame 57, vertical frame segment 202a, horizontal frame 58, vertical frame segment 202b, horizontal frame 59, vertical frame segment 202c, and horizontal frame 60. Each vertical frame segment is securely attached with welding or other means such as fasteners to the adjoining horizontal frame member and each adjoining vertical frame segment edge to form a linear, straight and sturdy sliding-frame vertical frame member 202. The sliding-frame horizontal members 57, 58, 59, 60 are sized to accommodate bearing cages or sliding plates 216 between the exterior of the rigid-frame members and the interior of the hollow sliding-frame members. (see FIGS. 34, 35, 36)

FIG. 31 shows a side view of the sliding-frame of the connecting apparatus in a wide style with bearings or sliding plates between the sliding and rigid frames. Shown is a continuous single piece of metal with apertures cut out of the sliding-frame vertical member wide design 203 to allow for the horizontal sliding-frame members 57, 58, 59, 60 to pass into and through to the other side of the sliding-frame vertical member wide design 203. Each horizontal rigid-frame member is securely attached with welding or other means such as fasteners to the sliding-frame vertical member wide design 203 to form a linear, straight and sturdy sliding-frame vertical member wide design 203. The sliding-frame horizontal members 57, 58, 59, 60 are sized to accommodate bearing cages or sliding plates 216 between the exterior of the rigid-frame members and the interior of the hollow sliding-frame members. (see FIGS. 34, 35, 36)

FIG. 32 is a close up side view of the sliding-frame horizontal member sized for minimal clearance 205 slidably-attached to and surrounding the rigid-frame horizontal member 204 with no bearings or sliding plates between the above mentioned sliding-frame and rigid-frame members. Shown is the weld seam 210 on the sliding-frame horizontal member sized for minimal clearance 205 and the weld seam 208 on the rigid-frame horizontal member 204. Grease fittings 74 are shown and inserted into a threaded hole in to the sliding-frame horizontal member sized for minimal clearance 205. This minimal clearance configuration of the sliding-frame and rigid-frame preferably uses a lubricant such as petroleum or synthetic grease to assist the sliding-frame in moving along the rigid-frame as needed. In this design with no bearings or sliding plates installed, the clearance between the outside of the rigid-frame horizontal frame member and the inside of the hollow sliding-frame horizontal frame member is approximately $\frac{1}{16}$ inch to $\frac{1}{8}$ inch around each of the four sides.

FIG. 33 is a blown up side view of the sliding-frame horizontal member sized for minimal clearance 205 weld seam 210 and rigid-frame horizontal member 204 metal weld seam 208. Shown is a rigid-frame horizontal member notch 212 to allow the sliding-frame horizontal member weld seam 210 to avoid contact with the rigid-frame horizontal member 204. Rigid-frame horizontal member notch 212 may need to be custom ground out of the metal horizontal frame member as this notch 212 normally does not exist as the steel is supplied from a steel distributor.

Figure 34:
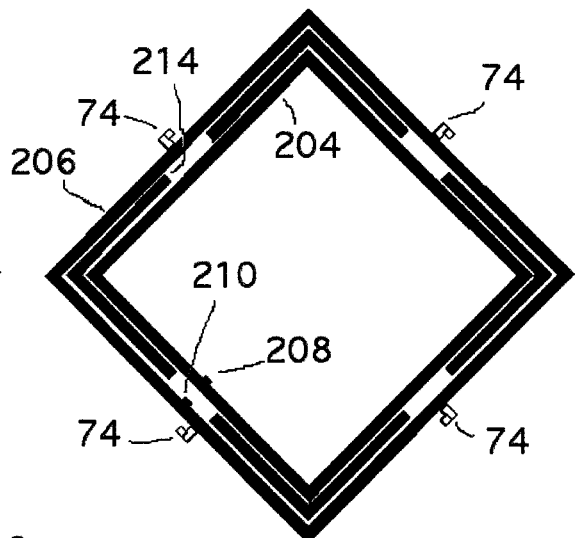

FIG. 34 is a close up side view of the sliding-frame horizontal member sized for sliding plate or bearing clearance 206 slidably-attached to and surrounding the rigid-frame horizontal member 204 with sliding plates ninety degree V style with perforations 214 between the above mentioned sliding-frame member 206 and rigid-frame member 204. Shown is the weld seam 210 on the sliding-frame horizontal member sized for sliding plate or bearing clearance 206 and the weld seam 208 on the rigid-frame horizontal member 204. Grease joints 74 are shown and inserted into a threaded hole in to the sliding-frame horizontal member sized for sliding plate or bearing clearance 206. Bearing cap collar 220 fixedly attaches to sliding-frame member 206 securing sliding plates ninety degree V style with perforations 214 in position. Shown are sliding plates ninety degree V style with perforations 214 providing a configuration for sturdy slidable support between the sliding frame member and the rigid frame member. In this design with sliding plates installed, the clearance between the outside of the rigid-frame horizontal frame member 204 and the inside of the hollow sliding-frame horizontal frame member 206 is approximately ¼ inch around each of the four sides.

Figure 35:
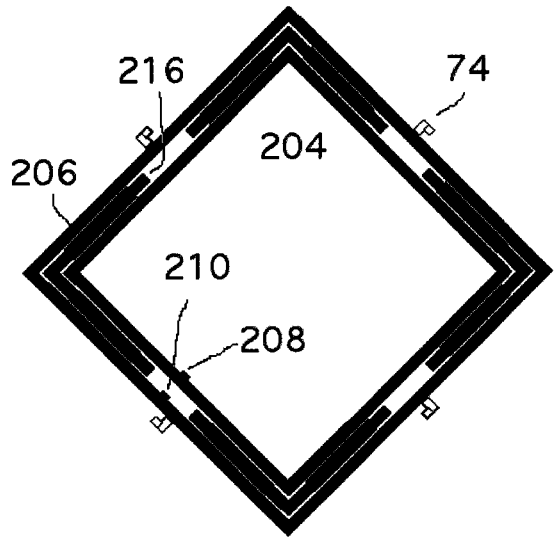

FIG. 35 is a close up side view of the sliding-frame horizontal member sized for sliding plate or bearing clearance 206 slidably-attached to and surrounding the rigid-frame horizontal member 204 with a roller cage double raceway ninety degree V style with needle bearings 216 between the sliding and rigid frames. Shown is the weld seam 210 on the sliding-frame horizontal member sized for sliding plate or bearing clearance 206 and the weld seam 208 on the rigid-frame horizontal member 204. Grease joints 74 are shown and inserted into a threaded hole in to the sliding-frame horizontal member sized for sliding plate or bearing clearance 206, bearing cap collar 220 fixedly attaches to sliding-frame member 206 securing roller cage double raceway ninety degree V style with needle bearings 216 in position. Shown are the roller cage double raceway ninety degree V style with needle bearings 216 forming a ninety degree configuration for sturdy slidable support between the sliding frame member 206 and the rigid frame member 204. In this design with bearing cages 216 installed, the clearance between the outside of the rigid-frame horizontal frame member 204 and the inside of the hollow sliding-frame horizontal frame member 206 is approximately ¼ inch around each of the four sides.

Figure 36:
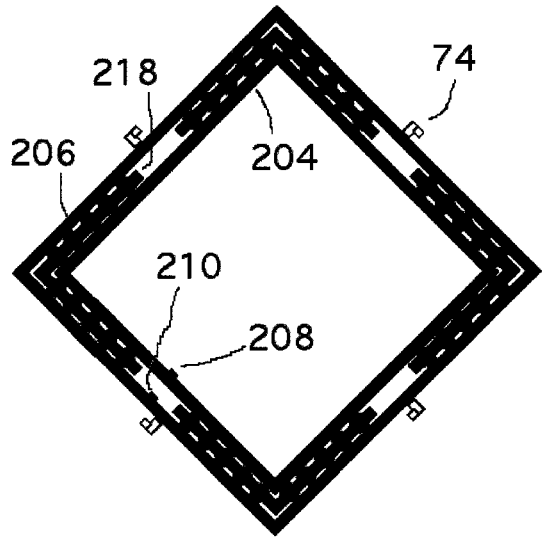

FIG. 36 is a close up side view of the sliding-frame horizontal member sized for sliding plate or bearing clearance 206 slidably-attached to and surrounding the rigid-frame horizontal member 204 with a roller cage double raceway ninety degree V style with ball bearings 218 between the sliding and rigid frames. Shown is the weld seam 210 on the sliding-frame horizontal member sized for sliding plate or bearing clearance 206 and the weld seam 208 on the rigid-frame horizontal member 204. Grease joints 74 are shown and inserted into a threaded hole in to the sliding-frame horizontal member sized for sliding plate or bearing clearance 206, bearing cap collar 220 fixedly attaches to sliding-frame member 206 securing roller cage double raceway ninety degree V style with ball bearings 218 in position. Shown are the roller cage double raceway ninety degree V style with ball bearings 218 forming a ninety degree configuration for sturdy slidable support between the sliding frame member 206 and the rigid frame member 204. In this design with bearing cages 216 installed, the clearance between the outside of the rigid-frame horizontal frame member 204 and the inside of the hollow sliding-frame horizontal frame member 206 is approximately ¼ inch around each of the four sides.

FIG. 37 and FIG. 37c show needle bearing cages 216 mounted to the interior of sliding-frame horizontal frame sleeves 57,58,59,60 (see FIG. 5). The bottom 50% of the needle bearing cages 216 are normally installed in the sliding-frame horizontal frame sleeves 57,58,59,60. The top and the side tops of the sliding-frame horizontal frame sleeves 57,58,59,60 are shown without needle bearing cages 216 installed as to view the bottom portion of the sliding-frame horizontal frame sleeves 57,58,59,60 as the needle bearing cages 216 are installed. A rigid-frame horizontal frame rails 48,49,50,51 (see FIG. 5) slide inside of the bearing cages 216 as they are installed in the sliding-frame horizontal frame sleeves 57,58,59,60. The bearing cages 216 length can be measured and installed half way in from each side of the end of the sliding-frame horizontal frame member 57,58,59,60. The bearing cages 216 butt to each other in a tight position in the center of the sliding frame member showing the bearing cage edges 222, and also butt tightly against the bearing cap collars 220 attached to each end of the sliding-frame horizontal frame sleeves 57,58,59,60. Fitting the bearing cages 216 in each side of the sliding-frame horizontal frame sleeves 57,58,59,60 and measuring, cutting and installing the bearing cages 216 in half way across the sliding-frame horizontal frame sleeves 57,58,59,60 allows the connecting apparatus bearing cages 216 to be replaced without disassembling the rigid mounted frame section 45 from the slidably-mounted frame section 46. The slidably-mounted frame section 46 moves all the way to one side of the rigid mounted frame section 45 to remove the bearing cages 216 from the opposing side of the sliding-frame horizontal frame sleeves 57,58,59,60 consequently, installing the bearing cages 216 in the same manner.

FIG. 37a is a perspective view of sliding plates 214 mounted to the interior of sliding-frame horizontal frame member 57,58,59,60 (see FIG. 5). All four sides of the sliding plates 214 are normally installed in the sliding-frame horizontal frame member 57,58,59,60.

FIG. 37b is a perspective view of ball bearing cages and bearings 218 mounted to the interior of sliding-frame horizontal frame member 57,58,59,60 (see FIG. 5). All four sides of the ball bearing cages 218 are normally installed in the sliding-frame horizontal frame member 57,58,59,60.

FIG. 37c shows a bearing cap collar 220 that holds the needle bearings cages 216 in place. The bearing cap collar 220 fits snug around the rigid-frame horizontal frame member 48,49,50,51 (see FIG. 5). The inside diameter of the bearing cap collar 220 is smaller in diameter than the sliding-frame horizontal frame member 57,58,59,60 inside diameter to prevent the needle bearings cages 216 from slipping out of the sliding-frame horizontal frame member 57,58,59,60. The bearing cap collar 220 is fixedly attached to the sliding-frame horizontal frame member 57,58,59,60 and moves in harmony with said frame member. The thickness of the bearing cap collar 220 is approximately the combined thickness of the needle bearing cages 218 and the thickness of one of the sliding-frame horizontal frame member 57,58,59,60. The bearing cap also can be used with the versions of FIGS. 37a and 37b.

FIG. 38 is a perspective view of the tractor facing side of the connecting apparatus 40 showing the rigidly-mounted frame 45 two bottom-link attachments 69 in a single vertical plate and stud configuration that would attach to the tractor bottom-link arms 318 (see FIG. 1c).

FIG. 39a is a perspective view of a third connecting apparatus 42 comprising the sliding-frame horizontal frame members and rigid-frame horizontal frame members in a square shape and installed in a square position with horizontal and vertical as compared to a horizontal plane. Top-link attachment 66 shown with brackets matching to the square horizontal frame member 47 and bottom-link attachments 69 shown with brackets matching to the square horizontal frame member 52.

FIG. 39b is a perspective view of a fourth connecting apparatus 43 comprising the sliding-frame horizontal frame members and rigid-frame horizontal frame members in a round shape. Top-link attachment 66 shown with brackets matching to the round horizontal frame member 47 and bottom-link attachments 69 shown with brackets matching to the round horizontal frame member 52.

FIG. 39c shows independently controlled wing sections 221 that attach to the left and right side edges of the rigidly-mounted base frame 45 of the connecting apparatus 40. The wing sections 221 comprise their own rigidly-mounted base frame 45 and their own slidably-mounted frame 46. All three slidably-mounted frames 46 move independently of each other. The wing sections 221 can be utilized for carrying lighter duty implements such as weeders, sprayers, cutters and the like. The wing sections 221 attach to the three-point attached first connecting apparatus 40 using a hinge. A piano style hinge 230 can be a suitable preferred attachment device to utilize for the attachment and pivoting action of the wing section 221 as connected to the three-point attached first connecting apparatus 40 left and right side edges. Attachment hardware 224 and 226 allows for a push pull means such as a hydraulic cylinder 228 to be mounted on the first connecting apparatus 40 and on each wing section 221 at the joining corners at the top and bottom of the three rigidly mounted frame sections 45. Each wing section 221 pivoting action can be controlled separately apart from the opposing wing section allowing for individual control of the wing sections. Two hydraulic cylinders 228 for each wing section 221 can work in tandem using a hydraulic fluid flow divider 232 between the hydraulic cylinders 228 and the tractor mounted hydraulic control valve 234. For control of the slidably mounted frames 46 on each wing sections 221, the wing section driver 80 can attach directly between the rigidly mounted first frame 45 and the slidably mounted frame 46 using the attachment bracket 89 to the driver 80 piston arm and the attachment bracket 90 to the driver 80 cylinder housing. The mounted position of the driver 80 on the wing section differs from the mounting position of the driver 80 on the first connecting apparatus 40. This difference is the result of the offset positioning of the wing section 221 slidably-mounted frame 46 as mounted on the rigidly mounted first frame 45.

Shown are hydraulic fluid lines 84 from the hydraulic control valve 234 leading to a hydraulic power pump 81, and showing the hydraulic fluid lines 86 from the hydraulic cylinder 228 to the hydraulic flow divider 88 and showing the hydraulic fluid lines 87 from the hydraulic flow divider 88 to the hydraulic control valve 234.

For hydraulic or electrically powered devices for driving the second framework of each wing section 221, such as a hydraulic or electrically powered cylinder, or for locally pumped fluid, a power receptacle can be provided on the first framework 45 of the first connecting apparatus 40, or alternatively on the mobile machinery. The power receptacle can receive hydraulic fluid or electrical power such as DC or AC power. For hydraulic or electrically powered devices for driving the second framework of the first connecting apparatus 40, such as a hydraulic or electrically powered cylinder, or for locally pumped fluid, a power receptacle can be provided on the mobile machinery. The power receptacle can receive power such as hydraulic fluid or DC or AC power.

Each wing section 221 slidably-mounted frame 46 is mounted in an offset position on the wing section rigidly-mounted base frame 45 to allow for the implements attached to the wing section 221 to extend past the outer edge of the wing section 221, thereby allowing for the implements attached to the first connecting apparatus 40 to extend partially across and into the horizontal plane of the wing section 221. This allows for a cultivating or other farm work path of approximately sixty feet in width when utilizing three independently moving twenty feet wide implements. The outer wing section 221 sliding frames 46 move independently of each other and independently of the first connecting apparatus 40 sliding frame 46. This independent motion of the sliding frames allows for a farmer to till, bed-shape and plant crop sections of the farmland in twenty-foot wide sections using the first connecting apparatus 40 with attached implements and then mount the lighter weight wing sections 221 to the first connecting apparatus 40 for the use of lighter weight implements that can traverse two additional twenty-feet wide crop sections for less strenuous implement activities such as weeding, spraying and harvesting. The independent motion of the wing section 221 sliding frames 46 allows the wing section 221 sliding frame 46 to follow their own particular section of the crop rows as that particular section of crop rows was planted by a guidance system independently of the other crop row sections in the sixty-foot total area covered, variances between the twenty-foot sections of crops rows throughout the farm occur. Conversely, if a sixty-foot continuous implement is attached to the first connecting apparatus 40 sliding-frame 46 with no independently controlled wing sections attached and traversing three twenty foot sections of crop rows and the twenty-foot sections of crop rows as shaped and planted independently of each other as many farmers practice currently, the sixty-foot continuous implement may not align properly with all of the planted crop rows resulting in damaged crops in a farming procedure such as weeding.

Functionality of the Related Parts of the Connecting Apparatus:

The receiver 110 or 110e provides the present position of the slidable-frame 46 to a GPS controller or laser beam fixedly located in the field. The GPS controller or laser beam contains the coordinates describing the desired field position of the implement attached to the slidable-frame 46 at any one time. If the slidable-frame 46 and the implement being carried are out of position, the GPS signal or laser beams signal, after being received by the receiver-110 or 110e, directs the driver controller 150 to position the driver 80 to keep the implement which is attached to the connecting apparatus on the prescribed path using the hydraulic controls on the tractor the apparatus 40. The piston of the hydraulic cylinder 80 moves the slidable-frame 46 laterally to the desired position as the tractor moves along.

A GPS controller is typically a microprocessor that receives GPS signals, compare the received signal to pre-programmed desired coordinates, and outputs a signal based on the difference, if any, between the desired coordinates and the received position. Such GPS controllers are conventionally used for controlling tractor steering. A conventional GPS guided steering system for tractors is available from Trimble of Sunnyvale, Calif. One popular GPS guidance system currently being used in the agricultural industry is called Real-Time Kinematic (RTK). RTK systems when combined with earth mounted base stations using radio or cellular signals relayed to the roving mobile machinery within a prescribed radius location can achieve horizontal accuracy of <4 centimeters in most conditions. Laser guidance and wire signal guidance are also viable guidance system technologies available for the control of the present invention apparatuses. A laser guidance system normally uses a vertical spinning laser transmitter to be received by the laser receiver mounted on the apparatus top bar 100a or 100b. The laser receiver 110 then transmits a signal to the controller 150 which then controls the driver 80 and the position of the sliding frame 46 of the controlled apparatus 40. A wire signal guidance system involves multiple sensors mounted on a bottom bar for a buried wire and on the top bar for overhead wires. The bottom bar 140 sensor mounted system normally is utilized in open field agriculture while the top bar 100b mounted sensors system normally is utilized in greenhouse agricultural applications.

The lateral position of the sliding frame with respect to the center line of the base frame and forward movement of the tractor can be adjusted by causing the pistons of the hydraulic cylinder 32 to extend or retract.

The control of the hydraulic cylinder 80 can be implemented in manual mode by the driver, a second individual, or automatically in automatic mode by a controller including sensors monitoring the position of the three-point hitch attached implement with respect to a known desired position for the implement.

A system according to this invention comprises the mobile machinery such as a tractor having a three-point hitch, the connecting apparatus attached to the mobile machinery with the three attachments; and an implement attached to the slidable second framework with at least three connectors. To connect the apparatus to the implement, the implement and apparatus are placed proximate to each other; the alignment of the connectors and the hitches are determined, and the alignment is adjusted by sliding the second framework relative to the first framework.

After attachment of the implement to the connecting apparatus is completed, during use of the system, the position of the implement relative to the mobile machinery is adjusted by the mobile machinery operator in manual mode or by the signal receiver 110 or 110e and the driver controller 150 in automatic mode, changing the position of the second framework to keep the implement on track.

The driver 80 can be powered hydraulically or electrically. FIG. 4a is a flow chart depicting a hydraulic driver and related components suitable for use with the present invention. It utilizes mobile machinery hydraulic pump 81, which is normally used for controlling the three-point hitch link arms 318 and 324 (see FIG. 3) and utilizes a fluid reservoir. A guidance signal is received by the receiver 110 or 110e which is connected to the driver controller 150. The antenna (not shown) is optionally provided to enhance the reception of the guidance signal to the GPS receiver 110e, but not requires for a laser receiver 110. The driver controller 150 transmits a signal to the automatic double action hydraulic valve 238 to control the driver 80. If the hydraulic valve option switch 240 is in the automatic position, the automatic double action hydraulic valve 238 controls the driver 80. If the hydraulic valve option switch 240 is in the manual position, the automatic double action hydraulic valve 238 does not receive hydraulic fluid and is not operational, and thus the manual double action hydraulic valve 236 controls the driver at the tractor operator's initiation. Hydraulic power receptacles 242 provide connect and disconnect locations for the hydraulic lines leading from the hydraulic fluid valves to the driver 80 for connection and removal of the apparatus from the three point hitch of the mobile machinery.

Electrical power from the mobile machinery battery is used for powering the drive controller 150 and signal receiver 110 or 110e.

FIG. 4b is a flow chart depicting an electric driver and related components of the present invention apparatuses. As in the hydraulic version, a guidance signal is received by the receiver 110 or 110e which then transmits the signal to the driver controller 150. The driver controller 150 sends a signal to an automatic electric switch 248 to control the driver 80. If an electric option switch 250 is in the automatic position, the automatic electric switch 248 controls the driver 80. If the electric option switch 250 is in the manual position, the automatic electric switch 248 does not receive electric current and is not operational, therefore allowing the manual electric switch 246 to control the driver at the tractor operator's initiation. Electric power receptacles 244 provide connect and disconnect locations for the electrical conductors leading from the electric switches to the driver 80 for the connection and removal of the present invention apparatuses from the three point hitch of the tractor.

A typical method of using the invention for agricultural comprises:
1. Choose a guidance system:
   a. Manual or automatic.
   b. If manual, choose single tractor operator or double tractor operator. (Double operator—first operator steering the tractor and the second operator manually controlling the apparatus driver 80).
   c. If automatic, choose GPS guided, laser guided, guidance wire guided or other.
   d. If automatic is chosen, the guidance system must be set up and installed.
2. Row and raised bed crops utilizing the guided system with all steps for any or all of the following:
   a. Precision tilling or preparing the soil for planting.
   b. Precision position spraying of herbicides and/or insecticides prior to planting if required.
   c. Precision laying or dropping fertilizer if required.
   d. Precision position installing drip tape if required.
   e. Precision position installing of mulch or plastic culture if required.
   f. Precision position planting of seeds or transplanting seedlings.
   g. Precision position spraying of herbicides and/or insecticides after planting if required.
   h. Precision position weeding with soil cultivation or weed cutting when required.
   i. Precision position harvesting.

The invention can also be used for earth excavating and grading.

Among the advantages of the invention with a guided system are:
   a) The horizontal adjustments of the present invention provide an accurate system of obtaining the desired path of excavation and soil preparation as compared to utilizing an automated steering device of the mobile machinery as the only form of implement path guidance.
   b) Utilizing mobile machinery steering guidance combined with mobile machinery implement guidance creates a more accurate system of obtaining the desired path of excavation and soil preparation as compared to utilizing an automated steering device of the mobile machinery as the only form of implement path guidance.

EXAMPLE OF CONSTRUCTION OF MATERIALS

The following are exemplary materials that can be used for the claimed invention:

Rigid-frame horizontal frame members
ASTM A500 Grade B cold formed welded carbon steel structural square tubing, or;
ASTM A500 Grade B cold formed welded carbon steel structural round tubing, or;
Solid square steel bars, or;
Solid round steel bars
Rigid-frame vertical frame members
ASTM A500 Grade B cold formed welded carbon steel structural rectangular tubing, or;
Solid steel plate
Sliding-frame horizontal frame members
ASTM A500 Grade B cold formed welded carbon steel structural square tubing, or;
ASTM A500 Grade B cold formed welded carbon steel structural round tubing, or;
Sliding-frame vertical frame members
ASTM A500 Grade B cold formed welded carbon steel structural rectangular tubing, or;
Solid steel plate The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. For example, the invention has been principally described using a tractor as the mobile machinery. However the invention can be used with other machinery such as truck, plow, or excavating machinery. In addition, although the invention has been described principally with regard to hydraulic cylinders, electric cylinders can be used. Instead of a sleeve for the second framework to slide along the rails, the rails can be provided with a bracket, track, or other structure which can be engaged by the second framework such as a projection on lateral cross members. Accordingly, this invention is not intended to be limited by the specific exemplification presented herein above. Rather, what is intended to be covered is within the spirit and scope of the appended claims.

What is claimed is:

1. A system for connecting multiple implements to a three-point hitch of mobile machinery for controllable side-shifting movement of the connected implements, the three point hitch comprising an upper attachment point and two lower attachment points, the system comprising:
   i) first, second, and third apparatus, each apparatus comprising:
      a) a first framework having a height, a length, and a depth, and wherein a first framework plane extends along the height and the length of the first framework;
      b) a slidable second framework mounted to the first framework to slide laterally back and forth across the first framework;
      c) three connectors supported by the slidable second framework for connecting the slidable second framework to one of the implements for movement of the implement by the mobile machinery and the slidable second framework; and
      d) a driver connected to the first framework and connected to the slidable second framework for driving the slidable second framework laterally back and forth along the first framework; and
   ii) the first apparatus comprising:
      a) an upper attachment attached to the first framework for attachment to the upper attachment point of the three-point hitch;
      b) two lower attachments attached to the first framework for attachment to the lower attachment points of the three-point hitch; and
      c) opposed first and second sides;
   wherein the second apparatus is attached to the first side of the first apparatus and the third apparatus is attached to the second side of the first apparatus.

2. The system of claim 1 wherein each slidable second framework of each apparatus is coplanar with the corresponding first framework in the first framework plane.

3. The system of claim 1 wherein each first framework comprises at least two parallel, vertically spaced apart, laterally extending rails and at least two upwardly extending, laterally spaced apart studs attached to the rails.

4. The system of claim 3 wherein the studs and rails are coplanar in the respective first framework plane.

5. The system of claim 3 wherein the first framework of the first apparatus comprises an upper cross beam and a lower cross beam attached to the studs of the first apparatus.

6. The system of claim 5 wherein the studs, cross beams, and rails of the first framework of the first apparatus are coplanar in the respective first framework plane.

7. The system of claim 3 wherein each first framework comprises an upper cross beam and a lower cross beam attached to the respective studs.

8. The system of claim 7 wherein the cross beams and rails of each first framework are coplanar in the respective first framework plane.

9. The system of claim 7 wherein the studs, cross beams and rails of the first framework of each apparatus are coplanar in the respective first framework plane.

10. The system of claim 5 wherein the cross beams and rails of the first framework of the first apparatus are coplanar in the first framework plane of the first apparatus.

11. The system of claim 1 wherein each slidable second framework comprises at least two sleeves mounted on the respective rails to slide laterally back and forth along the rails.

12. The system of claim 11 wherein each sleeve is a surrounding sleeve mounted around one of the rails.

13. The system of claim 11 wherein each apparatus comprises at least two upwardly extending, laterally spaced apart posts attached to the respective sleeves.

14. The system of claim 13 wherein the sleeves and the posts of each apparatus are coplanar in the respective first framework plane.

15. The system of claim 1 wherein the connectors of each apparatus comprise two lower connectors laterally spaced apart from each other and an upper connector.

16. The system of claim 15 wherein each lower connector comprises a hook and a latch and each upper connector comprises a hook.

17. The system of claim 1 wherein the connectors of each apparatus comprises two lower connectors laterally spaced apart from each other and two upper connectors laterally spaced apart from each other.

18. The system of claim 17 wherein each lower connector comprises a hook and a latch and each upper connector comprises a hook.

19. The system of claim 1 wherein the second apparatus and the third apparatus are removably connected to the first apparatus.

20. The system of claim 1 wherein both the second apparatus and the third apparatus are pivotally attached to the first apparatus for pivoting movement relative to the first apparatus.

21. The system of claim 20 wherein each of the second apparatus and the third apparatus is pivotally attached to the first apparatus by a hinge.

22. The system of claim 21 wherein the hinges are piano hinges.

23. The system of claim 20 comprising first moving means for moving the second apparatus relative to the first apparatus and second moving means for moving the third apparatus relative to the first apparatus.

24. The system of claim 23 wherein each of the first and second moving means is a push/pull cylinder.

25. The system of claim 24 wherein each push/pull cylinder is a hydraulic cylinder.

26. The system of claim 24 wherein each push/pull cylinder is electrically powered.

27. The system of claim 24 wherein each push/pull cylinder is controlled with a manual lever.

28. The system of claim 20 wherein pivoting movement of the second apparatus relative to the first apparatus is controlled separately and independently from pivoting movement of the second apparatus, and the pivoting movement of the third apparatus relative to the first apparatus is controlled separately and independently from the pivoting movement of the second apparatus.

29. The system of claim 1 wherein the position of at least one of the connectors is laterally adjustable on the second framework on each of the apparatuses.

30. The system of claim 1 wherein the position of at least one of the connectors is vertically adjustable on the second framework on each of the apparatuses.

31. The system of claim 1 comprising a guidance system for controlling the drivers.

32. The system of claim 31 wherein the guidance system comprises a guidance wire for each respective apparatus, and at least one sensor mounted on each second framework for sensing the guidance wires.

33. The system of claim 31 wherein the guidance system controls each driver independently from the other drivers.

34. The system of claim 33 wherein the guidance system comprises a position signal receiver mounted on each slidable second framework for determining the position of each slidable second framework, and a controller for receiving position signals from each position signal receiver.

35. The system of claim 34 wherein the position signal receivers are Global Positioning System (GPS) signal receivers.

36. The system of claim 34 wherein the position signal receivers are laser signal receivers.

37. The system of claim 31 wherein the guidance system comprises a camera mounted on each slidable second framework for generating a signal, and a controller for receiving signals from the camera, the controller adapted to control the driver of each apparatus separately from the driver of the other apparatuses.

38. The system of claim 1 comprising at least one light fixture, at least one camera, and at least one camera monitor with a data transfer wire.

39. The system of claim 1 comprising a connection guidance system for connecting each respective apparatus to each corresponding implement, each connection guidance system comprising a positioning controller adapted to control each slidable second framework driver and a sensor, camera or both on each slidable second framework for sensing the position of each corresponding implement to be connected, and a sensor identifier or reflector or both for mounting or mounted on each corresponding implement.

40. A system comprising:
   i.) mobile machinery having a three-point hitch;
   ii.) the system of claim 1 removably attached to the mobile machinery with the three attachments; and
   iii.) each implement removably connected to each corresponding slidable second framework with the connectors.

41. The system of claim 1 comprising at least one sensor for sensing the position second framework of the first apparatus relative to the first framework of the first apparatus and an alert generator that generates an alert when the sensor senses that the second framework of the first apparatus slides beyond a predetermined position.

42. A system comprising:
   i.) mobile machinery having a three-point hitch;
   ii.) the system of claim 1 removably attached to the three-point hitch of the mobile machinery with the three attachments; and
   iii.) a sensor for sensing the position of the second framework of the first apparatus relative to the first framework of the first apparatus, and an auto-steer system for adjusting the position of the mobile machinery based on the sensed position of the second framework of the first apparatus relative to the first framework of the first apparatus.

43. A system for connecting multiple implements to a three-point hitch of mobile machinery for controllable side-shifting movement of the connected implements, the three point hitch comprising an upper attachment point and two lower attachment points, the system comprising:
   i) first, second, and third apparatus, each apparatus comprising:
      a) a first framework having a height, a length, and a depth, and comprising at least two parallel, vertically spaced apart, laterally extending rails, an upper cross beam, a lower cross beam, and at least two upwardly extending, laterally spaced apart studs attached to the cross beams and the rails, wherein the rails are in a first framework plane, the first framework plane extending along the height and the length of the first framework;
      b) a slidable second framework comprising at least two sleeves, the sleeves and the second framework being in the first framework plane, and wherein each sleeve is a surrounding sleeve mounted around one of the rails so that the slidable second framework can slide laterally back and forth along the rails;
      c) three connectors supported by the slidable second framework for connecting the slidable second framework to one of the implements for movement of the implement by the mobile machinery and the slidable second framework; and
      d) a driver connected to the first framework and connected to the slidable second framework for driving the slidable second framework laterally back and forth along the rails;
   ii) the first apparatus comprising;
      a) an upper attachment attached to the upper cross beam for attachment to the upper attachment point of the three-point hitch;

b) two lower attachments attached to the lower cross beam for attachment to the lower attachment points of the three-point hitch; and c) opposed first and second sides;

wherein the second apparatus is attached to the first side of the first apparatus and the third apparatus is attached to the second side of the first apparatus.

44. The system of claim 43 wherein each first framework comprises at least two upwardly extending, laterally spaced apart posts attached to the sleeves.

45. The system of claim 44 wherein the posts are coplanar with the sleeves in the respective first framework plane.

46. A system for connecting multiple implements to a three-point hitch of mobile machinery for controllable side-shifting movement of the connected implements, the three point hitch comprising an upper attachment point and two lower attachment points, the system comprising:
  i) first, second, and third apparatus, each apparatus comprising:
    a) a first framework having a height, a length, and a depth, and comprising at least two parallel, vertically spaced apart, laterally extending rails, an upper cross beam, a lower cross beam, and at least two upwardly extending, laterally spaced apart studs attached to the cross beams and the rails, wherein the rails are in a first framework plane, the first framework plane extending along the height and the length of the first framework;
    b) a slidable second framework comprising at least two upwardly extending, laterally spaced apart posts and at least two sleeves attached to the posts, the posts and the sleeves being coplanar in the first framework plane, and wherein each sleeve is a surrounding sleeve mounted around one of the rails so that the slidable second framework can slide laterally back and forth along the rails;
    c) three connectors supported by the slidable second framework for connecting the slidable second framework to one of the implements for movement of the implement by the mobile machinery and the slidable second framework; and
    d) a driver connected to the first framework and connected to the slidable second framework for driving the slidable second framework laterally back and forth along the rails;
  ii) the first apparatus comprising;
    a) an upper attachment attached to the upper cross beam for attachment to the upper attachment point of the three-point hitch;
    b) two lower attachments attached to the lower cross beam for attachment to the lower attachment points of the three-point hitch; and
    c) opposed first and second sides;
  wherein the second apparatus is attached to the first side of the first apparatus and the third apparatus is attached to the second side of the first apparatus.

47. A System for connecting multiple implements to a three-point hitch of mobile machinery for controllable side-shifting movement of the connected implements, the three point hitch comprising an upper attachment point and two lower attachment points, the system comprising:
  i) first, second, and third apparatus, each apparatus comprising:
    a) a first framework having a height, a length, and a depth, and comprising at least two parallel, vertically spaced apart, laterally extending rails, an upper cross beam, a lower cross beam, and at least two upwardly extending, laterally spaced apart studs attached to the cross beams and the rails, wherein the rails, the studs, and the cross beams are coplanar in a first framework plane, the first framework plane extending along the height and the length of the first framework;
    b) a slidable second framework comprising at least two upwardly extending, laterally spaced apart posts and at least two sleeves attached to the posts, the posts and the sleeves being coplanar in the first framework plane, and wherein each sleeve is a surrounding sleeve mounted around one of the rails so that the slidable second framework can slide laterally back and forth along the rails;
    c) three connectors supported by the slidable second framework for connecting the slidable second framework to one of the implements for movement of the implement by the mobile machinery and the slidable second framework; and
    d) a driver connected to the first framework and connected to the slidable second framework for driving the slidable second framework laterally back and forth along the rails;
  ii) the first apparatus comprising;
    a) an upper attachment attached to the upper cross beam for attachment to the upper attachment point of the three-point hitch;
    b) two lower attachments attached to the lower cross beam for attachment to the lower attachment points of the three-point hitch; and
    c) opposed first and second sides;
  wherein the second apparatus is attached to the first side of the first apparatus and the third apparatus is attached to the second side of the first apparatus.

48. A system for connecting multiple implements to a mobile machinery for controllable side-shifting movement of the connected implements, the system comprising:
  i) first, second, and third apparatus, each apparatus comprising:
    a) a first framework having a height, a length, and a depth;
    b) a slidable second framework mounted to slide laterally back and forth across the first framework;
    c) a connector supported by the slidable second framework for connecting the slidable second framework to the respective implement for movement of the implement by the mobile machinery and the slidable second framework; and
    d) a driver connected to the first framework and connected to the slidable second framework for driving the slidable second framework laterally back and forth;
  ii) the first apparatus comprising:
    a) an attachment attaching the first framework of the first apparatus to the mobile machinery; and
    b) opposed first and second sides;
  wherein the second apparatus is attached to the first side of the first apparatus and the third apparatus is attached to the second side of the first apparatus.

49. The system of claim 48 wherein both the second apparatus and the third apparatus are pivotally attached to the first apparatus for pivoting movement relative to the first apparatus.

50. The system of claim 49 wherein the second apparatus and the third apparatus are removably connected to the first apparatus.

* * * * *